US005881346A

United States Patent [19]

Mori et al.

[11] Patent Number: 5,881,346

[45] Date of Patent: Mar. 9, 1999

[54] IMAGE FORMING APPARATUS HAVING ROTATIONAL PHASE CONTROLLER

[75] Inventors: Hirotaka Mori; Ryo Ando, both of Ebina, Japan

[73] Assignee: Fuji Xerox Co., Ltd., Tokyo, Japan

[21] Appl. No.: 749,965

[22] Filed: Nov. 18, 1996

[30] Foreign Application Priority Data

Nov. 20, 1995 [JP] Japan .................................... 7-301381

[51] Int. Cl.$^{6}$ ...................................................... G03G 15/01

[52] U.S. Cl. ............................ 399/301; 399/396; 399/49; 347/116

[58] Field of Search ............................. 399/66, 299, 301, 399/394, 396, 49; 347/116

[56] References Cited

U.S. PATENT DOCUMENTS

| | | | |
|---|---|---|---|
| 4,541,709 | 9/1985 | Kampschreur | 399/162 |
| 4,723,145 | 2/1988 | Takada et al. | 399/36 |
| 4,752,804 | 6/1988 | Ohno . | |
| 4,912,491 | 3/1990 | Hoshino et al. . | |
| 5,101,232 | 3/1992 | Evans et al. | 399/160 |
| 5,287,162 | 2/1994 | Jong et al. | 399/49 |
| 5,424,763 | 6/1995 | Komiya et al. | 347/116 |
| 5,444,525 | 8/1995 | Takahashi et al. | 399/76 |
| 5,457,518 | 10/1995 | Ashikaga et al. | 399/28 |

FOREIGN PATENT DOCUMENTS

| | | |
|---|---|---|
| 44 34 081 A1 | 5/1995 | Germany . |
| A-1-281468 | 11/1989 | Japan . |
| A-6-253151 | 9/1994 | Japan . |

OTHER PUBLICATIONS

Patent Abstracts of Japan, vol. 96, No. 2, Feb. 29, 1996.

*Primary Examiner*—Robert Beatty
*Attorney, Agent, or Firm*—Oliff & Berridge, PLC

[57] ABSTRACT

An image forming apparatus includes a color difference detection pattern output device that outputs an image signal to produce a color difference detection pattern for detecting periodic rotational variations arising in the image forming apparatus, a pattern detection device for detecting the color difference detection pattern formed on an endless carrier; phase detection device for detecting the phase of rotation of at least one of the image carriers of the image forming apparatus on the basis of a detection signal received from the pattern detection device; and a rotational phase control device for individually controlling the phase of rotation of at least one of the image carriers of the image forming apparatus and the endless carrier on the basis of the phase information detected by the phase detection device. The phase detection device calculates the mean value of the rotational variations of the rotational phases.

15 Claims, 33 Drawing Sheets

FIG. 15A

EXAMPLE WHEN C = 3Hz
(AMPLITUDES OF A AND B ARE NOT NEGLIGIBLE)

| A (Hz) | B (Hz) | SAMPLING FREQUENCY (Hz) |
|---|---|---|
| 50 | 25 | 25 |
| 50 | 30 | 10 |
| 30 | 20 | 10 |

FIG. 15B

EXAMPLE WHEN AMPLITUDE B IS NEGLIGIBLE
IN RELATION TO A AND C

| A (Hz) | C (Hz) | SAMPLING FREQUENCY (Hz) |
|---|---|---|
| 50 | 5 | 50, 25 |
| 20 | 3 | 20, 10 |
| 5 | 0.5 | 5, 2.5 |

PHASE SHIFT $\phi = \frac{92 + 89 + 91 + 88}{4} = 90°$

IMAGE FORMING APPARATUS HAVING ROTATIONAL PHASE CONTROLLER

BACKGROUND OF THE INVENTION

The present invention relates to a registration control technique for detecting and correcting color differences for a plurality of images formed in different colors by image forming means, in a multiple image forming apparatus, such as a tandem color copier or printer, which comprises a plurality of image forming means, or an image forming apparatus that sequentially forms a plurality of images having different colors with use of at least one image forming means, and forms a color image by transferring the thus-formed images onto a transfer belt, paper on a transfer belt, or an intermediate transfer material.

Recently, as formation of documents to be handled in the office, or elsewhere, in color becomes popular quickly, there has been increasing usage of image forming apparatuses that produce the documents in color, such as copiers, printers, and facsimiles. The current tendency is for these color image forming apparatuses to be arranged so as to produce high quality color images at high speed, as the quality and processing speed of office paper work increases. Various types of so-called tandem color image forming apparatus have already been proposed or have become commercially introduced as color image forming equipment that meets the previously-described requirements. Specifically, the color image forming equipment is provided with image forming units for respective colors, e.g., black (K), yellow (Y), magenta (M), and cyan (C). Images that are formed in different colors by the image forming units are transferred onto a transfer material to be transported or onto an intermediate transfer material in a superimposed manner, so that a color image is formed.

For example, the following image forming apparatus may be mentioned as the previously-described tandem color image forming apparatus. The tandem color image forming apparatus is provided with four image forming units: namely, a black image forming unit 200K for forming an image in black (K), a yellow image forming unit 200Y for forming an image in yellow (Y), a magenta image forming unit 200M for forming an image in magenta (M), and a cyan image forming apparatus for forming an image in cyan (C), as shown in FIG. 39. These four image forming units 200K, 200Y, 200M, and 200C are horizontally arranged at given intervals. A transfer belt 202 which transports transfer paper 201 to respective transfer positions of the image forming units 200K, 200Y, 200M, and 200C while electrostatically attracting it, is disposed as an endless transfer-material carrier below these four image forming units 200K, 200Y, 200M, and 200C for four colors black, yellow, magenta, and cyan.

The aforementioned four color image forming units 200K, 200Y, 200M, and 200C, i.e., black, yellow, magenta, and cyan, are all constructed in the same manner. These four image forming units 200K, 200Y, 200M, and 200C are arranged to sequentially form a black toner image, a yellow toner image, a magenta toner image, and a cyan toner image in the manner as has been previously described. Each of the image forming units 200K, 200Y, 200M, and 200C is provided with a photosensitive drum 203. The surface of this photosensitive drum 203 is evenly charged by a corotron 204 for primary electrostatic charging purposes. Then, the surface is exposed to a scanning laser beam 205 for image forming purposes so as to correspond to the image information, resulting in a latent image being formed on the surface. The latent image formed on the surface of each photosensitive drum 203 is developed by a developing unit 206 of each of the image forming units 200K, 200Y, 200M, and 200C, using toner of each color, i.e., black, yellow, magenta, and cyan, whereby visible toner images are formed. After having undergone electrification of a pre-transfer electrostatic charger 207, the visible toner images are transferred sequentially onto the transfer paper 201 retained on the transfer belt 202 by means of the electrostatic charge generated by transfer electrostatic chargers 208. The transfer paper 201 having the black, yellow, magenta, and cyan toner images transferred thereon is detached from the transfer belt 202. The thus-removed transfer paper 201 is subjected to fixing treatment by an unillustrated fixing unit, whereby a color image is formed.

On the drawing, reference numeral 209 designates a photosensitive material cleaner; 210, a photosensitive material charge-removing lamp; 211, a paper removal corotron; 212, a transfer belt charge-removing corotron; 213, a transfer belt cleaner; and 214, a pre-cleaning corotron.

The tandem color image forming apparatus having the above-described construction, is based on a scheme in which one image is formed by use of a plurality of image forming units, which enables considerably rapid formation of color images. However, an increase in the speed of formation of an image results in frequently occurring problems related to registration of the images formed by the image forming units; namely, problems related to registration of colors (hereinafter referred to as registration), which in turn makes it considerably difficult to achieve a high-quality color image and high-speed production rate. This problem is ascribed to slight variations in the position and size of components in each image forming unit as well as in the position and size of each image forming unit due to variations in the temperature within the color image forming apparatus and receipt of external forces. Of these factors, variations in the internal temperature of the image forming apparatus and the external force are impossible to prevent. For example, routine operations, such as correction of paper jams, replacement of components as a result of maintenance, or the movement of the color image forming apparatus, result in external forces exerted on the color image forming apparatus.

To prevent this problem, such an image forming apparatus as disclosed in, e.g., Unexamined Japanese Patent Publn. No. Hei-1-281468, has already been proposed. This image forming apparatus comprises a plurality of image forming sections that form visible images of position detection marks and visible images corresponding to original image information; a travel member that sequentially passes the transfer areas where the visible images, which are formed by the image forming sections so as to correspond to the original image information or the visible images of the position detection marks, are transferred; and position-detection mark detecting means that is disposed downstream of the transfer area in the direction of movement of the travel member and detects the position detection mark transferred on the travel member. The image forming apparatus is arranged to control the respective image forming sections in such a way as to correct the difference between transferred images on the basis of a detection signal output from the position-detection mark detecting means.

Where the technique of correcting the difference between transferred images is applied to the so-called tandem color image forming apparatus shown in FIG. 39, the four image forming units 200K, 200Y, 200M, and 200C, i.e., black, yellow, magenta, and cyan, form a plurality of color difference detection patterns, i.e., 220K, 220Y, 220M, 220C, 221K, 221Y, 221M, and 221C, over the entire circumference of the transfer belt 202 at predetermined intervals in the direction of travel of the transfer belt 202 and the direction orthogonal to the direction of travel of the transfer belt 202, as shown in FIG. 40. A linear light-receiving element 222 such as a CCD sensor, which comprises a plurality of linearly-arrayed light-receiving pixels, samples the color difference detection patterns 220K, 220Y, 220M, 220C, 221K, 221Y, 221M, and 221C using transmission light originating from a light-emitting element 223. Next, the intervals between the color difference detection patterns 220K, 220Y, 220M, 220C, 221K, 221Y, 221M, and 221C are calculated. The positions of the image forming units 200K, 200Y, 200M, and 200C and image-formation timing are corrected such that the intervals become equal to a predetermined reference value, thereby realizing high-quality images. The color difference detection patterns 220K, 220Y, 220M, 220C, 221K, 221Y, 221M, and 221C formed on the transfer belt 202 are removed by a transfer belt cleaner 213 after the sampling operation.

In the color image forming apparatus having the above-described configuration, the predetermined color difference patterns 220K, 220Y, 220M, 220C, 221K, 221Y, 221M, and 221C are formed over the entire circumference of the transfer belt 202 by means of the image forming units 200K, 200Y, 200M, and 200C, as shown in FIG. 40. These color difference patterns 220K, 220Y, 220M, 220C, 221K, 221Y, 221M, and 221C are detected by means of the linear light-receiving element 222 consisting of CCD sensors. The intervals between the color difference detection patterns 220K, 220Y, 220M, 220C, 221K, 221Y, 221M, and 221C are calculated. The positions of the image forming units 200K, 200Y, 200M, and 200C and the image-formation timing are corrected such that the intervals become equal to a predetermined reference value, thereby realizing high-quality images.

However, the aforementioned color image forming apparatus has the following drawbacks: The color difference detection patterns 220K, 220Y, 220M, 220C, 221K, 221Y, 221M, and 221C are formed over the entire circumference of the transfer belt 202 that includes a seam 202*a*, as shown in FIG. 39. These color difference detection patterns 220 and 221 are removed by the transfer belt cleaner 213 after the sampling operation. The seam 202*a* of the transfer belt 202 has a minute step-wise gap. This gap makes it difficult to completely remove the color difference detections patterns 220 and 221 which are formed on the seam 202*a* of the transfer belt 202. As a result, the toner that forms the color difference patterns 220 and 221 remains on the seam 202*a* of the transfer belt 202. If the toner that forms the color difference patterns 220 and 221 remains on the seam 202*a* of the transfer belt 202 in this way, the remaining toner adheres to the reverse side of the transfer paper 201 held on and carried by the transfer belt 202 when the next color image is formed. Consequently, the reverse side of the transfer paper 201 is soiled with the remaining toner.

The previously-described color difference patterns 220K, 220Y, 220M, 220C, 122K, 122Y, 122M, and 122C are formed over the entire circumference of the transfer belt 202 that includes the seam 202*a*. As previously described, the seam 202*a* of the transfer belt 202 has a minute step, and hence the density of the color difference detection patterns 220 and 221 formed on the seam 202*a* of the transfer belt 202 may vary, or the color difference detection patterns may not be formed completely. If the density of the color difference patterns 220 and 221 formed on the seam 202*a* of the transfer belt 202 varies, or if the color difference patterns are not formed completely, a detection error will arise when the linear light-receiving element 222 detects the color difference patterns 220 and 221.

To prevent the above-described problem, it has been already proposed a sample-and-correction method in Unexamined Japanese Patent Publication 6-253151. According to this method, where the sampling and correction of an image are controlled, a sampling starting point and a sampling interval of sampling control means are set by means of control means. Repetitive patterns for measuring misregistration are generated. Sampled data and processed data are added up, whereby the positions of the patterns are determined. The accuracy of detection of the patterns for misregistration purposes is improved by setting the sampling starting point and the sampling interval of the sampling control means.

However, the above-described prior art has the following drawbacks. In the case of the image sample-and-correction method for use in registration of the multiple image forming apparatus as disclosed in Unexamined Japanese Patent Application No. Hei-6-253151, color misregistration having a constant magnitude and orientation (hereinafter referred to as DC color misregistration) arises because of minute variations in the position and size of components in the image forming unit as well as in the position and size of each image forming unit resulting from variations in the internal temperature of the color image forming apparatus and application of an external force to the image forming apparatus. This color misregistration is detected and corrected. The color misregistration also includes color misregistration whose magnitude and orientation periodically change (hereinafter referred to as AC color misregistration) in addition to the previously described DC components. The AC color misregistration is primarily caused by a rotating body such as a photosensitive drum and belt drive rollers. In the conventional color image forming apparatus, variations in the motion of the rotating body, such as a photosensitive drum and belt drive rollers, are detected by use of an encoder attached to the rotary shaft of the photosensitive drum, etc. The variations in the rotation of the photosensitive drum detected by the encoder, are fed forward or backwards to a drive motor so as to reduce the variations in the rotation of the photosensitive drum. Even if a control operation is carried out so as to reduce variations in the rotation of the photosensitive drum, there still exist the eccentricity of the photosensitive drum, the eccentricity of the surface of the photosensitive drum as a result of its attachment, and the eccentricity of the rotary shaft of the photosensitive drum or the belt drive rollers, due to clearance errors. These eccentricities cause AC color misregistration, which in turn results in degraded picture quality.

Further, in the conventional color image forming apparatus, the AC components arising during one cycle of the photosensitive drums 203 of the image forming units 200K, 200Y, 200M, and 200C, are out of phase with each other within a certain section of the transfer belt 202, as shown in FIG. 41, provided that one cycle of respective photosensitive drums 203K, 203Y, 203M, and 203C is T. This is also another cause of the degraded picture quality due to the AC color misregistration.

SUMMARY OF THE INVENTION

The present invention has been conceived to solve the previously described drawbacks in the prior art, and the object of the present invention is to provide an image forming apparatus that is capable of preventing the degradation of picture quality due to AC color misregistration as well as reducing the influence of the eccentricity of image carriers themselves, or an endless carrier itself, of the image forming apparatus, the eccentricity resulting from the attachment of the image carriers or the endless carrier, or the eccentricity due to clearance errors of a rotary shaft, by individually controlling the phase of rotation of at least one of the image carriers and the endless carrier of the image forming apparatus.

An image forming apparatus, according to the present invention, which forms images in different colors by means of at least one image forming means having an image carrier, and which forms an image by directly transferring the images in different colors formed by the image forming means onto transfer material carried on an endless carrier to be rotated or on the endless carrier, the image forming apparatus comprising: rotational phase control means for individually controlling the phase of rotation of at least one of the image carriers and the endless carrier of the image forming means.

The-above-mentioned image forming apparatus is configured so as to comprise rotational phase control means for individually controlling the phase of rotation of at least one of the image carriers and the endless carrier of the image forming means. By virtue of this configuration, it is possible to reduce the influence of the eccentricity of the image carriers or the endless carrier of the image forming apparatus, the eccentricity resulting from the attachment of the image carriers or the endless carrier, or the eccentricity due to clearance errors of a rotary shaft, by individually controlling the phase of rotation of at least one of the image carriers and the endless carrier of the image forming apparatus.

An image forming apparatus, according to the present invention, which forms images in different colors by means of at least one image forming means having an image carrier, and which forms an image by directly transferring the images formed in different colors by the image forming means, onto transfer material carried on an endless carrier to be rotated or on the endless carrier, the image forming apparatus comprising: phase detection means for detecting the phase of rotation of at least one of the image carriers and the endless carrier of the image forming means; and rotational phase control means for individually controlling the phase of rotation of at least one of the image carriers and the endless carrier of the image forming means on the basis of phase information detected by the phase detection means.

The above-mentioned image forming apparatus is configured so as to comprise phase detection means for detecting the phase of rotation of at least one of the image carriers and the endless carrier of the image forming means; and rotational phase control means for individually controlling the phase of rotation of at least one of the image carriers and the endless carrier of the image forming means on the basis of phase information detected by the phase detection means. By virtue of the above-described configuration, the phase of rotation of at least one of the image carriers and the endless carrier of the image forming means is detected by means of the phase detection means. It is possible to prevent an image from being affected by variations in the rotation of the image carriers, or the like, of the image forming means by means of the rotational phase control means. As a result, it is possible to improve the quality of a resultant picture.

As shown in FIG. 1, an image forming apparatus according to the present invention, that is arranged so as to form images in different colors by means of at least one of image forming means 02K, 02Y, 02M, and 02C having image carriers 01K, 01Y, 01M, and 01C; form an image by directly transferring the images, which are formed in different colors by the image forming means 02K, 02Y, 02M, and 02C, onto transfer material 04 placed on an endless carrier 03 to be rotated or on the endless carrier; form a color difference detection pattern 05 on the endless carrier 03 to be rotated; sample the color difference detection pattern 05; and control the difference between a plurality of toner images which are directly formed in different colors on the transfer material 04 placed on the endless carrier 03 to be rotated or on the endless carrier, the image forming apparatus comprising: color difference detection pattern output means 06 that outputs an image signal to produce the color difference detection pattern 05 for detecting periodic rotational variations arising in the image forming apparatus, to the image forming means; pattern detection means 07 for detecting the color difference detection pattern 05 formed on the endless carrier 03; phase detection means 06 for detecting the phase of rotation of at least one of the image carriers 01K, 01Y, 01M, and 01C of the image forming means on the basis of a detection signal received from the pattern detection means 07; and rotational phase control means 06 for individually controlling the phase of rotation of at least one of the image carriers 01K, 01Y, 01M, and 01C of the image forming means and the endless carrier 03 on the basis of the phase information detected by the phase detection means 06.

The above-mentioned image forming apparatus is configured so as to comprise color difference detection pattern output means that outputs an image signal to produce a color difference detection pattern for detecting periodic rotational variations arising in the image forming apparatus, to the image forming means; pattern detection means for detecting the color difference detection pattern formed on the endless carrier; phase detection means for detecting the phase of rotation of at least one of the image carriers of the image forming means on the basis of a detection signal received from the pattern detection means; and rotational phase control means for individually controlling the phase of rotation of at least one of the image carriers of the image forming means and the endless carrier on the basis of the phase information detected by the phase detection means. By virtue of the above-described configuration, a color difference detection pattern for detecting periodic rotational variations arising in the image forming apparatus is formed on the endless carrier. The thus-formed color difference detection pattern is detected by the pattern detection means. The phase detection means detects the phase of rotation of at least one of the image carriers and the endless carrier of the image forming means, on the basis of the detection signal received from the pattern detection means. As a result, the periodic rotational variations arising in the image forming apparatus are detected with high accuracy. The rotational phase control means can prevent an image from being affected by variations in the rotation of the image carriers, or the like, of the image forming means, which in turn makes it possible to improve picture quality to a much greater extent.

According to the present invention, the rotational phase control means is arranged to individually control the phase of rotation of at least one of the image carriers and the endless carrier of the image forming means such that the images to be transferred at the same transfer point on the endless carrier become in phase with each other.

The above-mentioned image forming apparatus is configured such that the rotational phase control means individually controls the phase of rotation of at least one of the image carriers and the endless carrier of the image forming means so that the images to be transferred at the same transfer point on the endless carrier become in phase with each other. By virtue of the above-described configuration, even if variations arise in the rotation of the image carriers and the endless carrier of the image forming means, it is possible to prevent, an image from being affected by the variations in the rotation of the image carriers, or the like.

According to the present invention, the image forming apparatus comprises a plurality of image forming means having image carriers; and a control reference clock that is shared between the plurality of image forming means and controls the rotation of the image carrier of each image forming means.

The above-mentioned image forming apparatus is configured so as to comprise a plurality of image forming means having image carriers; and a control reference clock that is shared between the plurality of image forming means and controls the rotation of the image carrier of each image forming means. By virtue of the above-described configuration, the image carriers of the plurality of image forming means can be rotated so as to become in phase with each other, which makes it easy to cause the variations in the rotation of the image carriers to be in phase with each other.

According to the present invention, the rotational phase control means is arranged to individually control the phase of rotation of at least one of the image carriers and the endless carrier of the image forming means by idling it.

The above-mentioned image forming apparatus is configured such that the rotational phase control means individually controls the phase of rotation of at least one of the image carriers and the endless carrier of the image forming means by idling it. By virtue of the above-described configuration, it is possible to easily control the phase of the image carrier, or the like, of the image forming means.

According to the present invention, the rotational phase control means is arranged to individually control the phase of rotation of at least one of the image carriers and the endless carrier of the image forming means by changing the rotating speed thereof.

The above-mentioned image forming apparatus is configured such that the rotational phase control means individually controls the phase of rotation of at least one of the image carriers and the endless carrier of the image forming means by changing the rotating speed thereof. By virtue of the above-described configuration, it is possible to accurately control the phase of the image carrier, or the like, of the image forming means without stopping the image carriers and the endless carrier of the image forming means.

According to the present invention, the rotational phase control means comprises detaching means for detaching the image carriers from the endless carrier of the image forming means in controlling the rotational phase of at least one of the image carriers and the endless carrier of the image forming means.

The above-mentioned image forming apparatus is configured such that the rotational phase control means comprises detaching means for detaching the image carriers from the endless carrier of the image forming means when the rotational phase control means controls the phase of rotation of at least one of the image carriers and the endless carrier of the image forming means by changing the rotating speed thereof. By virtue of the above-described configuration, it is possible to prevent the surface of image carriers from being damaged as a result of the contact between the image carriers and the endless carrier of the image forming means when the phases of the image carriers of the image forming means are controlled.

According to the present invention, the rotational phase control means is arranged to carry out phase control operations at the timing during which no image is formed.

The image forming apparatus is configured such that the rotational phase control means carries out phase control operations at the timing during which no image is formed. By virtue of the above-described configuration, it is possible to ensure prevention of the occurrence of imperfects in an image during the course of preparation thereof.

According to the present invention, the image forming apparatus comprises a plurality of image forming means having image carriers, wherein all the image carriers that possess the same mechanical characteristics from a manufacturing viewpoint are used as the image carriers of the plurality of image forming means.

The above-mentioned image forming apparatus is configured so as to comprise a plurality of image forming means having image carriers, wherein all the image carriers that possess the same mechanical characteristics from a manufacturing viewpoint are used as the image-carriers of the plurality of image forming means. Even when the image carriers of the image forming apparatus are replaced, it is possible to match the image carriers, or the like, with each other with regard to the phase and amplitude of rotational variations, because the image carriers have the same mechanical characteristics. As a result, it is possible to ensure improvements in picture quality by means of the phase control.

According to the present invention, the pattern detection means detects the phase of periodic rotational variations arising during one cycle of at least one of the image carriers and the endless carrier of the image forming means by detecting a color difference detection pattern that is N times (N: a natural number) the circumference of one rotation of the image carriers or the endless carrier of the image forming means; and the phase detection means detects the phase of rotation of at least one of the image carriers and the endless carrier of the image forming means on the basis of a detection signal of the color difference detection pattern.

The above-mentioned image forming apparatus is configured such that the pattern detection means detects the phase of periodic rotational variations arising in one cycle of at least one of the image carriers and the endless carrier of the image forming means by detecting a color difference detection pattern that is N times (N: a natural number) the circumference of one rotation of the image carriers or the endless carrier of the image forming means; and that the phase detection means detects the phase of rotation of at least one of the image carriers and the endless carrier of the image forming means on the basis of a detection signal of the color difference detection pattern. With the above-described configuration, rotational variations in excess of one rotation of the image carrier or the endless carrier of the image forming means can be detected by means of the color difference detection pattern. As a result, a phase can be detected so as to correctly correspond to the variations in rotation of the image carrier or the endless carrier of the image forming means.

According to the present invention, the phase detection means detects a phase value from the information from which the color difference detection pattern corresponding to N rotations of the image carriers or the endless carrier of the image forming means have been detected, every one rotation of the image carriers or the endless carrier of the image forming means, as well as detecting the mean value of the phase values corresponding to N rotations as the phase of rotation of the image carriers or the endless carrier of the image forming means.

The above-mentioned image forming apparatus is configured such that the phase detection means detects a phase value from the information, from which the color difference detection pattern corresponding to N rotations of the image carriers or the endless carrier of the image forming means have been detected, every one rotation of the image carriers or the endless carrier of the image forming means, and then detects the mean value of the phase values corresponding to N rotations, as the phase of rotation of the image carriers or the endless carrier of the image forming means. With the above-described configuration, the phase of variations in the rotation of the image carrier or the endless carrier of the image forming means can be accurately detected by obtaining the mean value of the phase values corresponding to N rotations of the image carrier or the endless carrier of the image forming means.

According to the present invention, the pattern detection means detects a pattern corresponding to about one rotation of the endless carrier for each color difference detection pattern of each color formed on the endless carrier.

The above-mentioned image forming apparatus is configured such that the pattern detection means detects a pattern corresponding to one rotation of the endless carrier for each color difference detection pattern of each color formed on the endless carrier. As a result, the number of samples increases, and the image forming apparatus is prevented from being affected by AC components which are dependent on one rotation of the endless carrier. Therefore, variations in the rotation of the image carrier, or the like, can be accurately detected for each color difference detection pattern of each color.

According to the present invention, the phase detection means detects the phase of rotation of at least one of the image carriers and the endless carrier of the image forming means every one rotation thereof; calculates the mean value of rotational variation data on the rotational phases; and determines the phase of rotational variations of at least one of the image carriers and the endless carrier of the image forming means on the basis of the mean value of the rotational variation data.

The above-mentioned image forming apparatus is configured such that the phase detection means detects the phase of rotation of at least one of the image carriers and the endless carrier of the image forming means every one rotation thereof; calculates the mean value of rotational variation data on the rotational phases; and determines the phase of variations in the rotation of at least one of the image carriers and the endless carrier of the image forming means on the basis of the mean value of the rotational variation data. With the above-described configuration, the phase of variations in the rotation of the image carrier, or the like, can be accurately detected by obtaining the mean value of the rotational variation data, and determining the phase of rotation of the image carrier, or the like, of the image forming means on the basis of the rotational variation data.

According to the present invention, the phase detection means detects the phase of rotation of at least one of the image carriers and the endless carrier of the image forming means every one rotation thereof; calculates the mean value of data on variations in the rotational phases; calculates the address of the minimum rotational variation of each color, the address of the maximum rotational variation of each color, the address of the rising edge of the rotational variations of each color, and the address of the falling edge of the rotational variations of each color, on the basis of the mean value of the variation data on the rotational phases; averages all the rotational phases of at least one of the image carriers and the endless carrier of the image forming means detected on the basis of the addresses; and determines the phase of variations in the rotation of at least one of the image carriers and the endless carrier of the image forming means on the basis of the mean value of the variation data on the rotational phases.

The image forming apparatus is configured such that the phase detection means detects the phase of rotation of at least one of the image carriers and the endless carrier of the image forming means every one rotation thereof; calculates the mean value of data on variations in the rotational phases; calculates the address of the minimum rotational variation of each color, the address of the maximum rotational variation of each color, the address of rising edge of the rotational variations of each color, and the address of the falling edge of the rotational variations, on the basis of the mean value of the variation data on the rotational phases; averages all the rotational phases of at least one of the image carriers and the endless carrier of the image forming means detected on the basis of the addresses; and determines the phase of variations in the rotation of at least one of the image carriers and the endless carrier of the image forming means on the basis of the mean value of the variation data on the rotational phases. With the above-described configuration, the phase of variations in the rotation of the image carrier, or the like, can be accurately detected.

According to the present invention, the color difference detection pattern is sampled after completion of rough or fine adjustment of DC color registration correction cycle, immediately after the power of the image forming apparatus has been turned on.

The above-mentioned image forming apparatus is configured such that the color difference detection pattern is sampled after completion of rough or fine adjustment of DC color registration correction cycle immediately after the power of the image forming apparatus has been turned on. As a result, the color difference detection pattern for detecting rotational variations can be accurately formed, which in turn enables detection of the phase of variations in the rotation of the image carrier, or the like, with high accuracy.

BRIEF DESCRIPTION OF THE DRAWINGS

FIGS. 15A and 15B are tables respectively showing the relationship between the frequency of rotational variations and a sampling frequency;

DETAILED DESCRIPTION OF THE PREFERRED EMBODIMENTS

With reference to illustrative embodiments, the present invention will be described hereinbelow.

Figure 2:
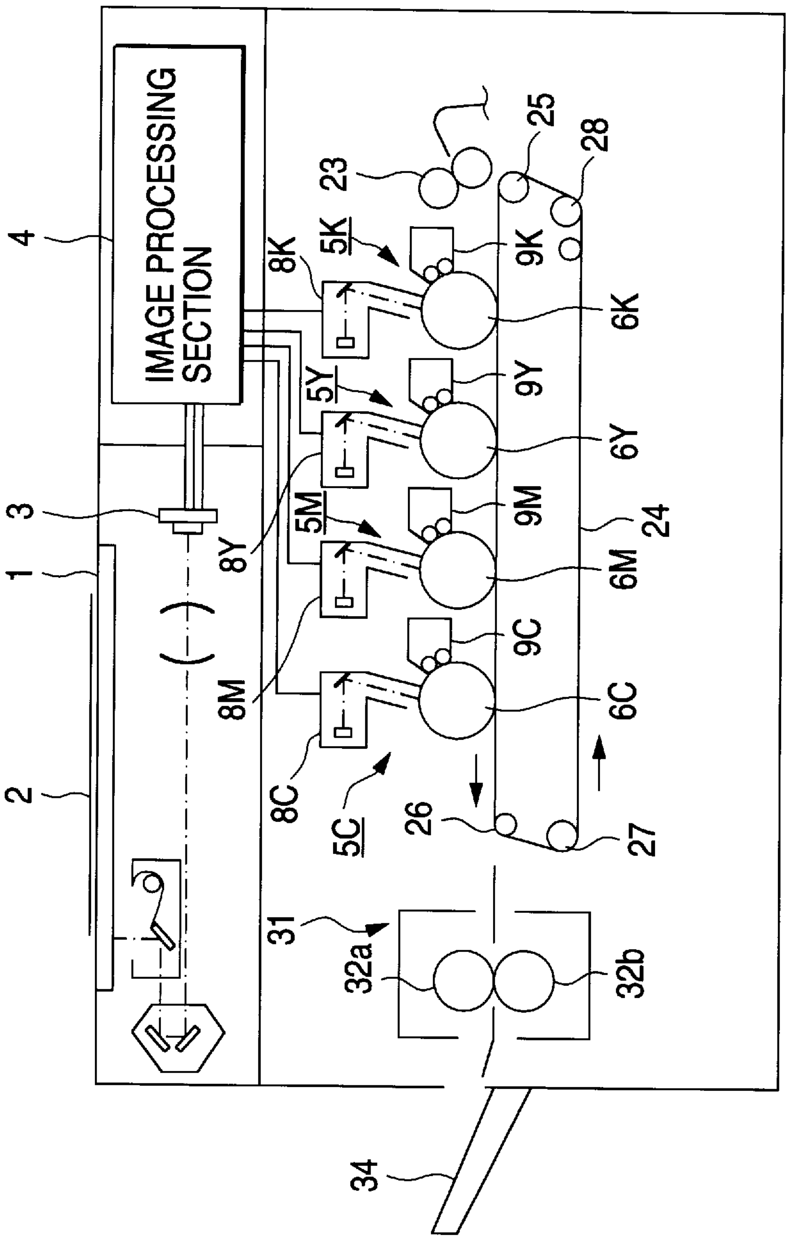
FIG. 2 is a schematic representation showing a digital color copier according to one embodiment of the present invention.

FIG. 2 is a schematic representation showing the overall configuration of a digital color copier which is one embodiment of an image forming apparatus of the present invention.

An original 2 placed on a platen glass 1 is read in the form of an analog RGB image signal by an image scanner equipped with a color CCD sensor 3 through a scanning optical system consisting of, e.g., the light source and a scanning mirror, in FIG. 2. The analog RGB image signal read by the color CCD sensor 3 is converted into image signals for K, Y, M, and C by an image processing section 4. The thus-converted image signals are temporarily stored in memory provided in the image processing section 4.

Figure 3:
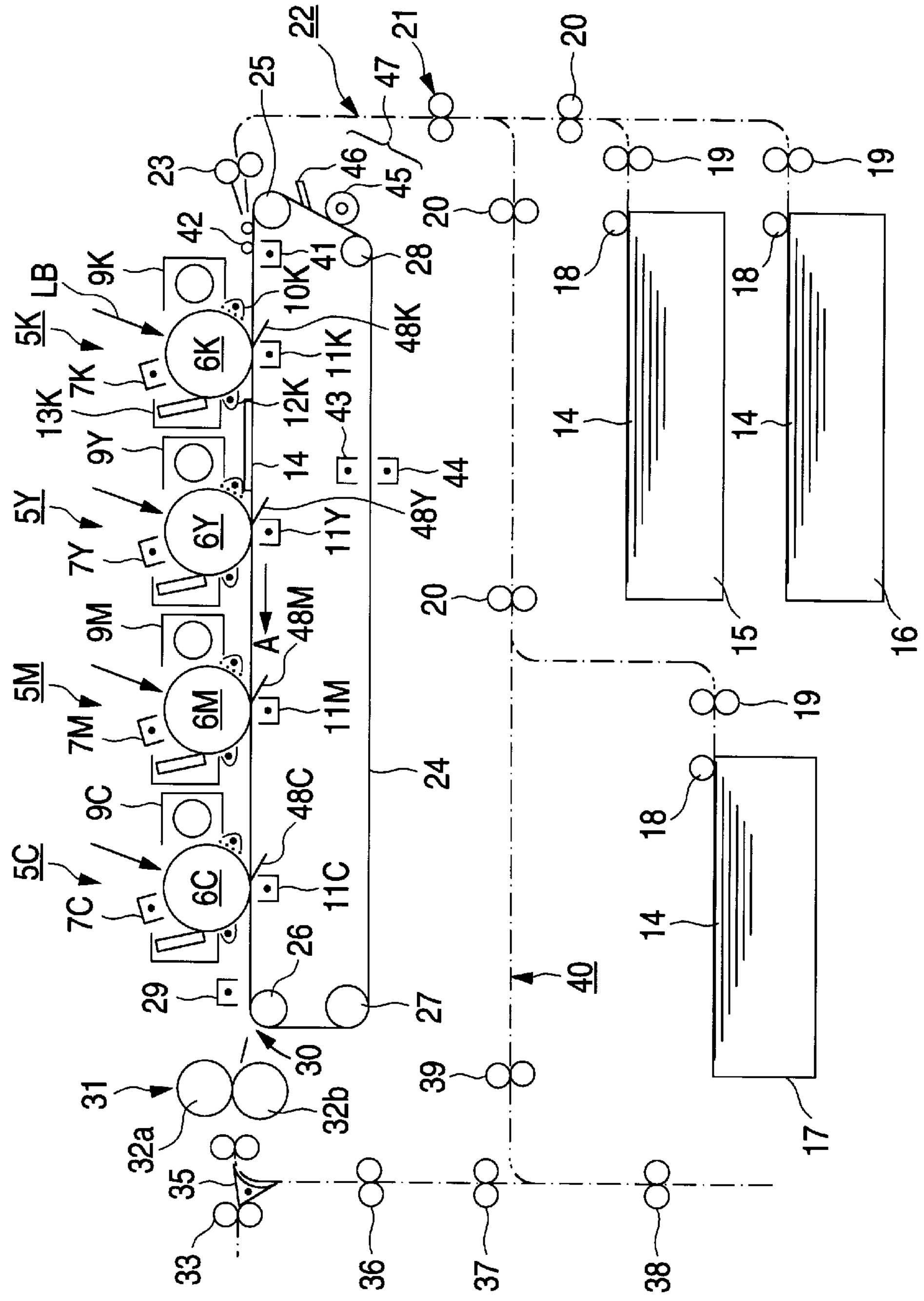
FIG. 3 is a schematic representation showing a digital color copier according to one embodiment of the present invention.

Image data of each color are sequentially output from the image processing section 4 to ROSs (Raster Output Scanners) 8K, 8Y, 8M, and 8C of image forming units 5K, 5Y, 5M, and 5C for black (K), yellow (Y), magenta (M), and cyan (C), as shown in FIGS. 2 and 3. The surfaces of photosensitive drums 6K, 6Y, 6M, and 6C are exposed to laser beams LB emitted from the ROSs 8K, 8Y, 8M, and 8C corresponding to the image data. The laser beams LB scan the surfaces of the photosensitive drum, whereby latent images are formed. The latent images formed on the photosensitive drums 6K, 6Y, 6M, and 6C are developed in the form of a black (K) toner image, a yellow (Y) toner image, a magenta (M) toner image, and a cyan (C) toner image by means of developing devices 9K, 9Y, 9M, and 9C.

Transfer paper 14 of a predetermined size, onto which the color toner images formed on the photosensitive drums 6K, 6Y, 6M, and 6C are transferred, is transported from any one of a plurality of paper-feed cassettes 15, 16, and 17 by way of a paper transport path 22 that consists of a paper-feed roller 18 and pairs of rollers 19, 20, and 21, as shown in FIG. 3. The transfer paper 14 supplied from any one of the paper-feed cassettes 15, 16, and 17 is fed onto a transfer belt 24 which serves as an endless carrier, by means of resist rollers 23 which are rotated at predetermined timing. The transfer belt 24 is endlessly wrapped around a drive roller 25, a stripping roller 26, a tension roller 27, and an idle roller 28 while being held under a predetermined tension. The transfer belt 24 is circularly rotated at a predetermined speed in the direction designated by the arrow by means of the drive roller 25 rotated by an unillustrated motor that is specifically designed to rotate the drive roller and has superior constant-rate characteristics. A belt used as the transfer belt 24 is made by forming a flexible synthetic resin film, e.g., PET, into a strip, and connecting together both ends of the synthetic resin film strip in the form of an endless belt by welding means, or the like.

A paper feed timing and the timing at which an image is written are determined such that the front edge of the transfer paper 14 transported by the transfer belt 24 and the front edge of the image on the first photosensitive drum 6k formed by the first image forming unit 5K agree with each other at the lowermost point of the photosensitive drum 6K, i.e., the transfer point. A visible image on the photosensitive drum 6K is transferred onto the transfer paper 14 that has reached the transfer point by means of a transfer corotron 11K. This transfer paper also arrives at the transfer point directly below the photosensitive drum 6Y. A visible image on the photosensitive drum 6Y is transferred onto the transfer paper 14 that has arrived at the transfer point directly below the photosensitive drum 6Y in the same manner as it is transferred by the photosensitive drum 6K. Similarly, the transfer paper 14 that has undergone all the transfer operations is further transported by the transfer belt 24. When the transfer sheet arrives at the vicinity of the stripping roller 26, the electric charge of the transfer sheet is removed by a charge-removing corotron 29 for detaching purposes. The transfer paper is then detached from the transfer belt 24 by means of the stripping roller 26 whose curvature radius is set to a small value and a peeling claw 30. Subsequently, the transfer paper 14 having four color toner images transferred thereon is fixed by a heating roller 32*a* and a presser roller 32*b* of a fixing device 31. The thus-fixed transfer paper is discharged to a paper receive tray 34 by a pair of discharging rollers 33, as shown in FIG. 2. As a result, a color image is copied.

In the case where a full color image is copied to both sides of the transfer paper 14, the transfer paper 14 having a color image formed on one side thereof is not discharged, exactly as it is, by the pair of discharging rollers 33, as shown in FIG. 3. The direction in which the transfer paper 14 is transported is switched to a downward direction by a switching plate 35. While being turned inside out, the transfer sheet 14 is transported onto the transfer belt 24 again through the transfer path 22 by way of a paper transport path 40 that consists of paris of paper transport rollers 36, 37, 38, and 39. A color image is formed on the reverse side of the transfer paper 14 through the same process as previously described.

The four image forming units 5K, 5Y, 5M, and 5C of black, yellow, magenta, and cyan, are all constructed in the same manner, as shown in FIG. 3. As having been previously described, these four image forming units 5K, 5Y, 5M, and 5C are configured such that black, yellow, magenta, and cyan toner images are formed one after another at predetermined timing. The image forming units 5K, 5Y, 5M, and 5C are respectively provided with the photosensitive drums 6K, 6Y, 6M, and 6C as image carriers. The surfaces of the photosensitive drums 6K, 6Y, 6M, and 6C are evenly charged by primary-charging corotrons 7K, 7Y, 7M, and 7C. The surfaces of the photosensitive drums 6K, 6Y, 6M, and 6C are exposed to the respective laser beams LB for forming an image emitted from the ROSs 8K, 8Y, 8M, and 8C corresponding to the image data. The laser beams LB scan the surfaces of the photosensitive drums, whereby a latent image for each color is formed. The latent images formed on the surfaces of the photosensitive drums 6K, 6Y, 6M, and 6C are developed into visible toner images using black (K) toner, yellow (Y) toner, magenta (M) toner, and cyan (C) toner by means of the developing devices 9K, 9Y, 9M, and 9C of the image forming units 5K, 5Y, 5M, and 5C. After having undergone pretransfer charging operations of the pre-transfer chargers 10K, 10Y, 10M, and 10C, the visible toner images are sequentially transferred onto the transfer paper 14 held on the transfer belt 24 by means of the electric charge of the transfer electrostatic chargers 11K, 11Y, 11M, and 11C. The transfer paper 14 having the black, yellow, magenta, and cyan toner images transferred thereon is detached from the transfer belt 24. Then, the thus-detached transfer paper is subjected to a fixing operation by a fixing unit 31, whereby a color image is formed.

The transfer paper 14 is supplied from any one of the plurality of paper-feed cassettes 15, 16, and 17. The thus-supplied transfer paper 14 is carried onto the transfer belt 24 at predetermined timing by means of the resist rollers 23, as well as being retained on and transported by the transfer belt 24 by means of an electrostatic charger 41 for retaining the paper and electrification rollers 42.

After the toner images have been transferred to the transfer paper, pre-cleaning charge removers 12K, 12Y, 12M, and 12C remove electric charge from the photosensitive drums 6K, 6Y, 6M, and 6C. Then, cleaners 13K, 13Y, 13M, and 13C remove residual toner from the photosensitive drums 6k, 6Y, 6M, and 6C, whereby the photosensitive drums prepare for the next image forming process.

After the transfer paper 14 has been detached from the transfer belt 24, the electrostatic charge of the transfer belt 24 is removed by means of a pair of charge-removing corotrons 43 and 44 for use with the transfer belt, during the course of circulation of the transfer belt. In addition, a cleaning device 47 consisting of a rotary brush 45 and a blade 46 removes toner or paper dust from the surface of the transfer belt 24.

Figure 4:
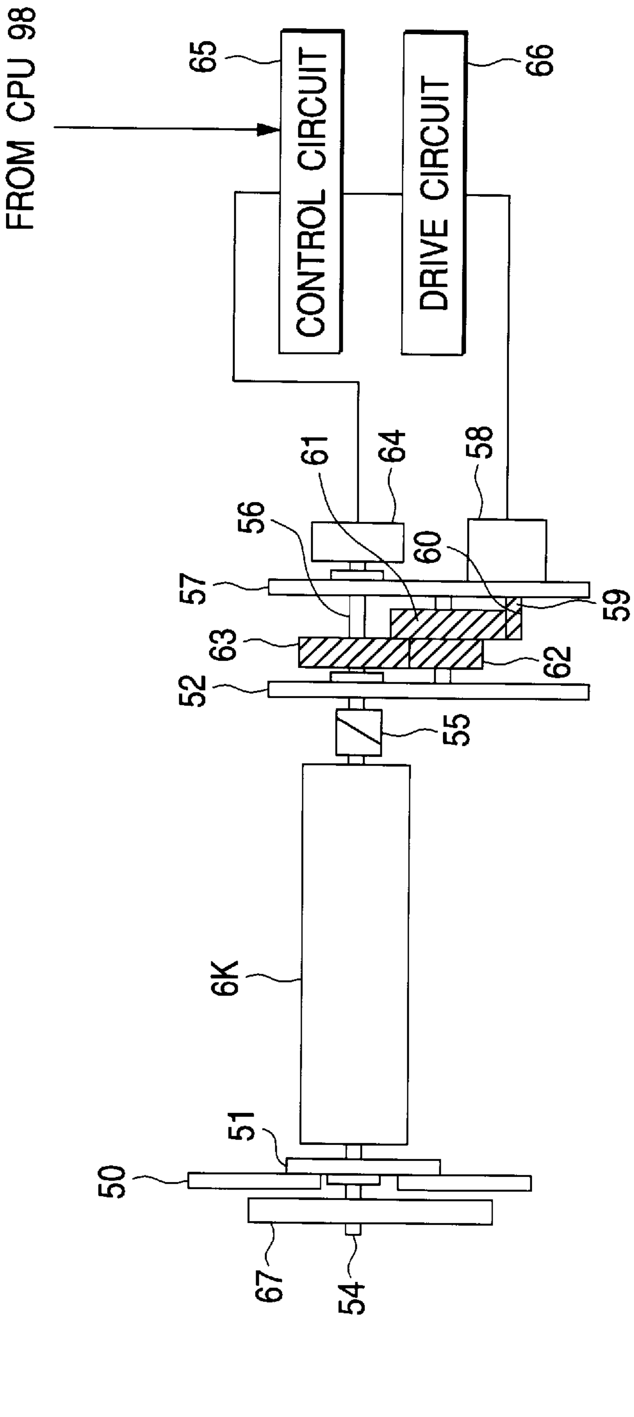
FIG. 4 is a block diagram showing a driving device of a photosensitive drum.

In the digital color copier having the previously-described construction, the following device is used as a device for rotating the photosensitive drums 6K, 6Y, 6M, and 6C. Each of the photosensitive drums 6K, 6Y, 6M, and 6C is provided with the rotating device that has the same construction. The device for rotating the photosensitive drum will be described herein with reference to the photosensitive drum 6K. As shown in FIG. 4, the driving device of the photosensitive drum has a first frame 50 positioned on the front side of the main body of the copier, a sub-frame 51 attached to the first frame 50, and a second frame 52 positioned in parallel with the first frame 50. The photosensitive drum 6K is rotatively supported between the first frame 50 and the second frame 52. A drive shaft 56 is connected to a rotary shaft 54 of the photosensitive drum 6K via a coupling 55, as well as being rotatively supported between the second frame 52 and a third frame 57. The above-described photosensitive drum 6K is rotated by the drive motor 58, a motor shaft gear 60 attached to a rotary shaft 59 of the drive motor 58, a first intermediate gear 61 that meshes with the motor shaft gear 60, a second intermediate gear 62 fixed to the same shaft that is connected to the first intermediate gear 61, and a photosensitive material drive gear 63 that meshes with the second intermediate gear 62 and is fixed to the drive shaft 56 of the photosensitive drum 6K. An encoder 64 is attached to the drive shaft 56 of the photosensitive drum 6K. This encoder 64 detects the state of rotation of the photosensitive drum 6K. A resultant detection signal is fed back to a drive circuit 66 of the drive motor 58 via a control circuit 65 so as to rotate the photosensitive drum 6K at a constant speed. In the drawing, reference numeral 67 designates a flywheel attached to the rotary shaft 54 of the photosensitive drum 6K.

The drive roller 25 that rotates the transfer belt 24 is rotatively driven by the same driving device as that of the photosensitive drum 6.

As previously described, each of the photosensitive drums 6K, 6Y, 6M, and 6C is provided with a rotating device that has the same construction. The control circuit 65 drives and controls the respective photosensitive drums 6K, 6Y, 6M, and 6C via the drive circuit 66. This drive circuit 6 has a reference clock that provides a reference signal for driving the drive motor 58 at a constant rotating speed.

The drive circuit 66 of the photosensitive drums 6K, 6Y, 6M, and 6C is arranged to use a common standard clock signal in the present embodiment. In short, the drive circuit 66 of the photosensitive drums 6K, 6Y, 6M, and 6C receives a reference clock signal output from the same reference clock generator. If the plurality of photosensitive drums 6K, 6Y, 6M, and 6C and the transfer belt 24 individually use reference clock signals as reference clock signals for controlling purposes, the relationship between the reference clock signals with regard to phase may be lost as a result of driving operations over a long period of time. For this reason, it is possible to prevent the relationship between the photosensitive drums 6K, 6Y, 6M, and 6C and the transfer belt 24 with regard to phase from being lost by use of the common reference clock signal between them.

Figure 5:
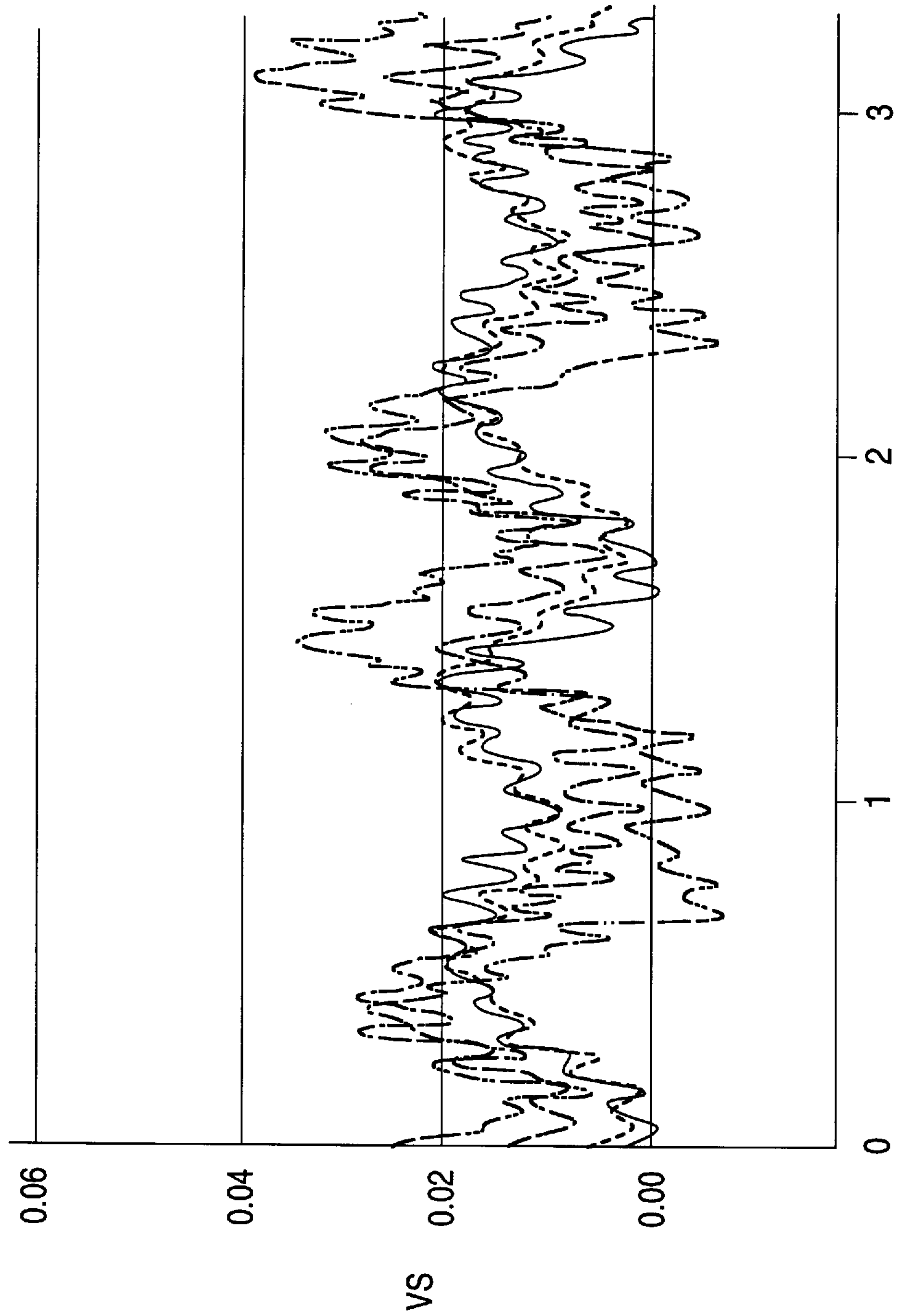
FIG. 5 is a plot showing variations in the rotation of a photosensitive drum for each color.

In the digital color copier having the previously described configuration, rotational variations that have a comparatively high frequency and change in a short cycle, such as a so-called walking phenomenon resulting from the shift of the transfer belt 24 in the direction orthogonal to the direction of travel of the belt, are caused by one cycle of the photosensitive drums 6K, 6Y, 6M, and 6C, one cycle of the drive roller 25, and oscillatory and eccentric components of the gears 60, 61, 62, and 63 for driving the photosensitive drums. These rotational variations appear rotational variations of each color, that is, black, yellow, magenta, and cyan, as shown in FIG. 5.

Figure 6:
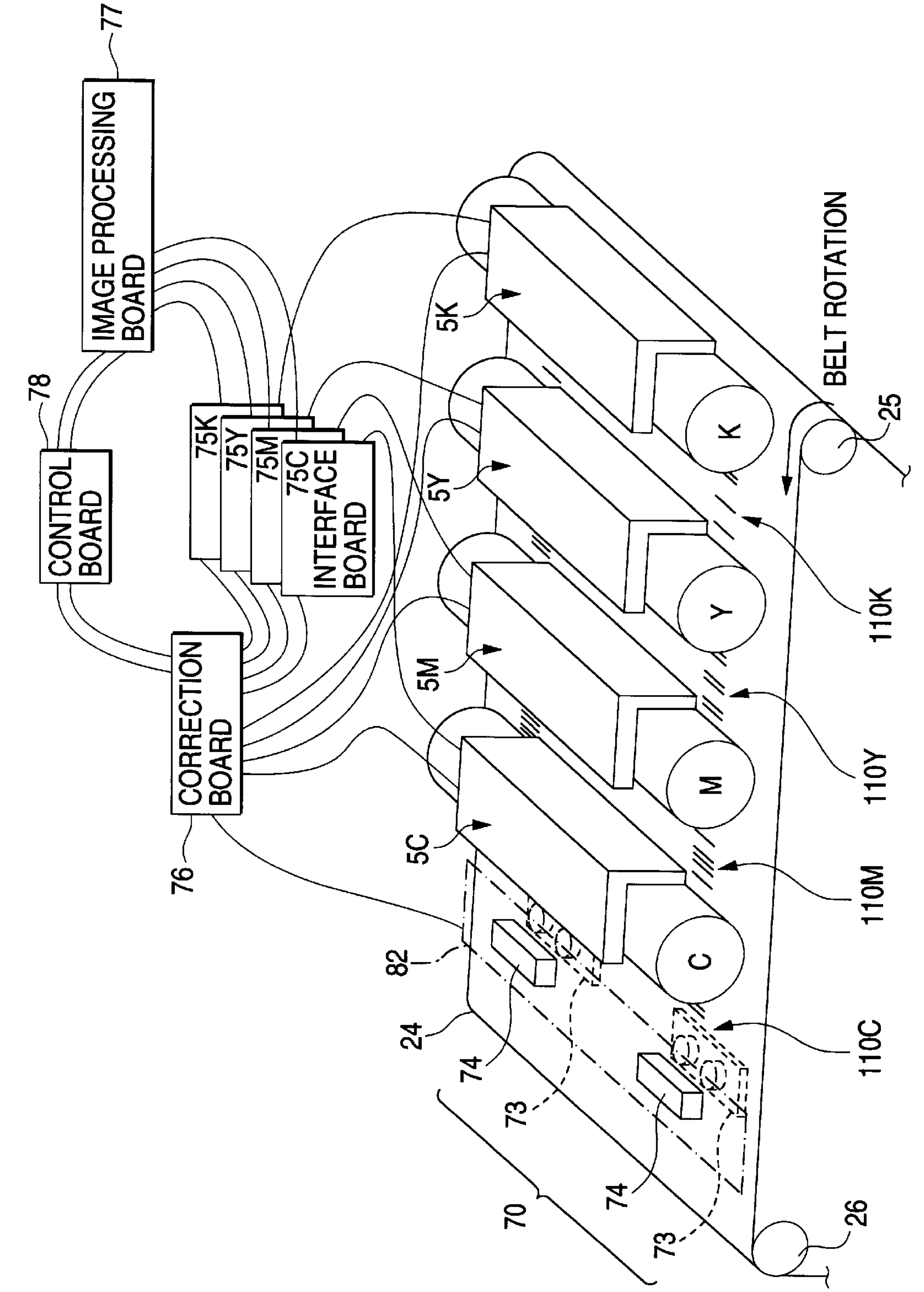
FIG. 6 is a perspective schematic representation showing the digital color copier according one embodiment of the present invention.

FIG. 6 is a schematic representation showing the image forming sections of the digital color copier together with the control section.

In the drawing, reference numeral 70 designates color difference detection means for detecting color difference pattern images 71 and 110 formed on the transfer belt 24 by the image forming units 5K, 5Y, 5M, and 5C. The pattern detection means 70 comprises two pairs of light source 73 and light-receiving element 74, each pair being provided on each side of an image area of the transfer belt 24 in a widthwise direction thereof. The light source 73 comprises an LED for providing background light that is necessary to detect the color difference detection pattern image 71 formed on the transfer belt 24. The light-receiving element 74 is positioned so as to be opposite to the light source 73 via the transfer belt 24, as well as comprising a linear light-receiving element, that is, a CCD that consists of a plurality of light-receiving pixels arranged in a line.

Reference numerals 75K, 75Y, 75M, and 75C designate interface boards for feeding an image signal to the ROSs 8K, 8Y, 8M, and 8C within the image forming units 5K, 5Y, 5M, and 5C. Reference numeral 76 designates a correction board for controlling a color difference correction system; 77, an image processing board that controls memory and elements related to image processing by one operation; and 78, a control board for managing all the above-described boards and the operation of the overall digital color copier.

Figure 7:
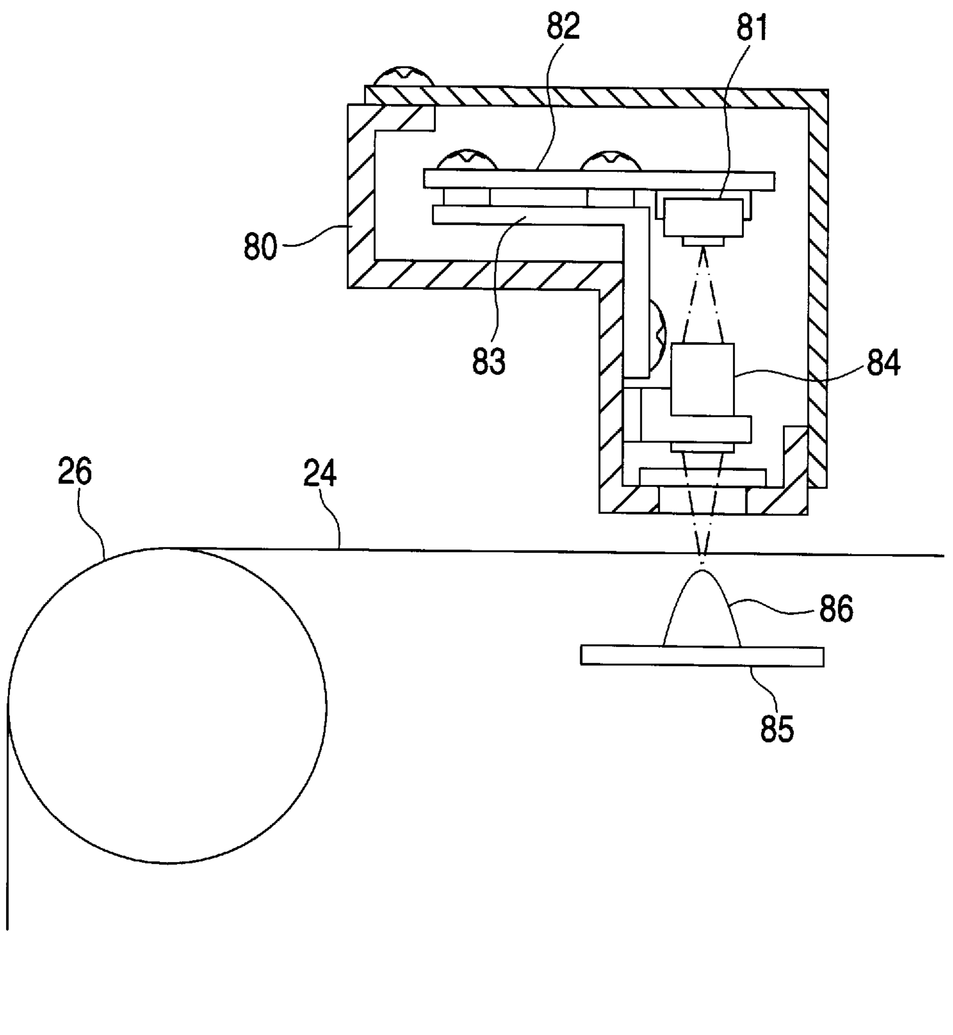
FIG. 7 is a cross-sectional view of a sensor.

FIG. 7 is a cross-sectional view of the above-described color difference pattern detection means.

In the drawing, reference numeral 80 designates a housing of the pattern detection means; 81, a linear CCD that serves as the light-receiving element 74; and 82, a board on which the linear CCD 81 and peripheral circuits for driving the linear CCD 81 are implemented. The board 82 is attached to the housing 80 via an angle 83 having an L-shaped cross section. Reference numeral 84 designates a refractive-index distributed lens array; and 85, a board on which an illuminating light source 86, serving as the light source 74, and peripheral circuits for actuating the illuminating light source 86 are mounted.

Figure 8:
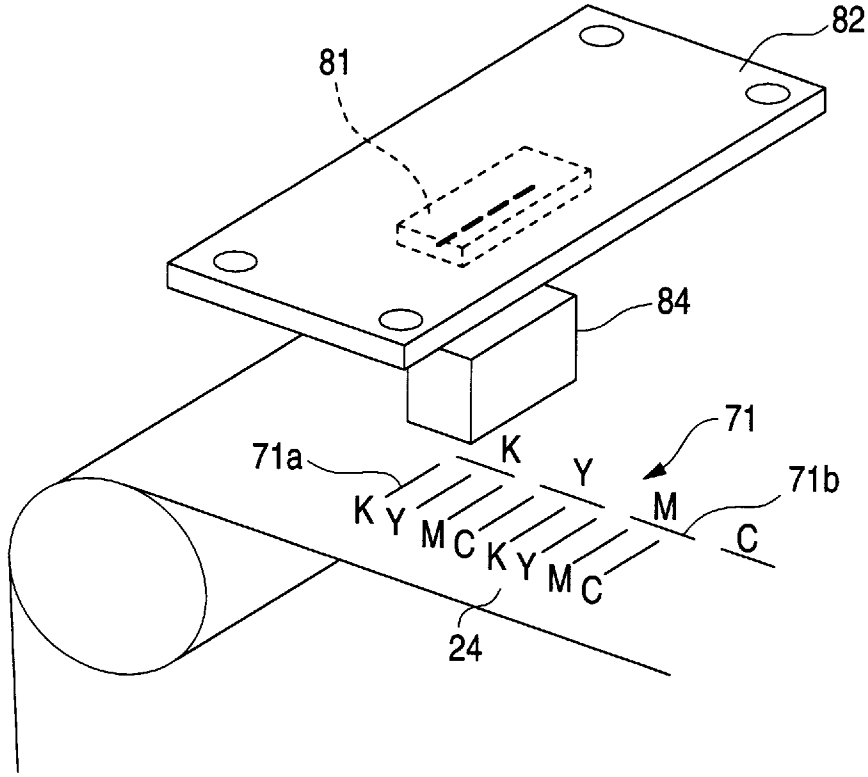
FIG. 8 is a perspective view of the sensor.

FIG. 8 is a schematic representation three-dimensionally showing the positional relationship between the sensor board 82, the refractive-index distributed lens array 84, and the pattern 71 for detecting the position of an image on the transfer belt 24. Two pairs of sensor board 82 and refractive-index distributed lens array 84, both being shown in FIG. 8, are disposed in the housing 8. Further, the housing 80 is disposed on each side of the image area of the transfer belt 24 in the widthwise direction thereof. The linear CCD 81 mounted on one sensor board 82 is intended to detect the primary and secondary scanning directions of the color difference detection pattern 71 provided on the proximal side of the transfer belt, whereas the linear CCD 81 mounted on the other sensor board 82 is intended to detect the primary and secondary scanning directions of the color difference detection pattern 71 provided on the distal side of the transfer belt. The use of two sensors allows adjustments in every direction so as to eliminate color differences in the vicinity of the center of the copier in the direction of primary scanning, color differences in the vicinity of the center of the copier in the direction of secondary scanning, magnification errors in the directions of primary and secondary scanning, and angular errors with respect to the direction of primary scanning. However, for example, if only the adjustments in the primary scanning direction are carried out, it is only necessary to use one detection sensor. The housing 80 that incorporates two sensors having the previously-described configuration is disposed on each side of the image area of the transfer belt 24 in the widthwise direction thereof, as shown in FIG. 6.

An LED is used as the illuminating light source 86. If it is impossible to ensure the required range of illumination using one LED, a plurality of LEDs may be used. For example, if the starting position of scanning operations of the laser beam scanner, i.e., a shift in the primary scanning direction and a shift in the direction of transfer and transportation, or the secondary scanning direction, are detected at a comparatively proximate location by one linear CCD 81, one LED 86 is used. In contrast, if the starting position is detected in a comparatively distal location, two LEDs are used. If the light-collecting LED 86 is disposed close to the transfer belt 24, the width of illumination that is substantially equal to the outline of the LED is obtained. Only a few LEDs are illuminated, and hence the power consumption of the LEDs can be reduced to a very small level.

Figure 9:
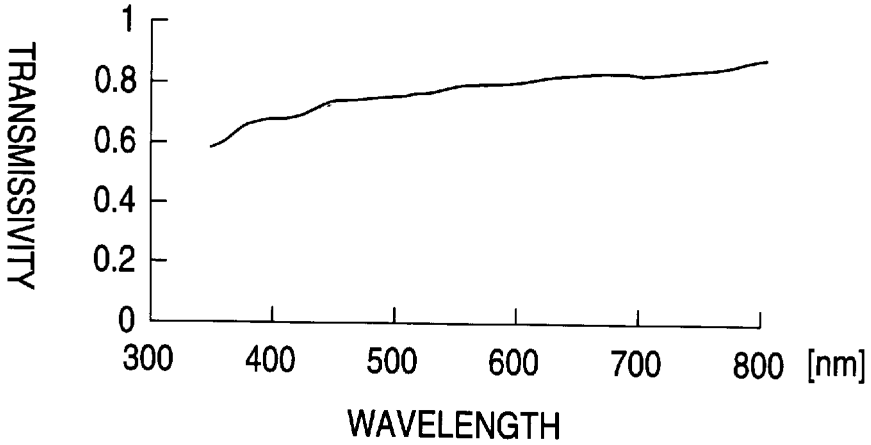
FIG. 9 is a plot showing the relationship between transmissivity and wavelength.
Figure 10:
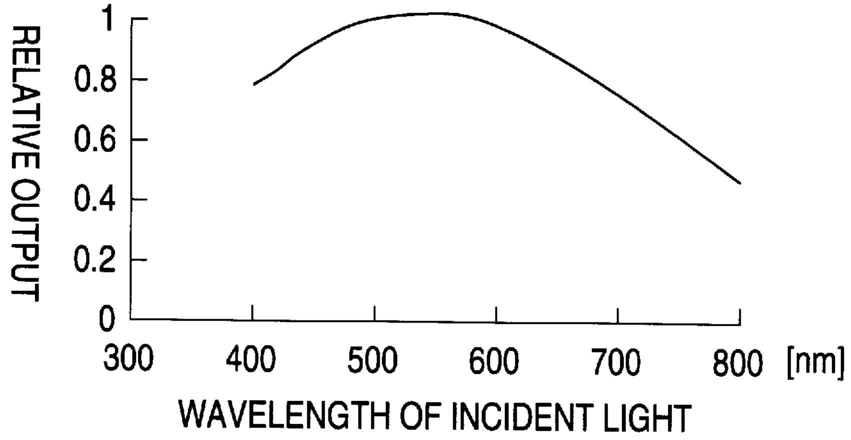
FIG. 10 is a plot showing the relationship between a relative output and the wavelength of incident light of the sensor.
Figure 11:
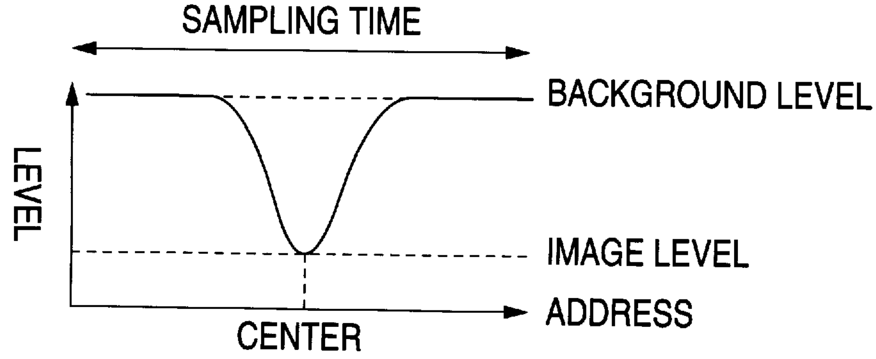
FIG. 11 is a waveform showing an output of the sensor.

The transparent belt 24 that consists of, e.g., PET (polyethylene terephthalate) is used as transfer and transportation means in the present embodiment. This transfer belt 24 is endlessly formed by connecting together both ends of a strip-shaped PET film by welding means or the like. The representative transmissivity of the transfer and transportation belt 24 increases as the wavelength of light becomes longer, as shown in FIG. 9. FIG. 10 shows the representative sensitivity of the CCD 31. The CCD 31 has superior sensitivity in the area of visible rays. In contrast, the emission wavelength of the LED 86 that provides high luminance lies in a red region (600–700 nm). The combination of the transfer belt and the LED makes it possible to provide a large sensor output. Upon arrival of the pattern image 71 at a detection position on the transfer belt 24, the transmissivity of the area of the transfer belt where the pattern image is situated becomes close to zero, because the pattern image 71 is opaque regardless of the color of the toner that forms the pattern image. As a result, the sensor output becomes very small. The larger the difference between sensor outputs, the more stable detecting operation becomes feasible. FIGS. 10 and 11 show output examples of the color copier having the previously-described configuration. As can be seen from these drawings, substantially the same output is obtained with respect to colors K, Y, M, and C.

Figure 12:
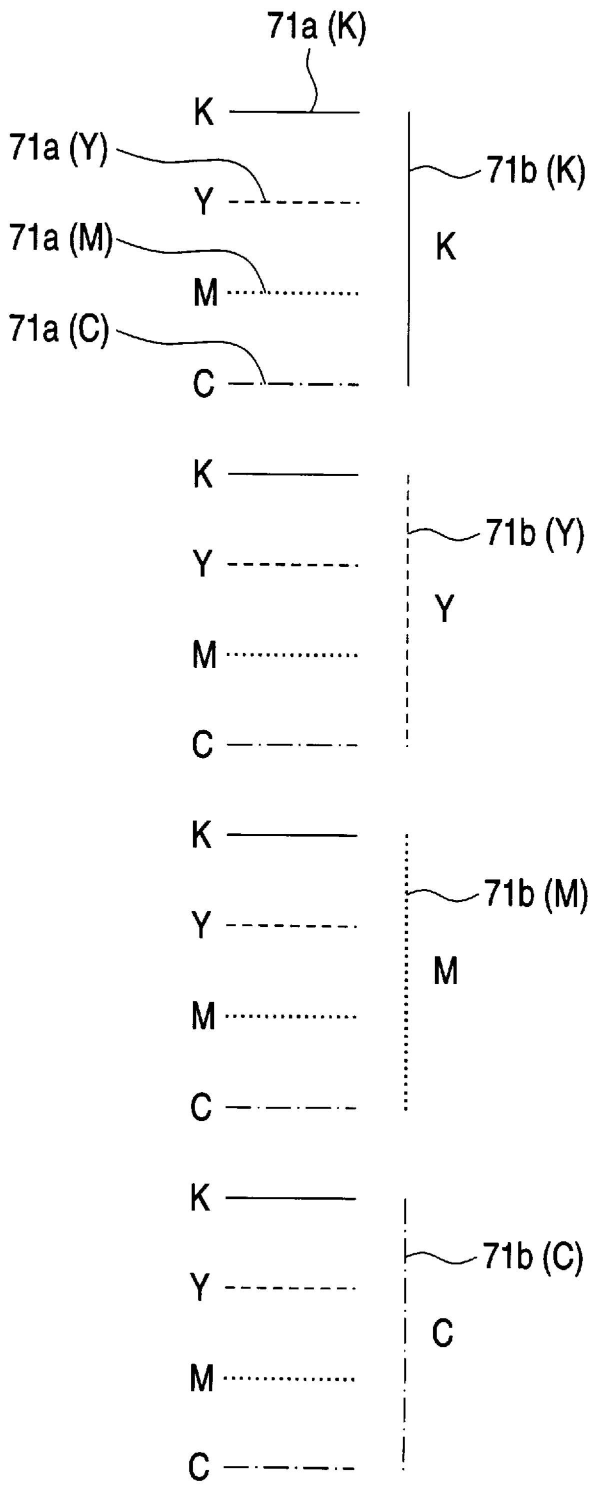
FIG. 12 is a plan view showing a DC misregistration measurement pattern.

The DC color difference detection pattern 71 comprises, e.g., color difference detection patterns 71*b*(K), 71*b*(Y), 71*b*(M), and 71*b*(C) for detecting a shift in the primary scanning direction orthogonal to the direction in which the transfer belt 24 travels, and color difference detection patterns 71*a*(K), 71*a*(Y), 71*a*(M), and 71*a*(C) provided in the primary scanning direction for detecting a shift in the secondary scanning direction in which the transfer belt 24 travels, as shown in FIG. 12. A set of color difference detection patterns 71*a*(K), 71*a*(Y), 71*a*(M), 71*a*(C), 71*b*(K), 71*b*(Y), 71*b*(M), and 71*b*(C) are transferred in multiple to predetermined locations over the entire circumference of the transfer belt 24 so that the color difference pattern detection means 70 disposed on the distal and proximal sides of the image forming units can read the patterns, as shown in FIG. 6. Strip patterns that serve as the linear portions of the respective colors black (K), yellow (Y), magenta (M), and cyan (C) are sequentially provided at predetermined intervals in the patterns 71*a*(K), 71*a*(Y), 71*a*(M), and 71*a*(C) for detecting color differences in the primary scanning direction and the patterns 71*b*(K), 71*b*(Y), 71*b*(M), and 71*b*(C) for detecting color differences in the secondary scanning direction.

Figure 13:
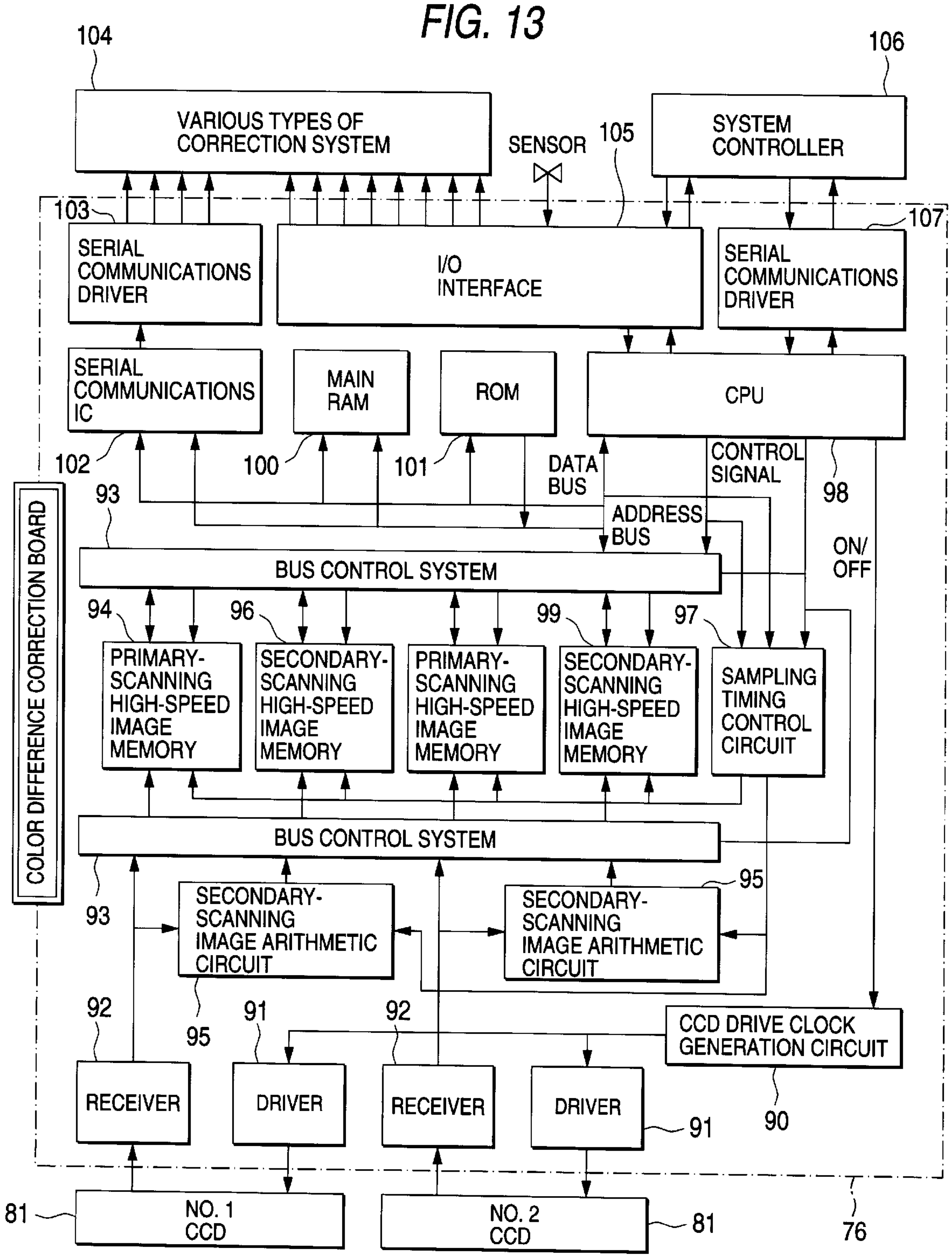
FIG. 13 is a block diagram of a control circuit of the digital color copier of the present invention.

FIG. 13 is a block diagram showing one example of the control section of the sampling device for color difference detection purposes according to the present embodiment. The control section is disposed in the correction board 76 shown in FIG. 6.

In the correction board 76, a driver 91 drives the linear CCD 81 according to the clock signal generated by a CCD drive clock generation circuit 90, whereby the linear CCD 81 sequentially sends read image data pixel by pixel, e.g., 8 bits of 256-level read image data, to a receiver 92. The image data related to the primary scanning operations are stored in primary-scanning high-speed image memory 94 through a bus control system 93. In contrast, the image data related to the secondary scanning operations are stored in secondary-scanning high-speed memory 96 through the bus control system 93 after having been averaged by a secondary-scanning image arithmetic circuit 95. A sample timing control circuit 97 controls sampling start timing set by a CPU 98, and the timing at which the image data are sent to the secondary-scanning image arithmetic circuit 95, the primary-scanning high-speed image memory 94, and the secondary-scanning high-speed image memory 96 according to sampling periods, or the like. Main RAM 100 is used as a work area of the CPU 98. ROM 101 stores control programs of the CPU 98. A serial communications IC 102 and a serial communications driver 103 transmit control data, such as setting parameters, from the CPU 98 to various types of correction systems 104. An I/O interface 105 is provided between the CPU 98 and the various types of correction systems 104, as well as outputting ON/OFF signals to the various types of correction systems 104. Further, the I/O interface 105 receives ON/OFF signals from the sensors, as well as exchanging the ON/OFF signals with respect to a system controller 106. A serial communications driver 107 exchanges data between the CPU 98 and the system controller 106.

Figure 1A:
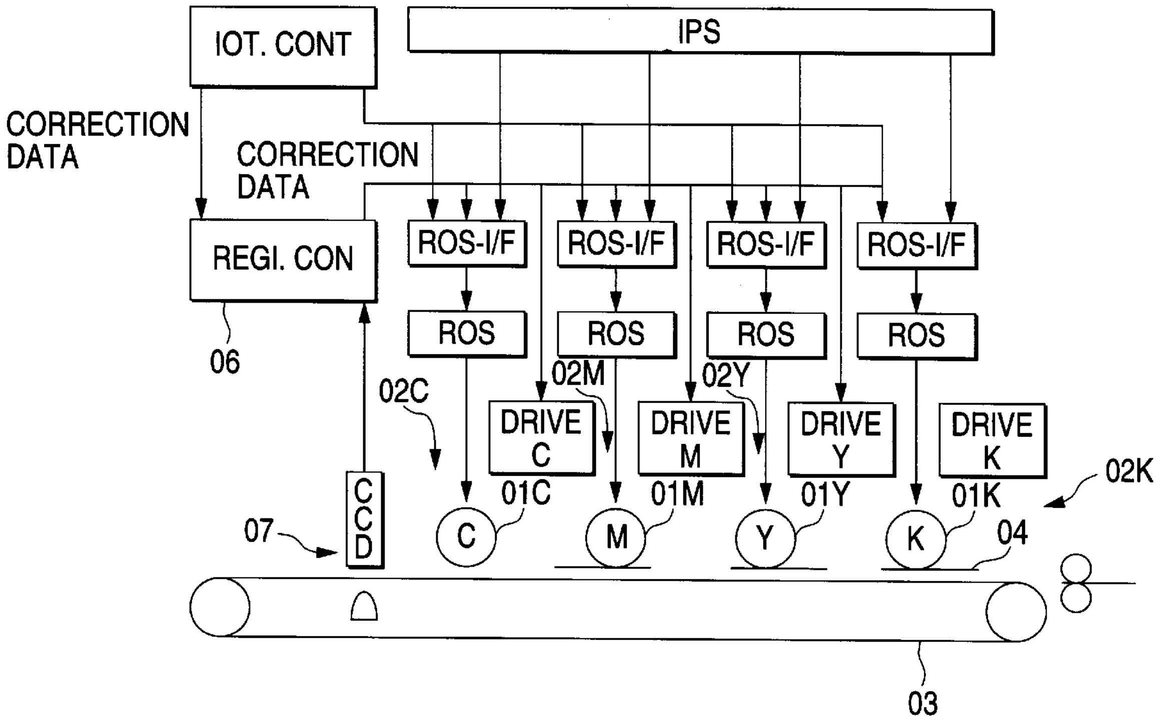
FIG. 1A is a schematic diagram showing an image forming apparatus according to the present invention.
Figure 1B:
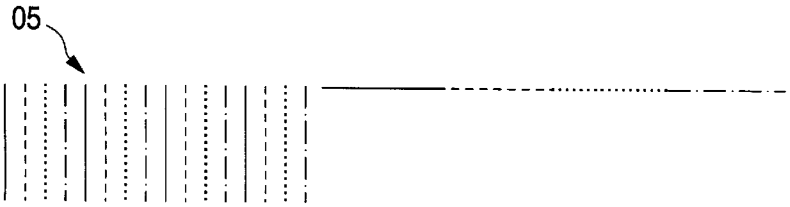
FIG. 1B is a plan view showing AC color difference detection pattern.

The CPU 98 controls the CCD drive clock generation circuit 90, the sample timing control circuit 97, and the bus control system 93 in order to read the image data of the pattern for measuring misregistration 71 output on the transfer belt 24, as well as determining the address of the position of the image. Then, the CPU 98 calculates the amount of misregistration from the image data and the address of the image position. As a result, the various types of correction systems 104 are controlled via the serial communications IC 102 and the serial communications IC 103 or the I/O interface 105 and the serial communications 107. The CPU 98 sends correction data to the control circuit 65, Drive-Y, Drive-M, and Drive-C shown in FIGS. 1A and 6 via the I/O interface 105. The control circuit 65 controls the photosensitive material drive motor 58 on the basis of the thus-received correction data.

The digital color copier of the present embodiment is provided with phase detection means for detecting the phase of rotation of at least one of the image carrier and the endless carrier of the image forming means, and rotational phase control means for individually controlling the phase of rotation of at least one of the image carrier and the endless carrier of the image forming means on the basis of the phase information detected by the phase detection means.

The digital color copier of the present embodiment is further provided with image forming means is provided with color difference detection pattern output means that outputs to the image forming means an image signal to produce a color difference detection pattern for detecting periodic rotational variations arising in the image forming apparatus; pattern detection means for detecting the color difference detection pattern formed on the endless carrier; the phase detection means for detecting the phase of rotation of at least one of the image carrier and the endless carrier of the image forming means; and the rotational phase control means for individually controlling the phase of rotation of at least one of the image carrier and the endless carrier of the image forming means on the basis of the phase information detected by the phase detection means.

To begin with, the digital color copier of the present embodiment has the color difference detection pattern output means. This color difference detection pattern output means outputs to the image forming means an image signal to produce, on the transfer belt, a color difference detection pattern that is specifically designed to detect AC components for detecting periodic rotational variations arising in the digital color copier.

Figure 14A:
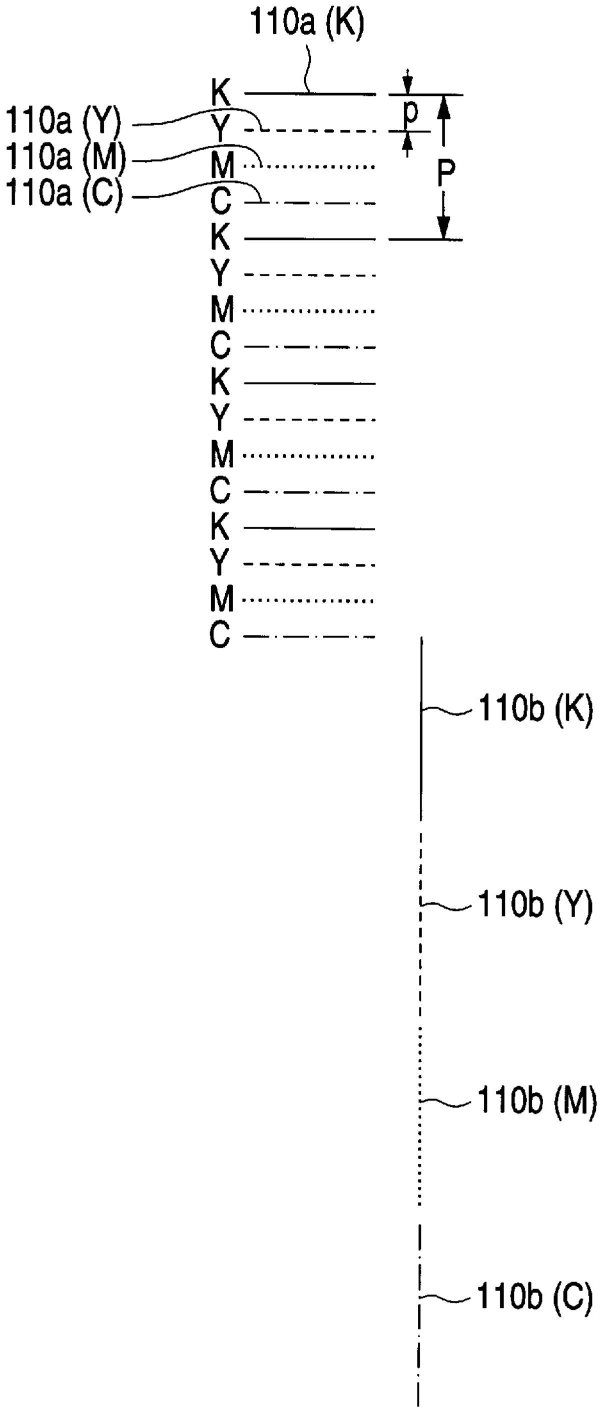
FIGS. 14A and 14B are plan views respectively showing an AC misregistration measurement pattern.

In the present embodiment, patterns 110*a*(K), 110*a*(Y), 110*a*(M), and 110*a*(C) for four colors K, Y, M, and C linear formed in the primary scanning direction are arrayed on the transfer belt 24 in the secondary scanning direction at constant minute pitches "p" in parallel with each other in order to detect rotational variations in the secondary scanning direction, as shown in FIG. 14A. Further, a set of patterns 110*b*(K), 110*b*(Y), 110*b*(M), and 110*b*(C) for four colors K, Y, M, and C linearly formed in the secondary scanning direction are provided to be in line with each other in the secondary scanning direction in order to detect rotational variations in the primary scanning direction. The patterns for detecting AC color differences, that is, 110_a_(K), 110_a_(Y), 110_a_(M), 110_a_(C), 110_b_(K), 110_b_(Y), 110_b_(M), and 110_b_(C), are repetitively formed on the transfer belt 24 along, e.g., the entire circumference of the transfer belt 24, in the direction in which it travels, as shown in FIG. 14A. These patterns are sampled. The patterns for detecting AC color differences, that is, 110_a_(K), 110_a_(Y), 110_a_(M), 110_a_ (C), 110_b_(K), 110_b_(Y), 110_b_(M), and 110_b_(C), are formed on one side or on both sides, that is, on the proximal and distal sides, of the transfer belt 24 in the widthwise direction, as required.

Figure 14B:
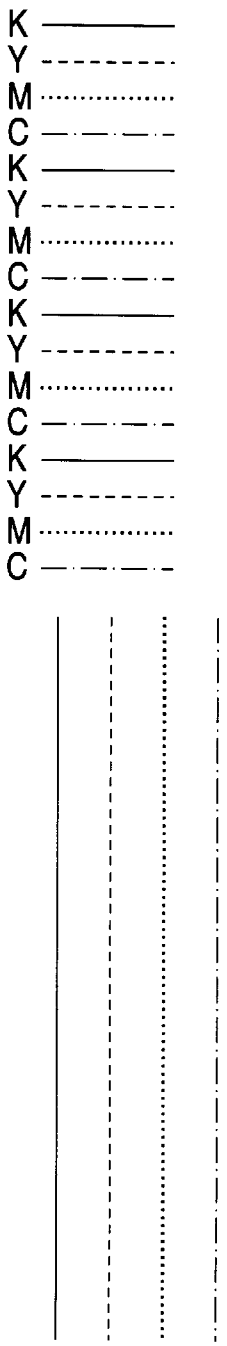
Figure 16A:
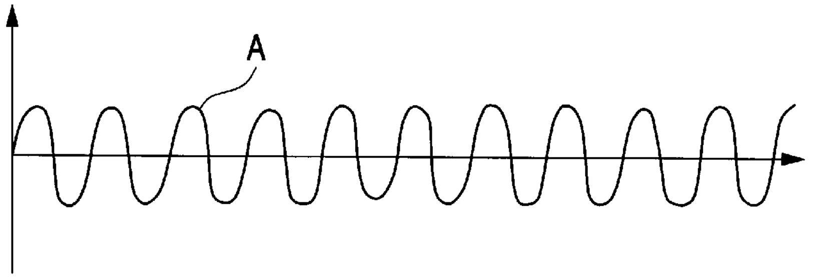
FIGS. 16A to 16D are plots showing examples of sampled rotational variations.
Figure 16B:
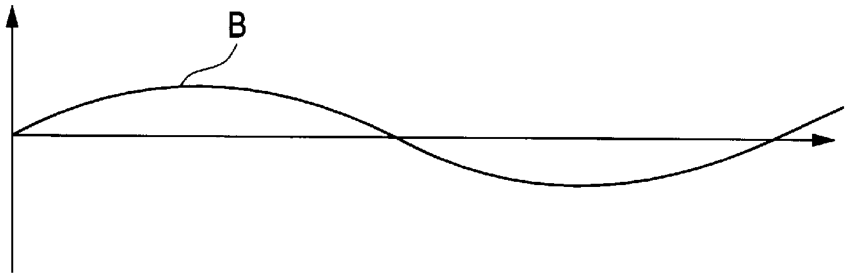
Figure 16C:
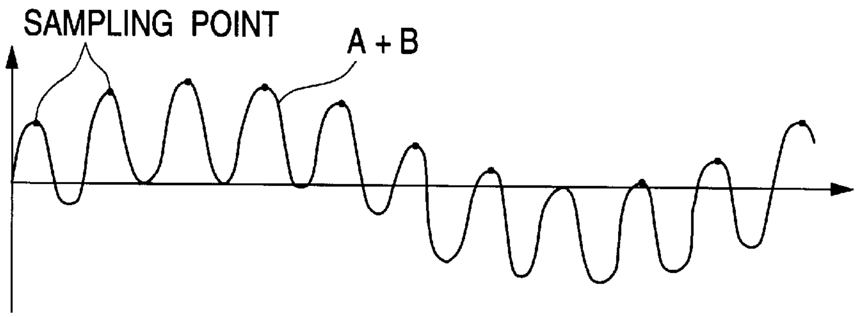
Figure 16D:
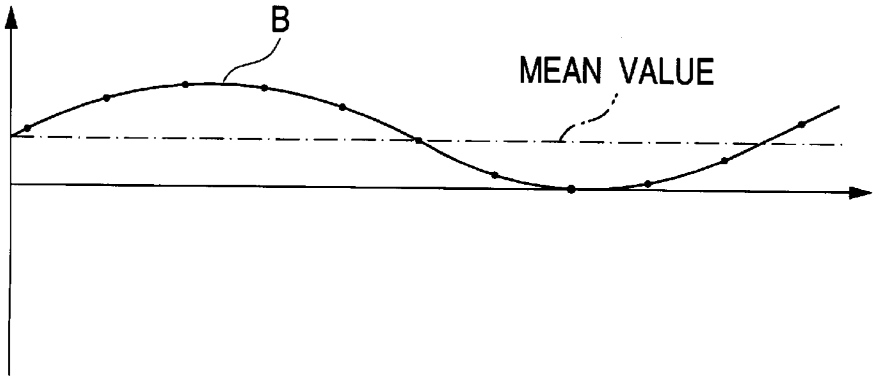

The patterns 110_b_(K), 110_b_(Y), 110_b_(M), and 110_b_(C) for four colors linearly formed in the secondary scanning direction may be formed long in parallel with each other in the secondary scanning direction in order to detect rotational variations in the primary scanning direction, as shown in FIG. 14B.

Of the previously-described color difference detection patterns specifically designed to detect AC components, an interval "P" between the patterns 110_a_(K), 110_a_(Y), 110_a_ (M), and 110_a_(C) in the direction of travel of the transfer belt 24 is set so as to correspond to a frequency of the periodic variations arising in the digital color copier, as shown in FIG. 14A. In this event, the frequency of the periodic rotational variations arising in the digital color copier covers various frequency components, such as one cycle of the photosensitive drums 6K, 6Y, 6M, and 6C; one cycle of the drive roller 25 of the transfer belt 24, oscillatory and eccentric components of gears for driving the belt and roller; and the walking phenomenon of the transfer belt 24. Therefore, a very high sampling frequency becomes necessary to detect all of these frequencies at one time. However, it is practically impossible to form a pattern so as to correspond to an extremely high sampling frequency in view of pattern width, operating time, or the like.

A plurality of possible patterns specifically designed to detect AC components are available, as required, in the present embodiment. These patterns are respectively assigned frequencies to be detected. As a result, the detection of AC color misregistration can be detected with high accuracy while the sampling frequency is suppressed. However, the present invention is not limited to the above-described configuration. It goes without saying that only one pattern specifically designed to detect AC components is prepared so as to correspond to a comparatively high sampling frequency. A predetermined single AC component or a plurality of predetermined AC components may be detected using the only one pattern.

It becomes more difficult to ensure the number of cyclic sampling operations with respect to lower frequencies when the AC components are detected, for reasons of the time required to carry out the detecting operations. Therefore, there arises the issue of how to improve sampling accuracy at lower frequencies. Assume that the plurality of AC oscillation frequencies of the digital color copier are A, B, C (A>B>C). Where a low frequency C is detected, the sampling frequency is deliberately set to a high frequency A or B or a submultiple of them. If no problems arise in sampling the frequency C, the sampling frequency is set such that the sampling operation is carried out at the frequency of a submultiple of the frequencies A and B, as shown in FIG. 15. For example, provided that A=30 Hz, B=20 Hz, and C=3 Hz, the sampling frequency is set to 10 Hz. In contrast, if a problem arises in sampling the frequency C, the sampling frequency will be set to the frequency which is more likely to affect the sampling accuracy, or the submultiple of that frequency. For example, provided that A=30 Hz, B=5 Hz, and C=3 Hz, the sampling frequency is set to 10, 15, or 30 Hz. In this case, it is difficult to separate the oscillatory components B and C from each other unless either the oscillatory component B or the oscillatory component C is small. For instance, if the amplitude of the oscillatory component B is smaller than that of the oscillatory component C, the oscillatory component B can be ignored, which makes it possible to detect only the oscillatory component C.

As described above, the oscillatory components of the frequencies A and B can be set to a dead zone by setting the sampling frequency, as shown in FIGS. 16A to 16D. As a result, it is possible to easily detect and analyze only the oscillatory component C, which in turn enables improved sampling accuracy.

In the present embodiment, the frequency for sampling the color difference detection pattern that is specifically designed to detect AC components is set so as to correspond to a rotational variation having a high frequency among the plurality of periodic rotational variations arising in the digital color copier, on the basis of the previously-described theoretical consideration.

Provided that the rotational frequency of the photosensitive drum 6 is set to 0.5 Hz, and that the rotational frequency of the drive roller 25 of the transfer belt 24 is set to 5 Hz, the frequency for sampling the color difference detection patterns 110 specifically designed to detect AC components is set to 5 Hz that equals the rotational frequency of the drive roller 25 of the transfer belt 24 having a high frequency. Consequently, provided that the processing speed of the digital color copier is set to 160 mm/sec., the patterns 110_a_(K), 110_a_(Y), 110_a_(M), and 110_a_(C) for detecting the rotational variations in the secondary scanning direction among all the color difference detection pattern 110 specifically designed to detect AC components are set such that the interval "P" between the patterns of the same color in the direction of travel of he transfer belt 24 is set to, e.g., 160 (mm/sec.)/5 (Hz)=32 (mm), and that the pitch "p" between the adjacent different color patterns is set to 8 mm. However, the present invention is not limited to the above-described settings. Given that the sampling frequency is set to 2.5 Hz that is half of 5 Hz, the interval "P" between the same color patterns may be set to 64 mm or thereabouts.

The color difference pattern 110 specifically designed to detect AC components is detected by the pattern detection means 70, as shown in FIG. 6. The color difference correction board 76 that doubles as the phase detection means individually controls the phase of rotation of the photosensitive drums 6K, 6Y, 6M, and 6C of the image forming units 5K, 5Y, 5M, and 5C, on the basis of the phase information detected by the color difference correction board 76. It is also possible for the color difference correction board to detect the phase of rotation of the transfer belt 24 on the basis of the detection signal received from the pattern detection means 70, as well as controlling the phase of rotation of one of or both of the transfer belt 24 and the photosensitive drums 6K, 6Y, 6M, and 6C on the basis of the information about the phase of the transfer belt 24.

With the previously-described configuration, the digital color copier of the present embodiment is capable of reducing degraded picture quality due to AC color misregistration as well as the influence of, such as the eccentricity of the image carriers or the endless carrier of the image forming apparatus, the eccentricity resulting from the attachment of the image carriers or the endless carrier, or the eccentricity due to clearance errors of a rotary shaft, by individually controlling the phase of rotation of at least one of the image carriers and the endless carrier of the image forming apparatus.

Specifically, the position and size of components in each of the image forming units 5K, 5Y, 5M, and 5C as well as the position and size of the image forming units may slightly change as a result of variations in the internal temperature of the digital color copier or application of an external force to the digital color copier. Of these factors, variations in the internal temperature of the image forming apparatus and the external force are impossible to prevent. For example, routine operations, such as correction of paper jams, replacement of components as a result of maintenance, or the movement of the color image forming apparatus, result in the application of an external force to the color image forming apparatus. If the internal temperature of the digital color copier changes, or if an external force is exerted on the digital color copier, the positioning of the images formed by the image forming units 5K, 5Y, 5M, and 5C is adversely affected, which in turn makes it difficult to maintain high picture quality as a result of the occurrence of DC color misregistration.

AC color misregistration that changes in a short cycle and has a comparatively high frequency also arises in the digital color copier; for example, one cycle of the photosensitive drums 6K, 6Y, 6M, and 6C; one cycle of the drive roller 25 of the transfer belt 24, oscillatory and eccentric components of gears for driving the belt and roller; and the walking phenomenon of the transfer belt 24.

To meet the demand for much higher picture quality of the digital color copier, it is necessary to reduce the color misregistration with high accuracy, for example, it is necessary to reduce the color misregistration to less than 70 $\mu$m or thereabouts. For this reason, it is necessary to reduce the absolute quantity of DC or AC color misregistration by improving the accuracy of manufacture of the image forming unit and the transfer belt or the accuracy of the driving device. Further, it is necessary to actively carry out a control operation so as to cancel the influence of color misregistration due to the AC components.

In the above-described digital color copier, the sampling of the DC color difference detection pattern 71, a correction mode based on the sampling of the DC color difference detection pattern 71, sampling of the AC color difference detection pattern 110, and a predetermined control operation based on the sampling of the AC color difference detection pattern are carried out at predetermined timing, as required, before the start of, or the during the course of, a normal image formation mode (i.e., a print mode), or the like, after the power of the color copier has been turned on or the color copier has recovered from paper jams. In this case, the sampling of AC color difference detection pattern 110 and a predetermined control operation based on the sampling of the AC color difference detection pattern may be carried out every time the sampling of DC color difference detection pattern 71 and a correction mode based on the sampling of the DC color difference detection pattern are carried out. However, in the present embodiment, the sampling of the AC color difference detection pattern 110 and the correction operation based on the sampling of the AC color difference detection pattern are executed once during the course of a color difference correction cycle immediately after the power of the digital color copier has been turned on.

Figure 17:
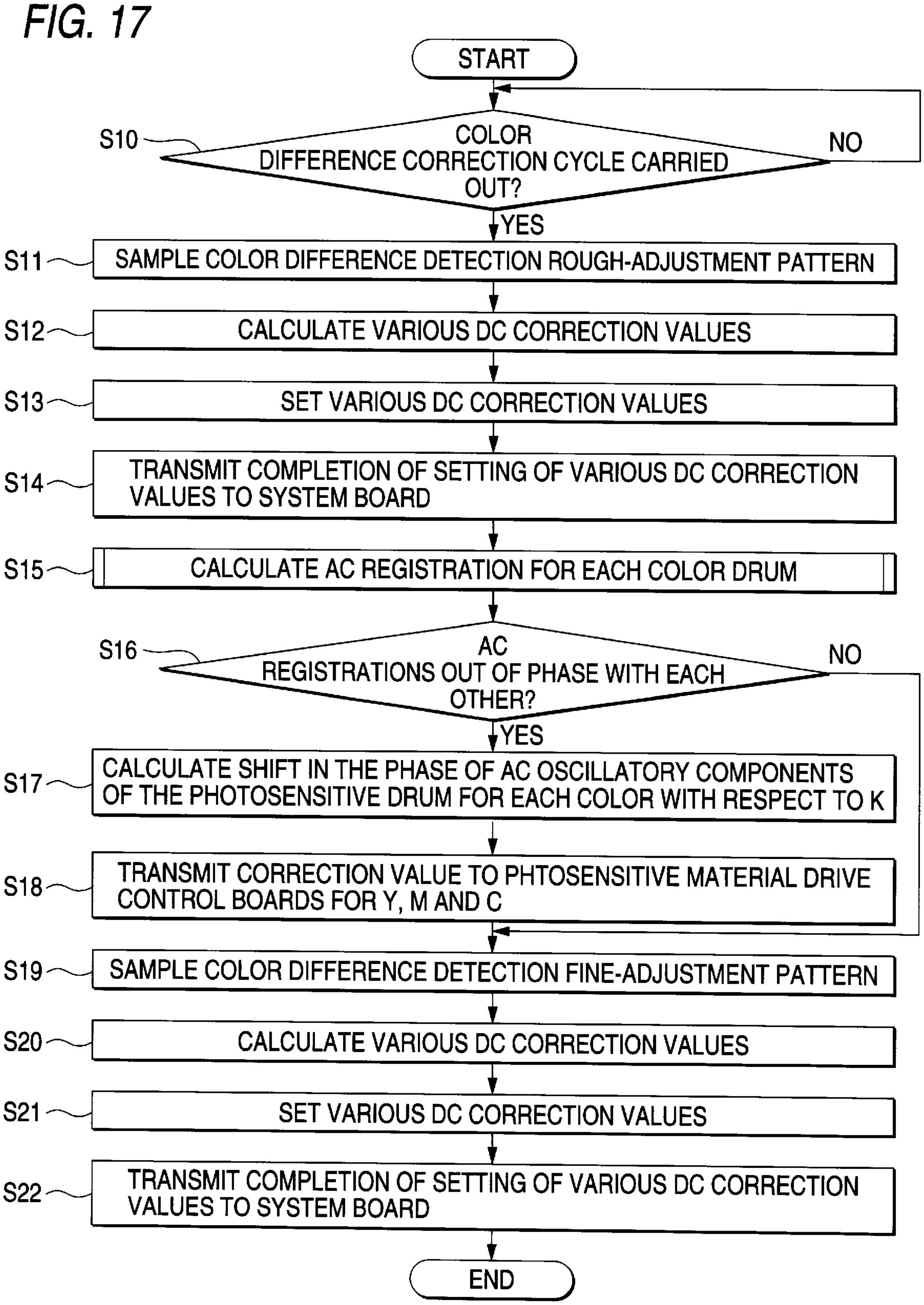
FIG. 17 is a flowchart showing color difference correcting operation.
Figure 18:
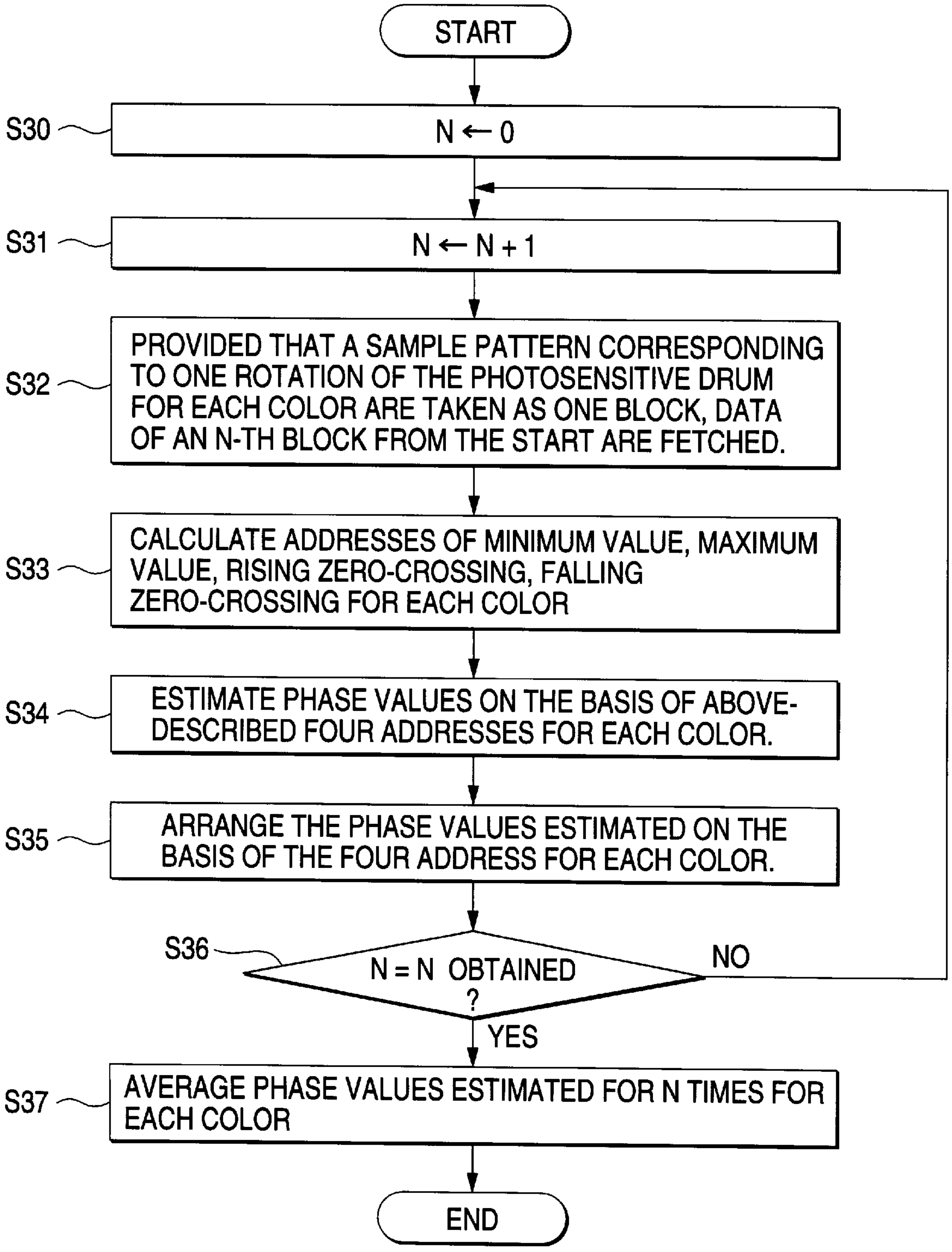
FIG. 18 is a flowchart showing color difference correcting operation.
Figure 19A:
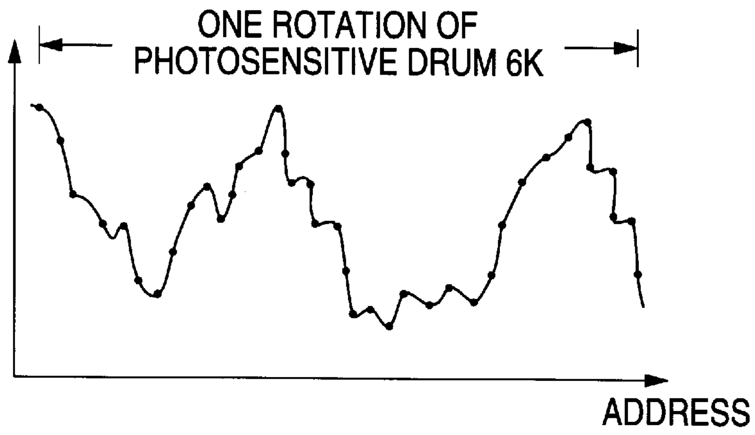
FIGS. 19A to 19D are plots showing rotational variations of the photosensitive drums for respective colors.
Figure 19B:
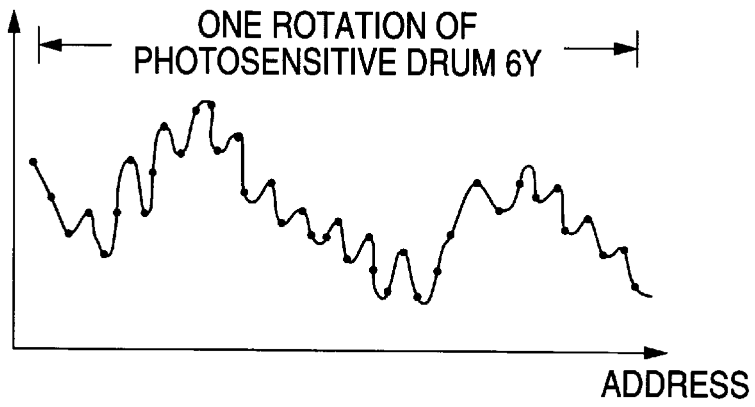
Figure 19C:
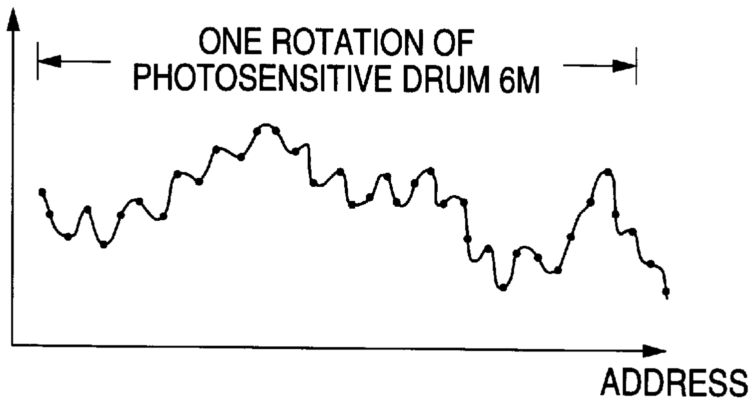
Figure 19D:
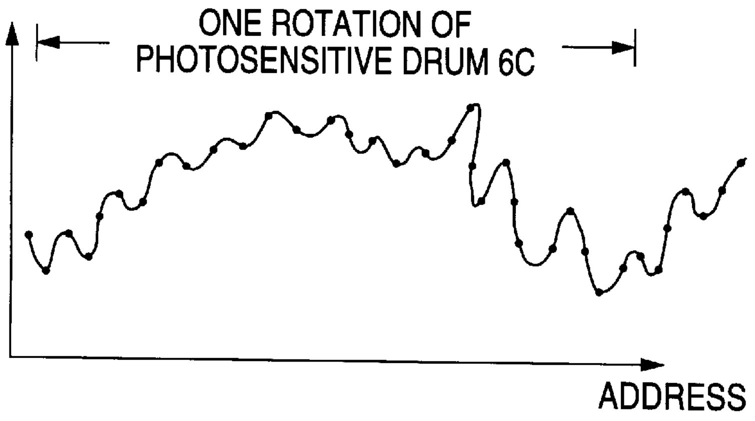

To begin with, it is determined whether or not the color difference correction cycle is carried out (step S10) in the present embodiment, as shown in FIG. 17. Where the color difference cycle is carried out, a DC color difference detection rough-adjustment pattern is sampled (step S11). The color difference detection rough-adjustment pattern is set so as to have a larger pitch compared with the pitch of the DC color difference detection pattern 71 shown in FIG. 12. This rough-adjustment pattern is intended to be used in roughly adjusting DC color differences. In sampling the color difference detection rough-adjustment pattern, the sampled data on the pattern for rough adjustment purposes are obtained. The position of an image is obtained by computing the sampled data. If the position of the image is obtained with regard to all of the sampled data, values for correcting various DC registration are calculated (step S12). The values for correcting various DC registration are set (step S13). After the setting of the values for correcting various DC registration has been completed, the thus-set values are sent to the control board 78 by communication (step S14).

After the calculation of AC registration of each color and a series of associated operations have been carried out on the basis of the detection and calculation of the color difference detection pattern 110 specifically designed to detect AC components formed on the transfer belt 24 (steps S15 to S18), a color difference detection fine adjustment pattern is sampled (step S19), as will be described in detail later. FIG. 12 shows the color difference detection fine adjustment pattern 71 that is intended to be used in finely adjusting DC color differences. Sampled data on the fine adjustment pattern 71 are obtained by sampling the color difference fine adjustment pattern. The thus-obtained sampled data are computed, whereby the position of an image is obtained. If the position of the image is obtained with regard to all of the sampled data, values for correcting various DC registration are calculated (step S20). The values for correcting various DC registration are set (step 521). After the setting of the values for correcting various DC registration has been completed, the thus-set values are sent-to the control board 78 by communication (step S22). The correction cycle is now completed.

If the cycle for detecting and correcting AC components is carried out before the rough adjustments of the DC color misregistration correction cycle are carried out immediately after the power of the digital color copier has been turned on, the patterns 110 before and after the current AC color difference detection pattern 110 may overlap if the sample cycle of the AC color difference detection pattern 110 is made short, because of the presence of variations in the DC color registration. For this reason, it is impossible to reduce the pitches between the patterns. In contrast, if the cycle for detecting and correcting AC components is carried out at least after the rough adjustment of the DC color registration correction cycle has been completed, variations in the DC color registration become very small, which enables the pitches between the patterns. As described above, it is desirable to carry out the AC color registration correction cycle between the rough and fine adjustments of the DC color registration correction cycle, which makes it possible to reduce the influence of AC components when carrying out fine adjustment of the DC color registration correction. Therefore, it is possible to carry out the DC color registration correction operation with much greater accuracy.

The sampling of AC color difference detection pattern and control operations based on the sampling operation will now be described detail.

During the sampling of AC color difference detection pattern and the control operations based on the sampling operation, the control board 78 issues an instruction to each section, as shown in FIG. 6. The interface boards 75K, 75Y, 75M, and 75C start to sequentially output image data of the AC color difference detection pattern 110 to each of the corresponding image forming units 5K, 5Y, 5M, and 5C by means of built-in color difference detection pattern output means of the interface boards. The timing at which the interface boards 75K, 75Y, 75M, and 75C start to output the image data is the same as the timing of the normal image formation mode (i.e., a print mode). Consequently, the image forming units 5K, 5Y, 5M, and 5C form the predetermined color difference detection patterns 110 on the basis of the image data. The thus-formed color difference detection patterns are sequentially transferred in multiple on the transfer belt 24 at the same timing as the timing of the normal image formation mode (i.e., a print mode). As a result, the plurality of color difference detection patterns 110 are formed on the transfer belt 24, as shown in FIG. 14A.

According to a subroutine for detection and calculation of the color difference detection pattern 110 specifically designed to detect AC components in step 15 shown in FIG. 17, a variable N is initially set to zero. Then, one is added to N (steps S30 and S31). Taking the extent of the sample pattern 110 corresponding to one rotation of the photosensitive drum of each color as one block, the data on the N-th block from the start (the first block is situated at the starting point) are fetched (step S32), as shown in FIG. 19. Subsequently, the address of the minimum value (Min.) of the rotational variations of each of the photosensitive drums 6K, 6Y, 6M, and 6C, the address of the maximum value (Max.) of the rotational variations of each of the photosensitive drums 6K, 6Y, 6M, and 6C, a zero-crossing address of the rising edge of the rotational variations of each color, and the address of the falling edge of the rotational variations of each color (step S33). The phase of rotation of each photosensitive drum is estimated from the result of calculation of the four addresses for each color (step S34). The mean value of the phase values estimated on the basis of the four addresses is obtained for each color (step S35). Subsequently, the variable N becomes a predetermined value N, and it is determined whether or not the fetch of data on the N-th block and the estimation of the phase value have been completed (step S36). The above-described operations are repeated until data fetch and phase estimation for N blocks are completed (steps S31 to S35). Finally, the phase values estimated on the basis of the addresses corresponding to N blocks are averaged for each color (step S37). Then, the algorithm for an AC registration operation subroutine is completed.

In the case of the detection of the AC components of the photosensitive drums 6K, 6Y, 6M, and 6C, N (e.g., 3 to 7) is set such that the pattern 110 substantially corresponding to one rotation of the transfer belt 24 is detected for each color. As a result, at least rotational variations having a cycle corresponding to one rotation of the transfer belt 24 can be also taken into consideration.

Figure 21:
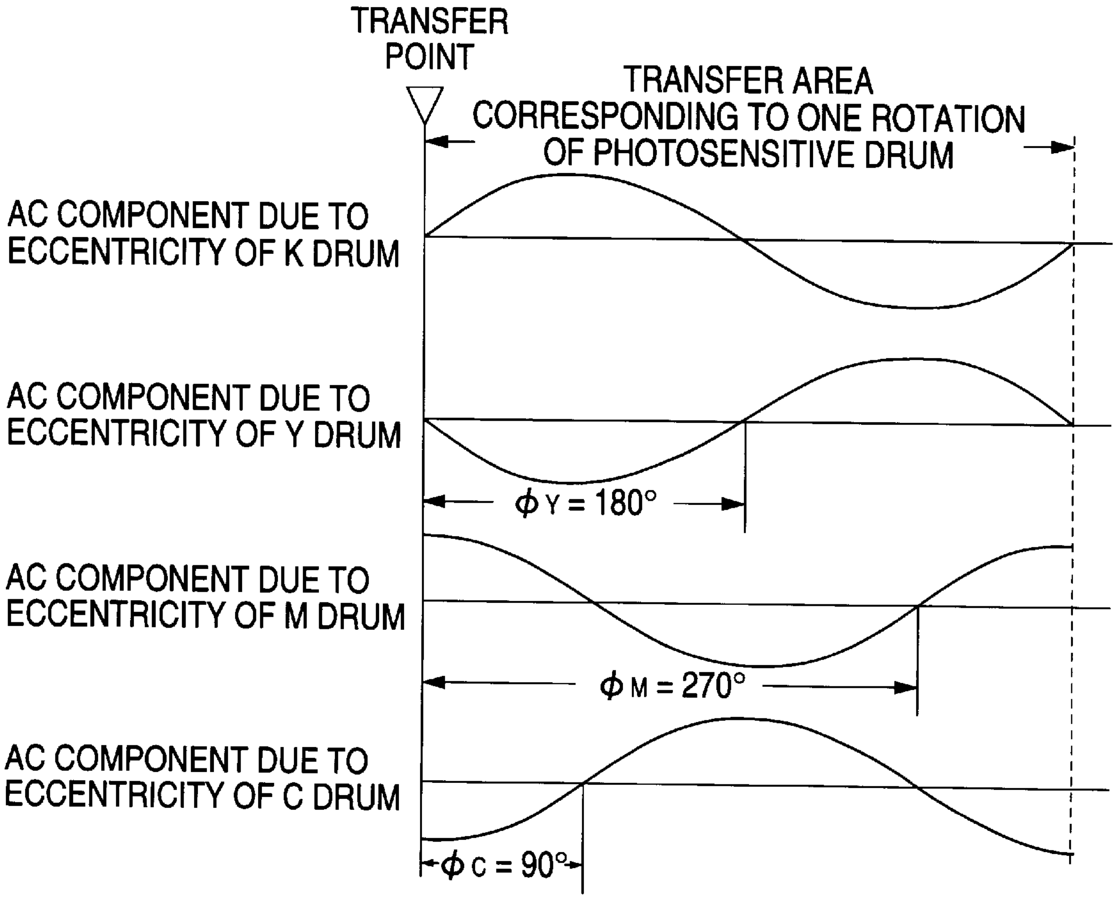
FIG. 21 is a plot showing the phase of rotational variations of each photosensitive drum.

In step S16 shown in FIG. 17, it is judged whether or not the photosensitive drums 6K, 6Y, 6M, and 6C are out of phase with each other with regard to AC registration. If the photosensitive drums 6K, 6Y, 6M, and 6C are not out of phase with each other with regard to AC registration, fine adjustments for DC color difference detection are carried out (steps S19 to S22). In contrast, if the rotational variations of the photosensitive drums 6K, 6Y, 6M, and 6C are out of phase with each other with regard to AC registration as shown in FIG. 21, the CPU 98 calculates the amount of phase shift $\phi$ of the AC oscillatory components of the photosensitive drums 6Y, 6M, and 6C in relation to the black photosensitive drum 6K (step S17) as shown in FIG. 21. Then, correction values are transmitted to the drive control board 66 (shown in FIG. 4) of each of the photosensitive drums 6Y, 6M, and 6C for Y, M, and C (step S18). As previously described, processing then proceeds to the fine adjustments for DC color difference detection (step S19).

Next, the sampling of color difference detection pattern specifically designed to detect AC components and the correction algorithm will be specifically described.

Figure 22:
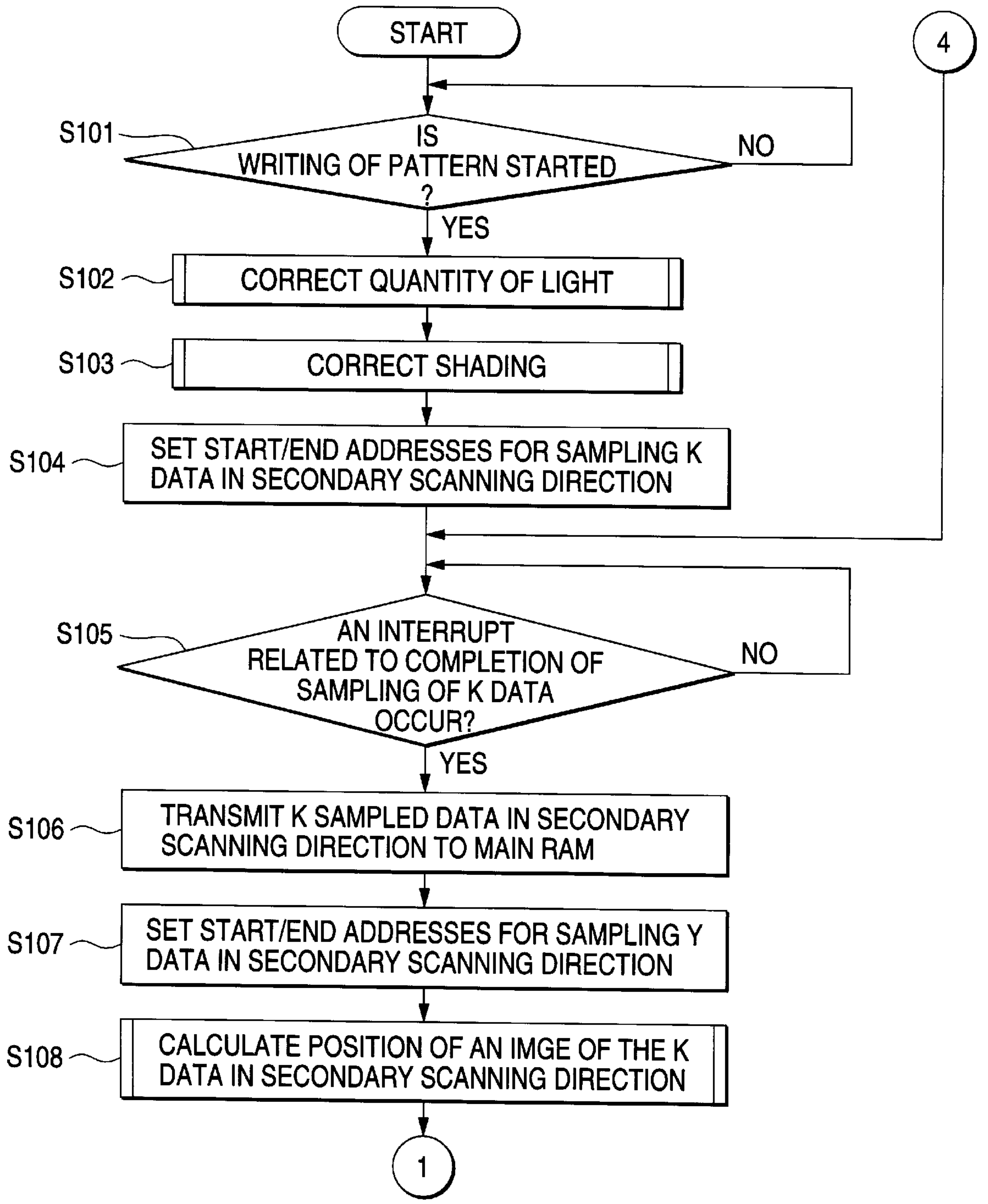
FIG. 22 is a flowchart showing operations of a device for sampling a color difference detection pattern of the present embodiment.

In sampling the color difference detection pattern 110 specifically designed to detect AC components, the initiation of writing of a pattern is waited (step S101), as shown in FIG. 22. Subsequently, shading and the amount of light are corrected (steps S102 to S103). Starting and stop addresses for sampling K data in the secondary scanning direction are set (step S104).

The occurrence of an interrupt related to the completion of the sampling of K data is waited (step S105). The sampled data in the secondary scanning direction (i.e., K data) are transferred in blocks to the main RAM 100 (step S106).

The starting and stop addresses for sampling Y data in the secondary scanning direction are set (step S107). The position of an image of the K data in the secondary scanning direction is calculated (step S108).

Figure 23:
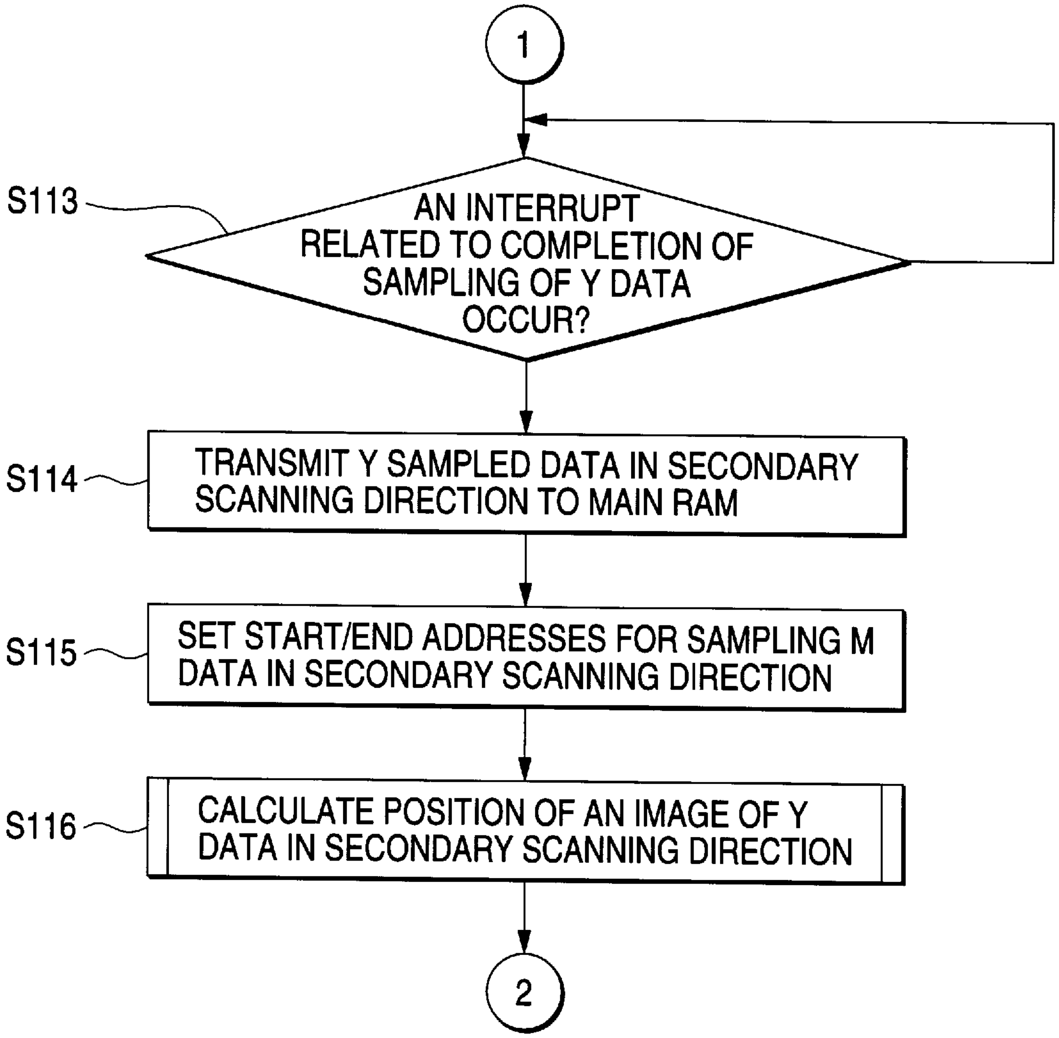
FIG. 23 is a flowchart showing operations of the device for sampling the color difference detection pattern of the present embodiment.

The occurrence of an interrupt related to the completion of the sampling of Y data is waited (step S113), as shown in FIG. 23. The sampled data in the secondary scanning direction (i.e., Y data) are transferred in blocks to the main RAM 100 (step S114). The starting and stop addresses for sampling M data in the secondary scanning direction are set (step S115). The position of an image of the Y data in the secondary scanning direction is calculated (step S116).

Figure 24:
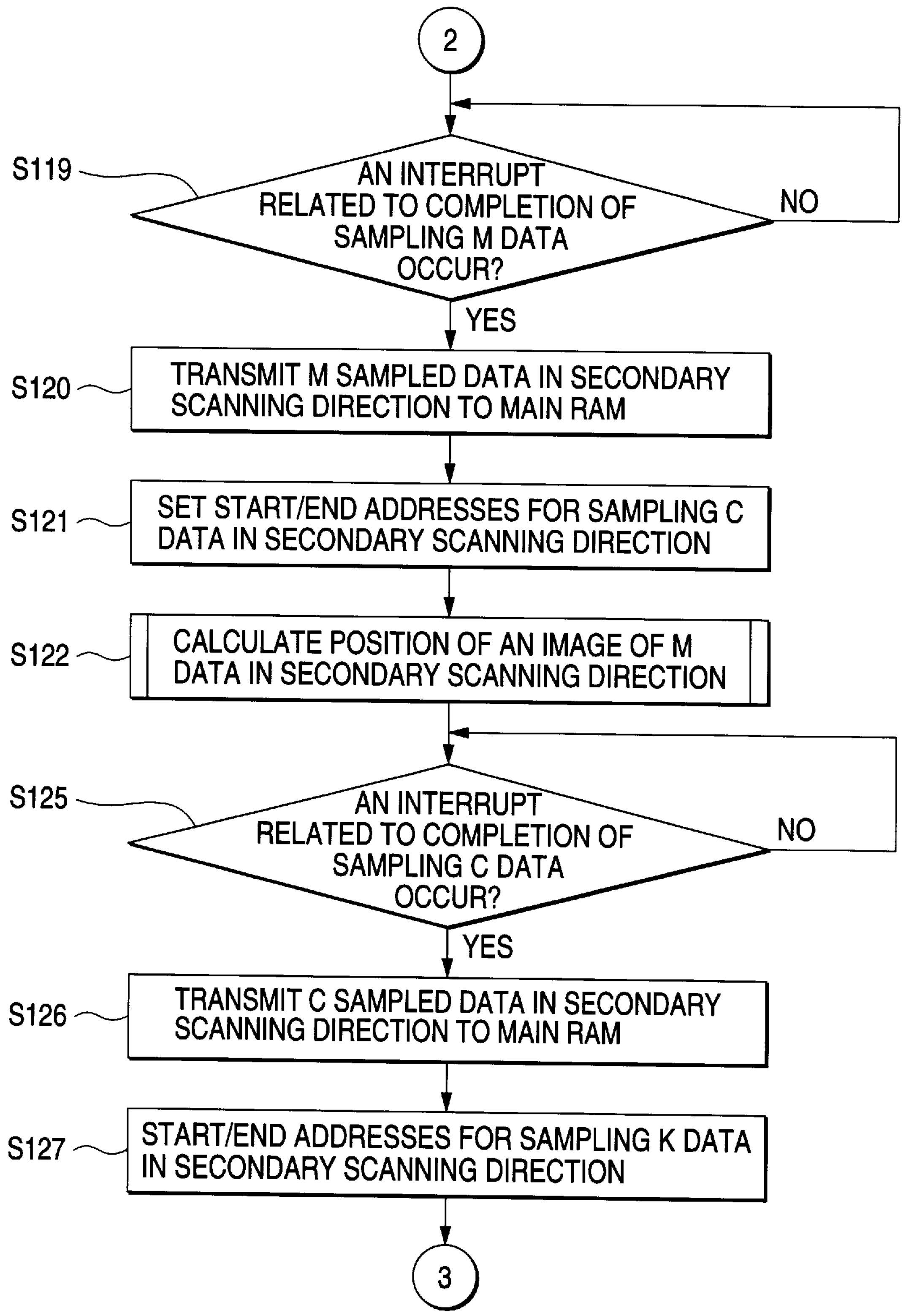
FIG. 24 is a flowchart showing operations of the device for sampling the color difference detection pattern of the present embodiment.
Figure 25:
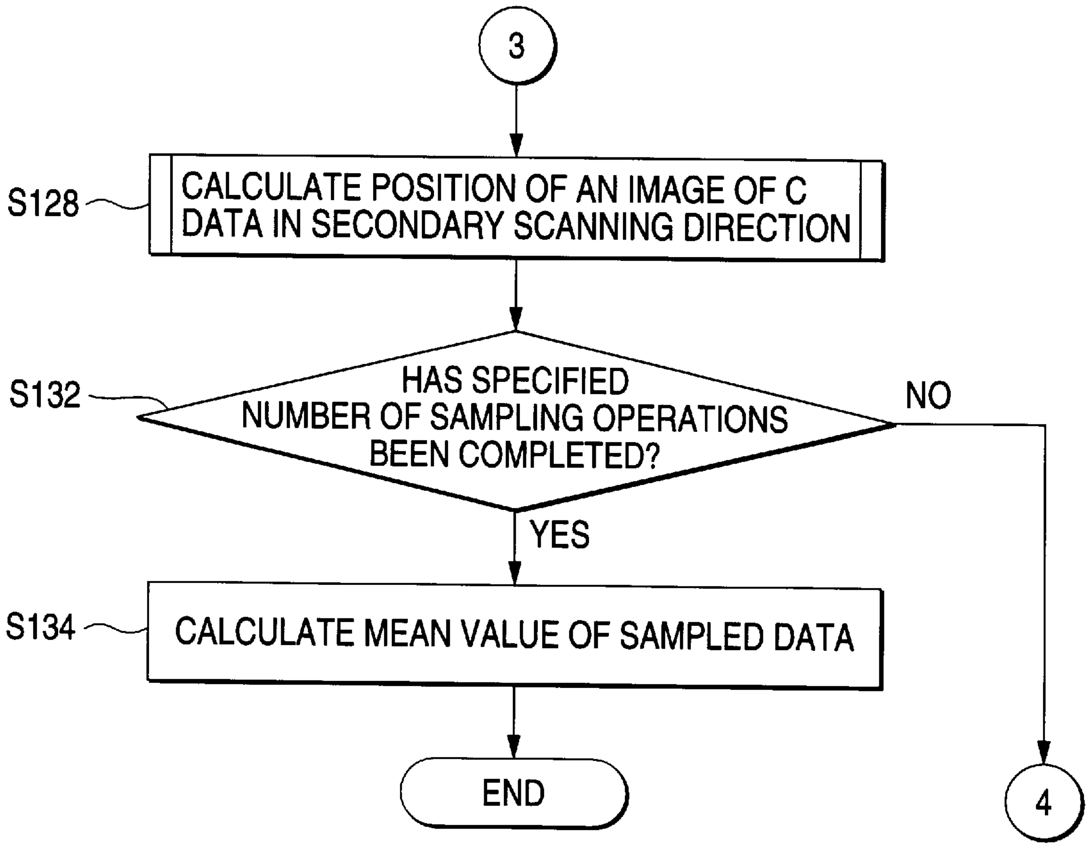
FIG. 25 is a flowchart showing operations of the device for sampling the color difference detection pattern of the present embodiment.
Figure 26:
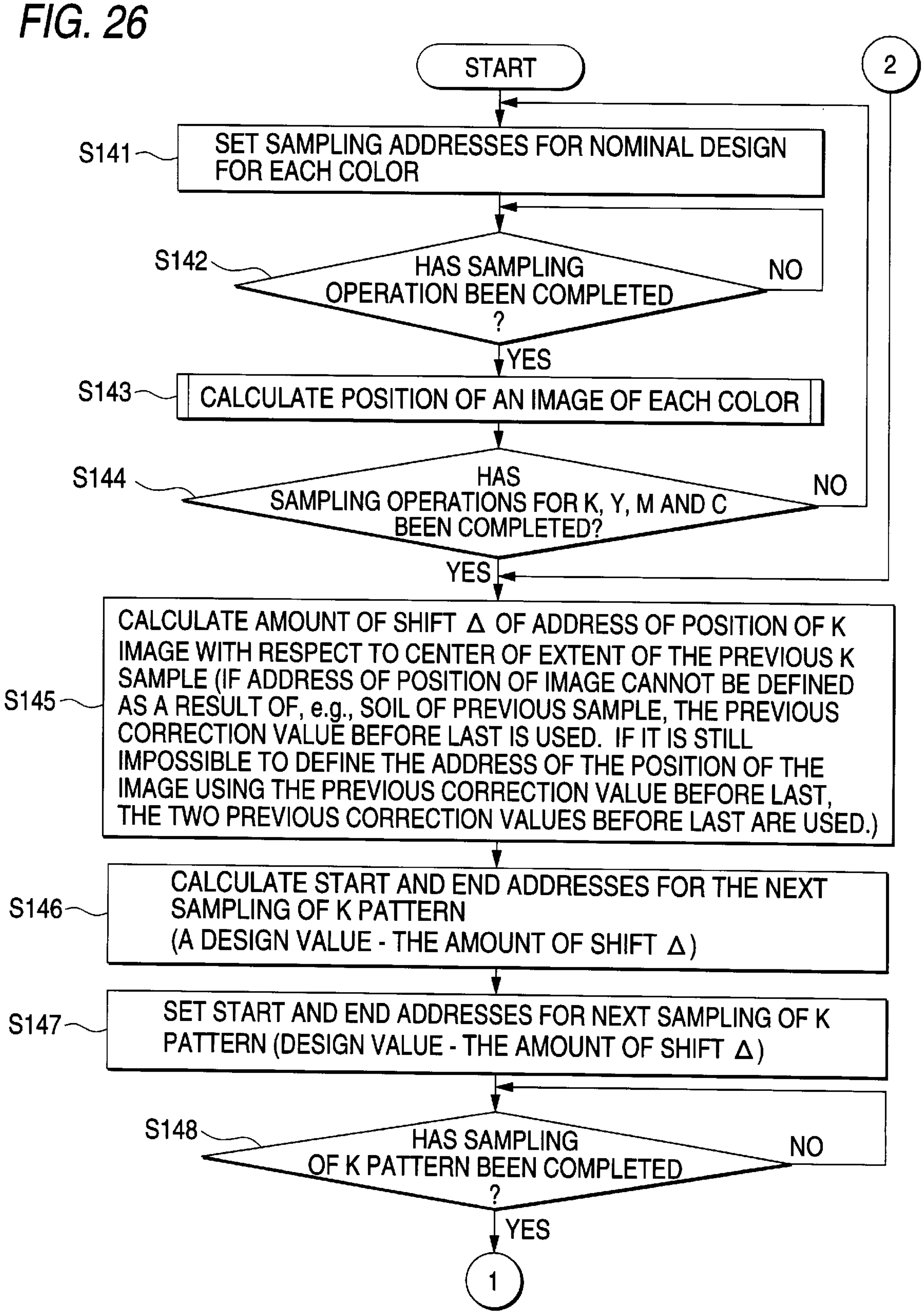
FIG. 26 is a flowchart showing operations of a device for sampling a color difference detection pattern of the present embodiment.

The occurrence of an interrupt related to the completion of the sampling of M data is waited (step S119), as shown in FIG. 24. The above-described processing is continued until the sampling of C data is carried out (steps S120 to 131), as shown in FIGS. 24 to 25. Processing then returns to step. S105, and the same processing is repeated until a specified number of sampling operations are completed. After the specified number of sampling operations have been completed (step S132), the mean value of the sampled data is calculated (step S134).

In the correction of the starting point of the secondary scanning sampling operation, sampling addresses for nominal design are set for each color (step S141). Completion of the sampling operation is waited (step S142). The position of an image of each color is calculated (step S143). The same processing is repeated until the sampling operations for K, Y, M, and C are completed (step S144).

The amount of shift Δ of the address of the position of the K image with respect to the center of the extent of the previous K sample is calculated (step S145). If the address of the position of the image cannot be defined as a result of, e.g., soil of the previous sample, the previous correction value before last is used. If it is still impossible to define the address of the position of the image using the previous correction value before last, the two previous correction values before last are used.

Starting and stop addresses for the next sampling of a K pattern (a pattern for detecting color differences in the secondary scanning direction) perpendicular to the direction of travel of the belt are calculated from (a design value—the amount of shift Δ) and set (steps S146 to S147). The completion of the sampling of the K pattern is waited (step S148). If the system does not require step S145, it can be omitted. In such a case, the interval between the initiation of the sampling of the K pattern and the initiation of the sample of the next K pattern is set to a constant value.

Figure 27:
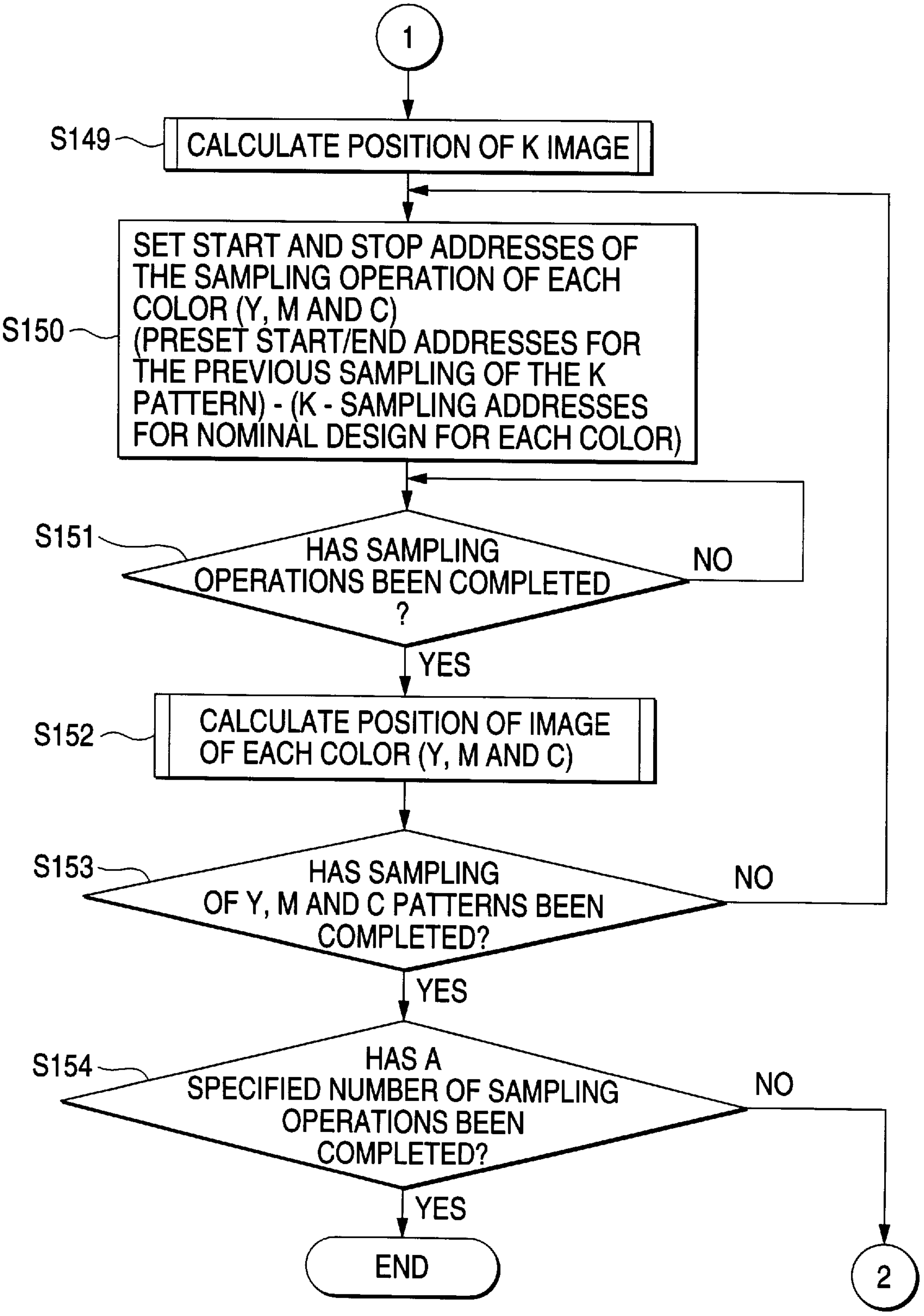
FIG. 27 is a flowchart showing operations of the device for sampling the color difference detection pattern of the present embodiment.

The position of the K image is calculated as shown in FIG. 27 (step S149). Starting and ending addresses for the sampling operation of each color (Y, M, and C) are set (step S150), and the completion of the sampling operations is waited (step S151). The interval between K-Y, Y-M, and M-C is set to a constant value. The shifts caused by the sampling method that is carried out in detecting AC components are corrected only by uniformly correcting the correction value which is related to the extent of sampling of the K pattern and is corrected in steps S145 to 147. As a result, the number of arithmetic operations is reduced. Subsequently, the position of the image of each color (Y, M, and C) is calculated (step S152).

The processing that starts from step S150 is repeated until the sampling of Y, M, and C patterns is completed (step S153). Further, the processing that starts from step S145 is repeated until a specified number of sampling operations are completed (step S154).

Figure 28:
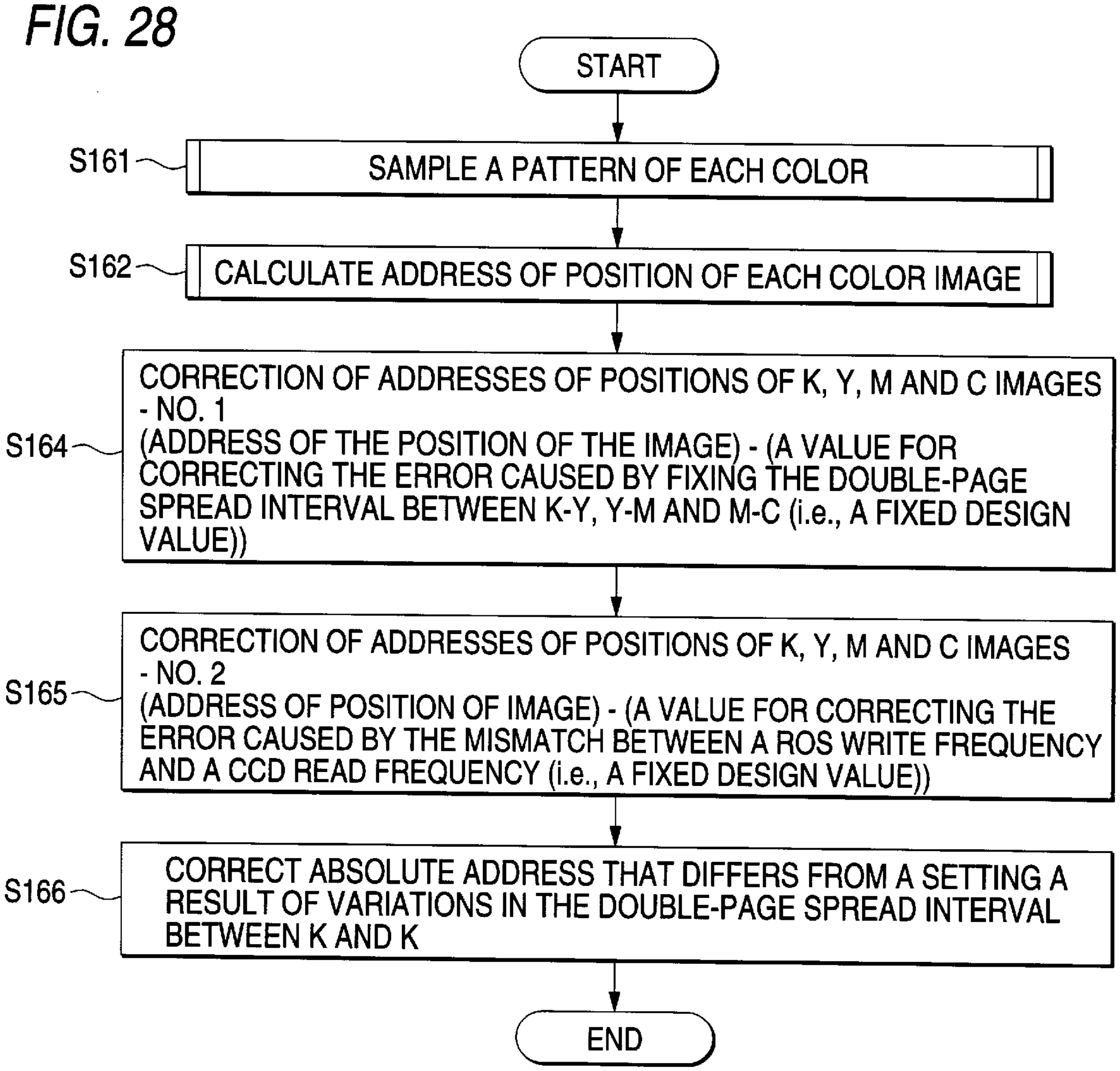
FIG. 28 is a flowchart showing operations of the device for sampling the color difference detection pattern of the present embodiment.

To correct the address errors of each color in relation to K occurred as a result of the sampling operations, the pattern of each color is sampled, as shown in FIG. 28 (step S161). The address of the position of each color image is calculated (step S162). (A value for correcting the errors as a result of fixing of the double-page spread interval between K-Y, Y-M, and M-C (i.e., a preset fixed value)) is subtracted from the address of the image obtained for each of the K, Y, M, and C sampled patterns (step S164). The error resulting from correction of the starting point of the double-page spread interval of K is corrected by subtracting a value for correcting the double-page spread interval of K from the image address obtained for each of the K, Y, M, and C sampled patterns.

Further, (a value for correcting errors caused as a result of a mismatch between the frequency for writing data to the ROS and the frequency for reading data from the CCD (i.e., a preset fixed value)) is subtracted from the address of the image obtained for each of the K, Y, M, and C sampled patterns (step S165).

As a result of the previously-described operations, the absolute address of each pattern is accurately obtained (step S166). The AC components can be detected by analyzing the thus-obtained absolute address.

FIG. 11 shows a generally ideal image profile obtained when reading the pattern 110 for measuring AC misregistration. The center of the pattern image is obtained by use of the method of elastic center. The center of the pattern image is repeatedly calculated. Then, the mean value of the thus-obtained pattern centers is obtained, whereby the address of the position of the image can be accurately determined.

The pattern for detecting color differences in the primary scanning direction is also sampled in the same manner as previously described.

Figure 29:
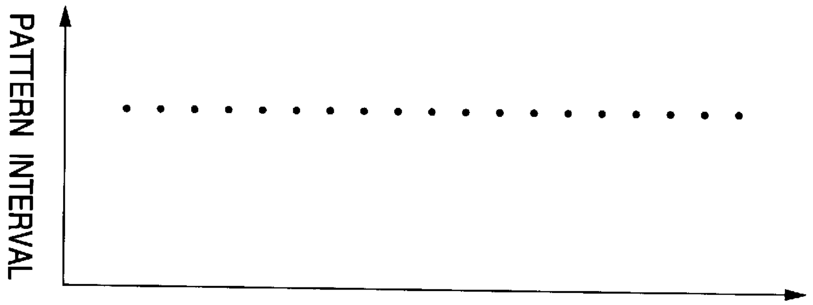
FIG. 29 is a plot showing intervals between operations for detecting the color difference detection pattern.

For the sampled data on the color difference detection pattern 110 specifically designed to detect AC components, the interval between the AC color difference detection patterns 110 of each color should become a constant value, as shown in FIG. 29. In practice, however, rotational variations arise in the digital color copier so as to cover various frequency components, such as one cycle of the photosensitive drum 6, one cycle of the drive roller 25 of the transfer belt 24, oscillatory and eccentric components of gears for driving the belt and roller, and the walking phenomenon of the transfer belt 24. Therefore, the interval between the color difference detection patterns 110 for each color does not become constant, as shown in FIG. 19. Color misregistration of AC components that periodically change arise.

In the present embodiment, provided that the extent of the sample pattern corresponding to the circumference of each color photosensitive drum is taken as one block based on the sampled data on the interval between the color difference detection patterns 110 stored in the main RAM 100, the data of the first block are fetched, as shown in FIG. 19.

Figure 30:
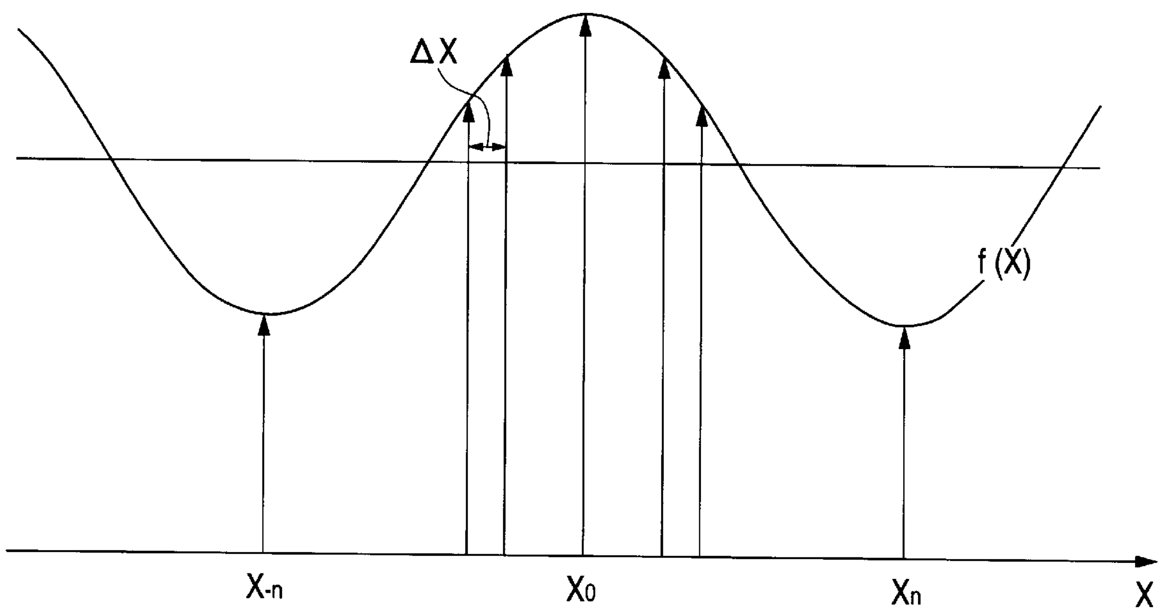
FIG. 30 is a plot showing how to obtain the mean value of the color difference detection pattern.

Then, the address of the minimum value (Min.) of the rotational variations of each photosensitive drum related to the thus-fetched data, the address of the maximum value (Max.) of the rotational variations of the photosensitive drum of each color, a zero-crossing address of the rising edge of the rotational variations of each color, and the address of the falling edge of the rotational variations of each color are calculated (step S20). The above-described calculation of the address of the minimum value (Min.) of the rotational variations of each photosensitive drum related to the thus-fetched data, the address of the maximum value (Max.) of the rotational variations of the photosensitive drum of each color, the zero-crossing address of the rising edge of the rotational variations of each color, and the address of the falling edge of the rotational variations of each color, is carried out in the following manner. To begin with, discrete interval data of the color difference detection pattern 110 of each color are sampled according to the sampling frequency, as shown in FIG. 19. The mean value of the discrete interval data is calculated using the following expression, as shown in FIG. 30.

$$\text{Mean Value}=\Sigma(f(X)/n) \text{ where } \Sigma \text{ sums up } X=X_{-n} \text{ to } X=X_n.$$

Figure 20:
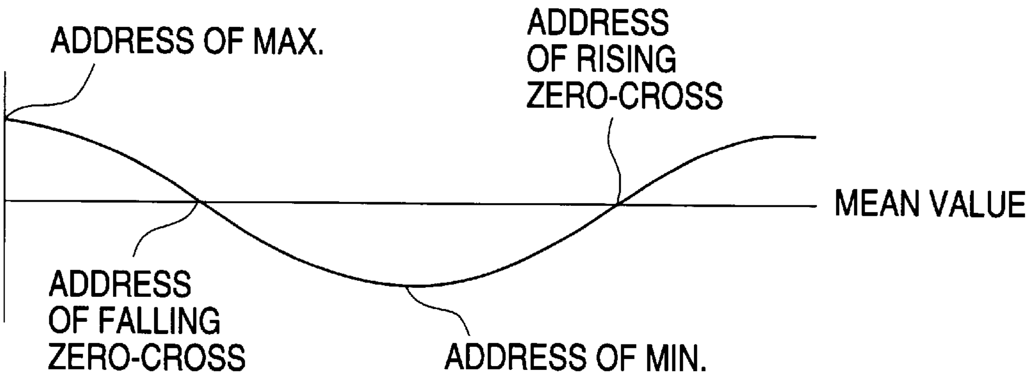
FIG. 20 is a plot showing the method of detecting the rotational phase of the photosensitive drum.

For the sampled data on the interval between the color difference detection patterns 110 of each color, the zero-crossing address of the rising edge and the zero-crossing address of the falling edge, on the basis of the assumption that the mean value of the sampled data is zero, are obtained, as shown in FIG. 20. The addresses of the minimum value (Min.) and the maximum value (Max.) of the rotational variations of each of the photosensitive drums 6K, 6Y, 6M, and 6C are calculated from the sampled data on the interval between the color difference detection patterns 110 of each color.

The phase of rotational variations of each of the photosensitive drums 6K, 6Y, 6M, and 6C is estimated from the results of the calculation of the address of the minimum value (Min.) of the rotational variations of each of the photosensitive drums 6K, 6Y, 6M, and 6C, the address of the maximum value (Max.) of the-rotational variations of each of the photosensitive drums 6K, 6Y, 6M, and 6C, the zero-crossing address of the rising edge of the rotational variations of each color, and the address of the falling edge of the rotational variations of each color. In this event, the addresses obtained from the four elements shown in FIG. 20 are averaged, whereby the accuracy of detection of the phase value can be improved. Further, the phase values thus obtained for N blocks are averaged, which in turn makes it possible to improve the accuracy of detection of the phase value to a much greater extent.

The previously-described operations are carried out for N blocks. More specifically, N estimates of a phase value that correspond to N rotations of each of the photosensitive drums 6K, 6Y, 6M, and 6C are calculated, and the N estimates of the phase value per photosensitive drum are further averaged. As a result, the estimate of the phase value of each photosensitive drum is obtained.

Figure 31:
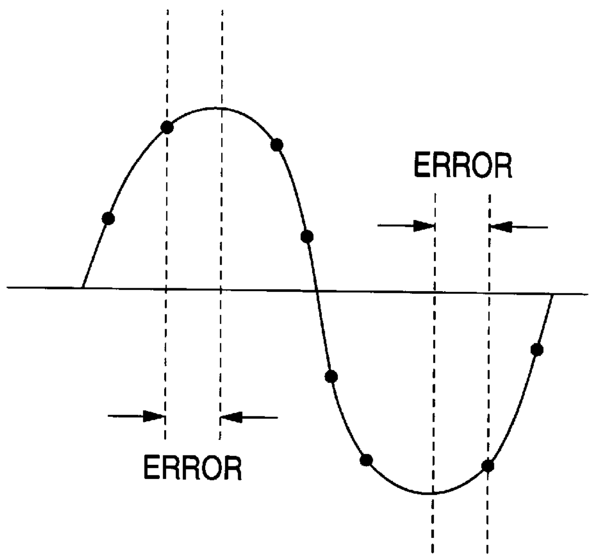
FIG. 31 is a plot showing how to obtain the maximum and minimum values of the color difference detection pattern.

In this case, only one of the four addresses per rotation of each of the photosensitive drums 6K, 6Y, 6M, and 6C is obtained, and the phase value of the photosensitive drum may be estimated from the thus-obtained address. However, it is desirable to average the four addresses per rotation of each of the photosensitive drums 6K, 6Y, 6M, and 6C, as well as estimating a phase value per rotation of each of the photosensitive drums 6K, 6Y, 6M, and 6C. Because, the rotational variations of each of the photosensitive drums 6K, 6Y, 6M, and 6C are discretely sampled by means of the AC misregistration detection pattern. As a result, errors arise between the addresses of the maximum and minimum values detected for each of the photosensitive drums 6K, 6Y, 6M, and 6C and the practical addresses, as shown in FIG. 31. To eliminate these errors, the four addresses per rotation of each of the photosensitive drums 6K, 6Y, 6M, and 6C are averaged. Consequently, the influence of errors, which randomly have positive and negative signs and are included in the addresses of the maximum and minimum values obtained by discrete sampling, is reduced. Hence, the accuracy of phase detection is improved.

The zero-crossing address of the rising edge and the zero-crossing address of the fall edge can be calculated by interpolating or extrapolating the zero-crossing points. Therefore, a resultant detection accuracy is superior to the detection accuracy obtained by use of the maximum and minimum values.

The CPU 98 compares the estimate of the phase of each of the photosensitive drums 6K, 6Y, 6M, and 6C with a predetermined value. If such a phase shift as shown in FIG. 21 arises in the rotational variations of each of the photosensitive drums 6K, 6Y, 6M, and 6C, the degree of the phase shift $\phi$ of each of the photosensitive drums 6Y, 6M, and 6C in relation to the black photosensitive drum 6K is calculated. The result of the calculation is transmitted as a correction value to the drive control board 66 of each of the yellow photosensitive drum 6Y, the magenta photosensitive drum 6M, and the cyan photosensitive drum 6C by communication (step S19). The drive control board 66 of each of the yellow photosensitive drum 6Y, the magenta photosensitive drum 6M, and the cyan photosensitive drum 6C adjusts the phase of rotation so as to match up with the phase of the black photosensitive drum K. If it is necessary to adjust the phase of rotation of the photosensitive drum 6, a phase value is adjusted by, e.g., idling the photosensitive drum 6 or the intermediate drum 24, as required. It is desirable to carry out the phase adjustment by idling the photosensitive drum 6 or the intermediate drum 24 while the digital color copier is in a standby condition. If transfer baffles 48Y, 48M, and 48C (shown in FIG. 3) that bring the transfer belt 24 into contact with at least the photosensitive drum 6 whose phase is to be adjusted are lowered at the time of phase adjustment, the transfer belt 24 and the photosensitive drum 6 can be prevented from sliding on each other while remaining contact with each other and, eventually, becoming abraded or damaged.

Figure 32:
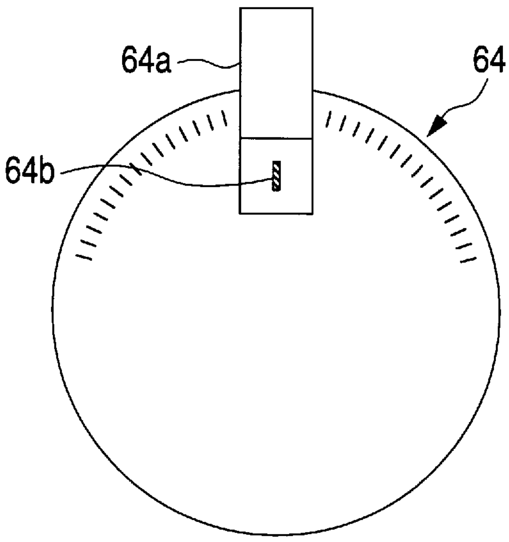
FIG. 32 is a diagrammatic representation showing the reference position of the photosensitive drum.

To adjust a phase value in the manner as previously described, the digital color copier is provided with the drive control circuit 65 capable of controlling the encoder 64 attached to the drive shaft 56 of the photosensitive drum 6 by dividing M (M: a natural number), as shown in FIG. 4. This drive control circuit 65 has the function of adjusting the phase value by matching a Z phase 64*b* (the reference point for one rotation), during which one pulse is output per rotation of the encoder 64, with the absolute phase specified by the CPU 98 through communication, i.e., the reference phase determined by the position of a sensor 64*a* attached to the encoder 64, as shown in FIG. 32. Alternatively, the drive control circuit 65 controls a phase value by adjusting the rotation of the photosensitive drum 6 so as to correspond to a specified increase or decrease in phase.

Figure 33:
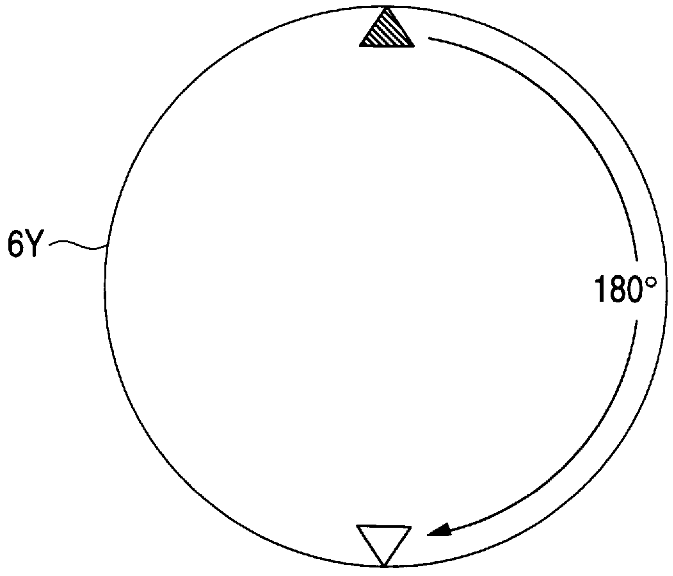
FIG. 33 is a diagrammatic representation showing how to adjust the rotational phase of the photosensitive drum.

Provided that the rotational phase $\phi$ of the yellow photosensitive drum 6Y lags behind (or leads) the rotational phase of the black photosensitive drum 6K by one-half period, as shown in FIG. 21, the CPU 98 performs control operations by sending the result of computation to the drive control board 65 of the yellow photosensitive drum 6Y so as to cause the rotational phase of the yellow photosensitive drum 6Y lead by one-half period. For example, if the yellow photosensitive drum 6Y is stopped, as shown in FIG. 33, only the yellow photosensitive drum 6Y is stopped after having been idled through 180 degrees, whereby the rotational phase of the yellow photosensitive drum 6Y is advanced by 180 degrees.

To advance or delay the phase in adjusting the rotational phase of the photosensitive drum 6, the control board 78 is arranged so as to select which of the adjustments requires a smaller amount of operation.

Figure 34:
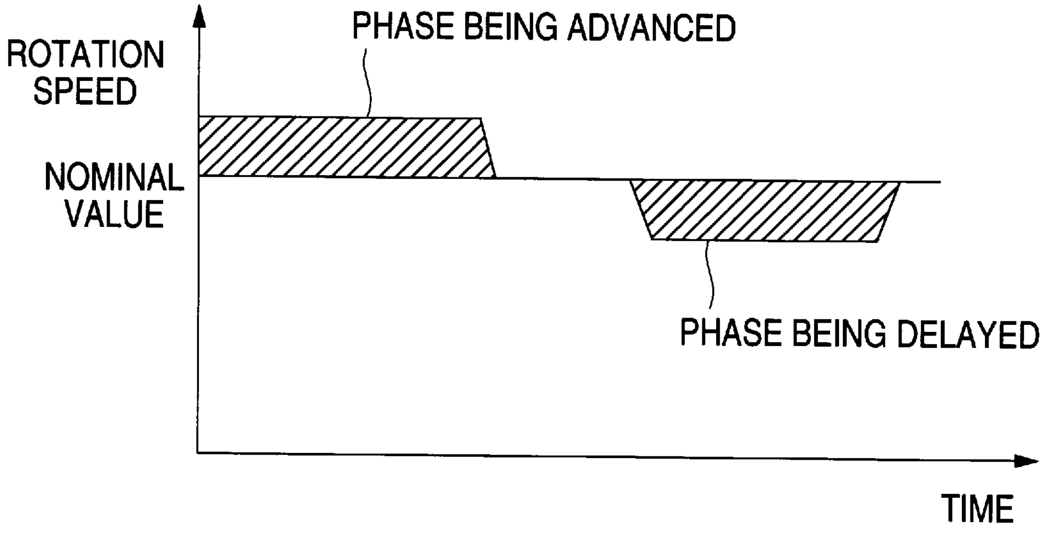
FIG. 34 is an explanatory view showing how to adjust the rotational phase of the photosensitive drum.

The phase of the photosensitive drum 6 may be adjusted when the phase adjustments become necessary, by changing the rotational speed of the photosensitive drum 6 or the transfer belt 24 by the required amount for the required period of time, as shown in FIG. 34. In this case, it is desirable to control the transfer belt 24 and the photosensitive drum 6 so as to make the amount of slip negligible by minutely making the speed of the photosensitive drum slow or fast.

If the phase of the photosensitive drum 6 or the transfer belt 24 is adjusted at the timing during which no print image is formed: for example, during the waiting time of a paper feeder immediately after a registration control cycle, immediately after a start key has been pressed, during a density detection cycle, or the like. As a result, the correction time can be reduced.

If the oscillation frequency components and amplitudes of AC misregistration for all the sampled data are obtained correction data are calculated, and the thus-calculated correction data are sent (step S18 shown in FIG. 17).

The digital color copier of the present embodiment is provided with the control board 78 that acts as rotational phase control means for individually adjusting the rotational phases of the photosensitive drums 6K, 6Y, 6M, and 6C. In consequence, if the rotational phases of the photosensitive drums 6K, 6Y, 6M, and 6C are individually adjusted by the control board 78 such that the rotational variations become in phase with each other, it is possible to reduce the eccentricity of the photosensitive drums 6K, 6Y, 6M, and 6C or the transfer belt 24, the eccentricity resulting from the attachment of the photosensitive drum or the transfer belt, or the eccentricity due to clearance errors of the rotary shaft.

The digital color copier of the present embodiment is provided with the color detection pattern output means that forms the AC color difference detection pattern 110 for detecting AC components arising in the digital color copier; the pattern detection means 70 that detects the color difference detection pattern 110 formed on the transfer belt 24; the color difference correction board 76 that serves as phase detection means for detecting the rotational phases of the photosensitive drums 6K, 6Y, 6M, and 6C on the basis of the detection signal received from the pattern detection means 70; and the control board 78 that serves as rotational phase control means for individually controlling the rotational phases of the photosensitive drums 6K, 6Y, 6M, and 6C on the basis of the phase information detected by the color difference correction board 76. By virtue of the above-described arrangement, the AC color difference detection pattern 110 for detecting periodic rotational variations arising in the digital color copier is formed on the transfer belt

24. The pattern detection means 70 detects the thus-formed AC color difference detection pattern. The color difference correction board 76 detects the rotational phases of the photosensitive drums 6K, 6Y, 6M, and 6C on the basis of the detection signal received from the pattern detection means 70. As a result, the periodical rotational variations arising in the digital color copier are detected with superior accuracy. Further, it is possible to adjust the phases so as to prevent the rotational variations of the photosensitive drums 6K, 6Y, 6M, and 6C from affecting an image by means of the control board 78. Consequently, picture quality can be improved to a much greater extent.

Further, the control board 78 of the present embodiment is arranged to individually adjust the rotational phases of the photosensitive drums with reference to the black photosensitive drum 6K such that the images to be transferred at the same transfer point on the transfer belt 24 become in phase with each other. Therefore, even if variations arise in the rotation of the photosensitive drums 6K, 6Y, 6M, and 6C, it is possible to prevent the rotational variations from affecting an image.

The control board 78 of the present embodiment is arranged to individually adjust the rotational phases of the photosensitive drums by idling at least one of the photosensitive drums 6K, 6Y) 6M, and 6C. As a result, it becomes possible to easily adjust the phases of the photosensitive drums 6K, 6Y, 6M, and 6C.

The pattern detection means 70 of the present embodiment is arranged to detect the AC color difference detection pattern 110 that corresponds to N times (N is a natural number) the circumference of one rotation of the photosensitive drums 6K, 6Y, 6M, and 6C. The color difference correction board 76 of the present embodiment is arranged to detect the rotational phases of the photosensitive drums 6K, 6Y, 6M, and 6C on the basis of a detection signal of the AC color difference detection pattern 110. By virtue of the above-described configuration, it is possible to detect rotational variations in excess of one rotation of the photosensitive drums 6K, 6Y, 6M, and 6C and the transfer belt 24 by means of the AC color difference detection pattern 110. Therefore, it is possible to detect the phase values so as to accurately correspond to the rotational variations of the photosensitive drums 6K, 6Y, 6M, and 6C and the transfer belt 24. In short, if the rotational phase is determined by use of the AC color difference detection pattern 110 that corresponds to one rotation of the photosensitive drums 6K, 6Y, 6M, or 6C or the transfer belt 24, the rotational phase may be affected by sporadic variations or another AC variation. It is possible to obtain a higher accuracy of detection by averaging phase values corresponding to N rotations that are determined from the result of sampling of a larger number of AC color difference detection patterns 110, that is, the AC color difference detection patterns corresponding to N rotations.

Figure 35:
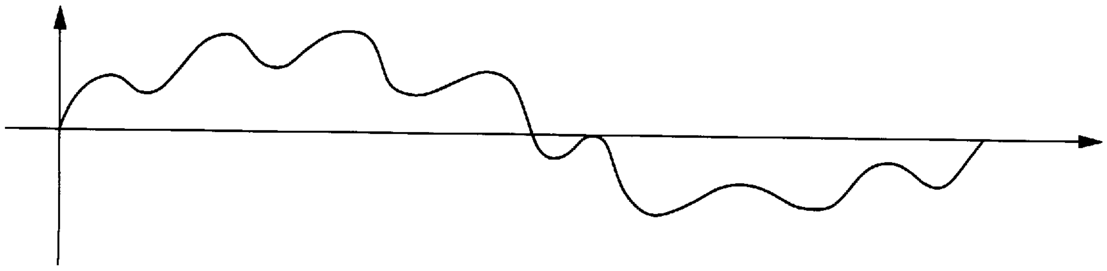
FIG. 35 is a plot showing rotational variations of the photosensitive drum.

If the phase of rotation is determined from the pattern data having a cycle corresponding to one rotation of the photosensitive drums 6K, 6Y, 6M, and 6C, AC oscillatory components having a longer cycle than that of the AC oscillatory components having a cycle corresponding to one rotation of the photosensitive drums 6K, 6Y, 6M, and 6C; for example, the AC oscillatory components having a cycle corresponding to one rotation of the only one transfer belt 24 in the above-described embodiment, affect the phase of rotation, as shown in FIG. 35. To prevent this problem, the pattern corresponding to about one rotation of the transfer belt 24 is detected. The phase values corresponding to N rotations are determined from the result of sampling of the pattern corresponding to N rotations of the photosensitive drums 6K, 6Y, 6M, and 6C that are detected during the course of the detection of the pattern corresponding to one rotation of the transfer belt. These rotational phases are averaged, which makes it possible to obtain a higher accuracy of detection.

Further, the color difference detection pattern 110 is sampled after completion of fine or rough adjustments of the DC color registration correction cycle carried out immediately after the power of the digital color copier has been turned on, in the present embodiment. Therefore, the color difference detection pattern for detecting rotational variations can be formed with superior accuracy. Hence, the phase of rotational variations of the photosensitive drum 6 can be detected with high accuracy.

SECOND EMBODIMENT

Figure 36:
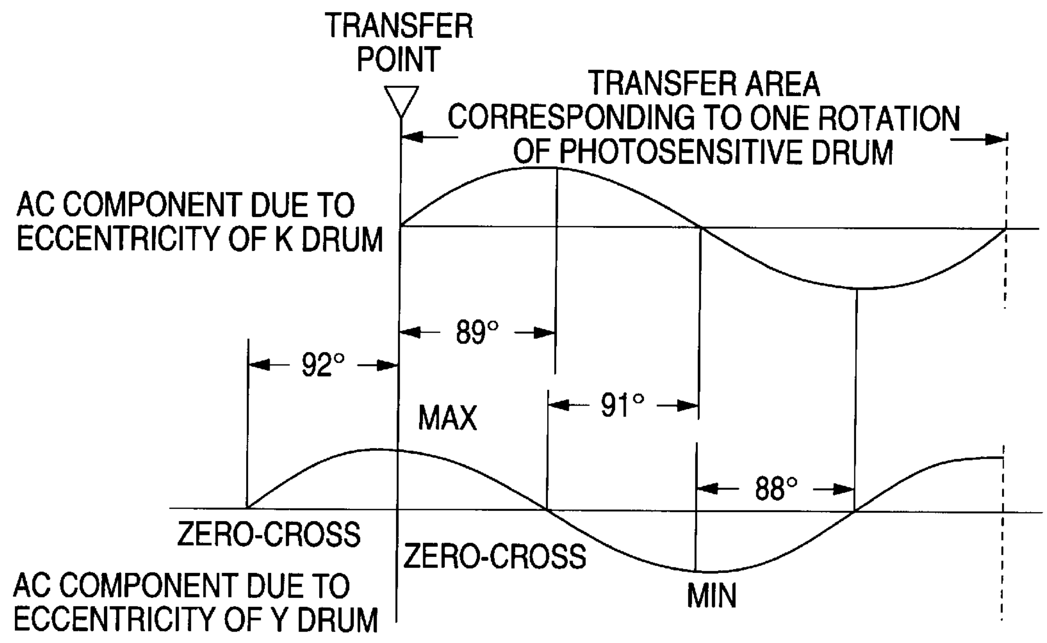
FIG. 36 is a diagrammatic representation showing how to detect the rotational phase of a photosensitive drum according to another embodiment of the present invention.

FIG. 36 designates a second embodiment of the present invention. The same elements as those shown in the first embodiment are assigned the same reference numerals. In the second embodiment, the phase detection means is arranged to detect the phase of rotational variations from the pattern data corresponding to one rotation of the image carrier or the endless carrier.

In short, if the phase of each of the photosensitive drums 6K, 6Y, 6M, and 6C is detected from the AC oscillatory components that correspond to N rotations of the photosensitive drums 6K, 6Y, 6M, and 6C as it is done in the first embodiment, it takes much longer time to detect the phase of rotation by the time required to rotate the photosensitive drums 6K, 6Y, 6M, and 6C N turns.

To prevent this problem, it becomes possible to detect the phase of each of the photosensitive drums 6K, 6Y, 6M, and 6C from the pattern data corresponding to one turn of the photosensitive drums 6K, 6Y, 6M, and 6C in the present embodiment. At this time, if the phase of each of the photosensitive drums 6K, 6Y, 6M, and 6C is detected from the pattern data corresponding to one turn of the photosensitive drums 6K, 6Y, 6M, and 6C, errors related to phase detection may become significant. For this reason, the mean value of the rotational variation data is obtained from the pattern data corresponding to one turn of each of the photosensitive drums 6K, 6Y, 6M, and 6C, as shown in FIG. 36. The phase of rotational variations of the photosensitive drum 6 is obtained from the address of the minimum value, the address of the maximum value, the zero-crossing address of the rising edge of each color, and the zero-crossing address of the falling edge of each color, all of which correspond to the mean value. The phase values obtained from the four addresses, such as the addresses of the minimum and maximum values of each color, are averaged. The phase of rotation of the photosensitive drum 6 is determined using the thus-obtained mean value, whereby the phase can be determined with higher accuracy.

THIRD EMBODIMENT

Figure 37:
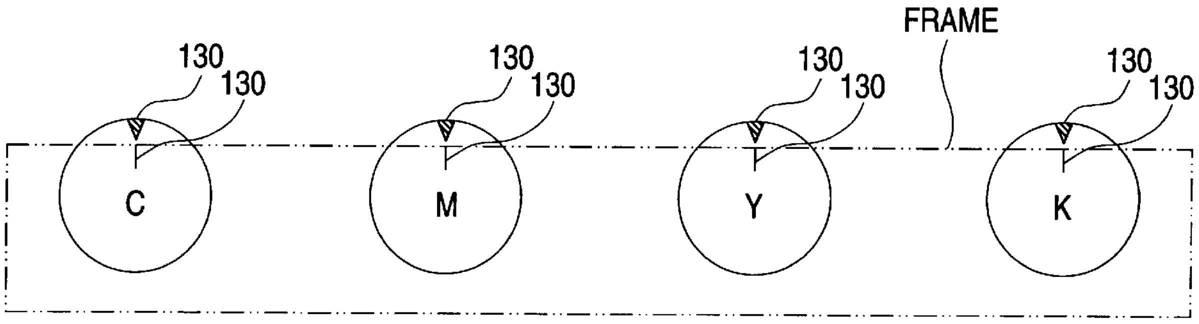
FIG. 37 is a schematic representation showing the structure of the embodiment of the present invention.

FIG. 37 designates a third embodiment of the present invention. The same elements as those shown in the previous embodiments are assigned the same reference numerals. In this embodiment, the digital color copier is provided with a plurality of image forming means having image carriers. All the image carriers that possess the same mechanical characteristics in terms of manufacture of the image carrier are used as the image carriers of the plurality of image forming means.

If the photosensitive drums 6K, 6Y, 6M, and 6C need replacement at the maintenance of the plurality of image forming units 5K, 5Y, 5M, and 5C, all the photosensitive drums 6K, 6Y, 6M, and 6C and supporting components thereof that are manufactured at least on the same line or during the same production lot are used in the third embodiment. More preferably, the photosensitive drums 6K, 6Y, 6M, and 6C and their supporting components are arranged so as to ensure a constant phase relationship. In short, a phase reference mark 130 is marked on the same phase of the photosensitive drums 6K, 6Y, 6M, and 6C and flanges at the time of manufacture of them, as shown in FIG. 37. The photosensitive drums 6K, 6Y, 6M, and 6C are placed in phase with each other according to the phase reference mark 130, and, then, the photosensitive drums and the flanges are assembled together. At this time, the photosensitive drums 6K, 6Y, 6M, and 6C are attached while all the phase reference marks are aligned to the same phase.

Figure 38A:
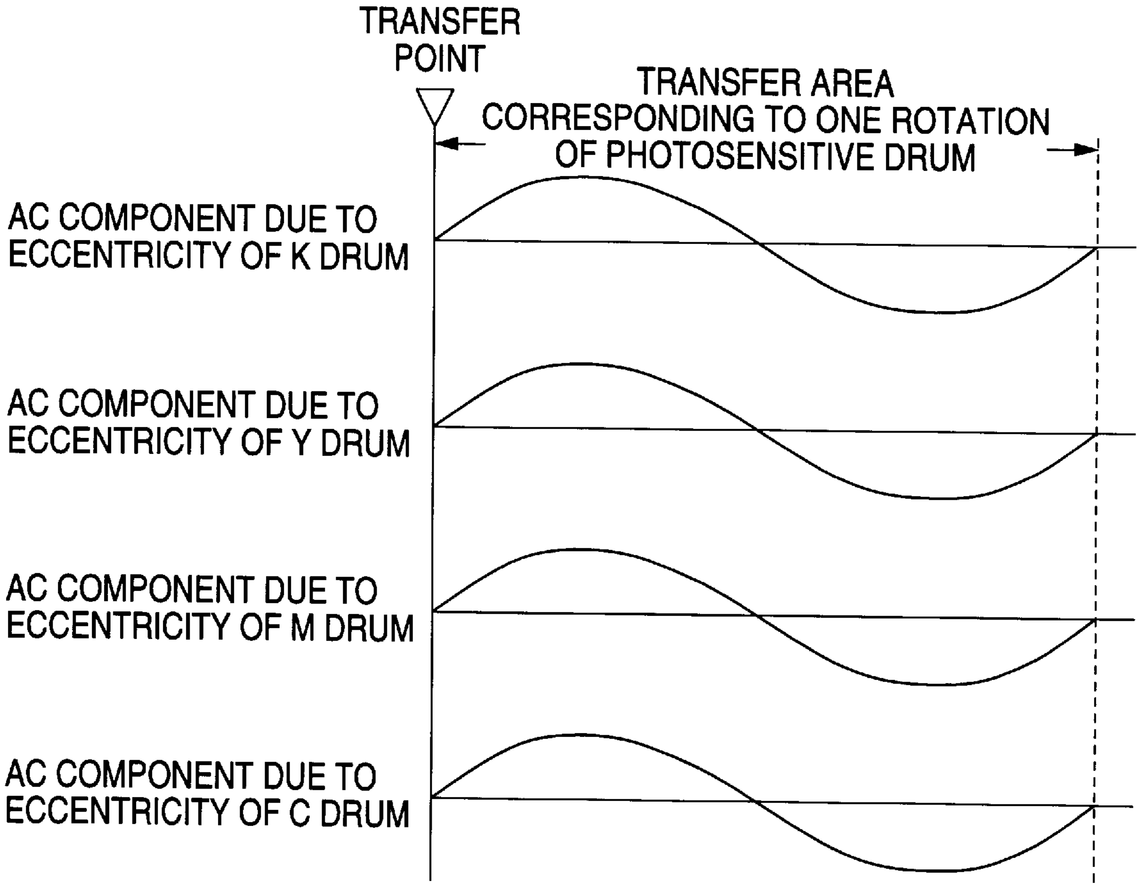
FIGS. 38A and 38B are plots respectively showing the states of control of rotational phase of the photosensitive drum.
Figure 38B:
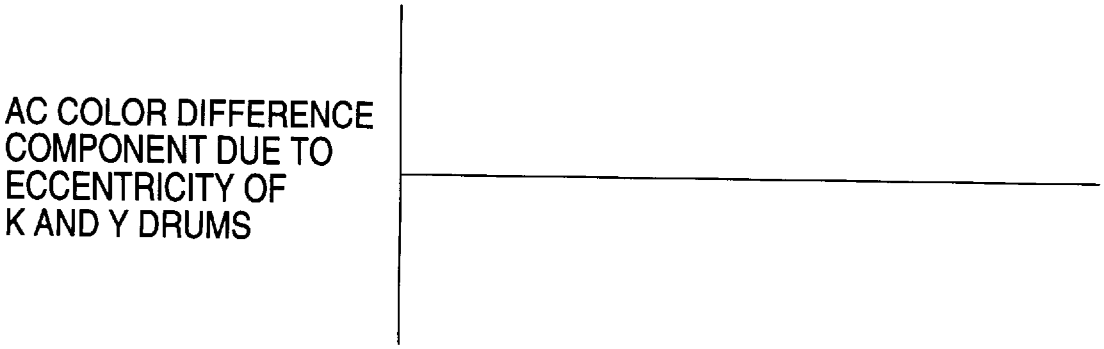
Figure 39:
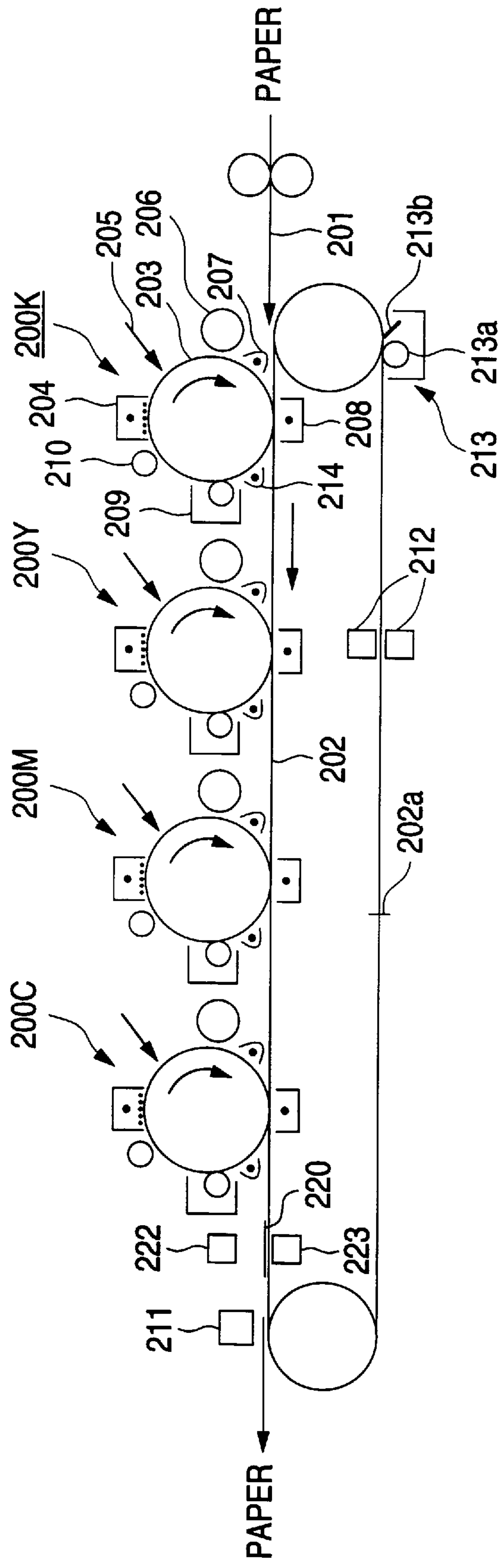
FIG. 39 is a schematic representation showing the configuration of a digital color copier to which a conventional device for detecting a color difference detection pattern is applied.
Figure 40:
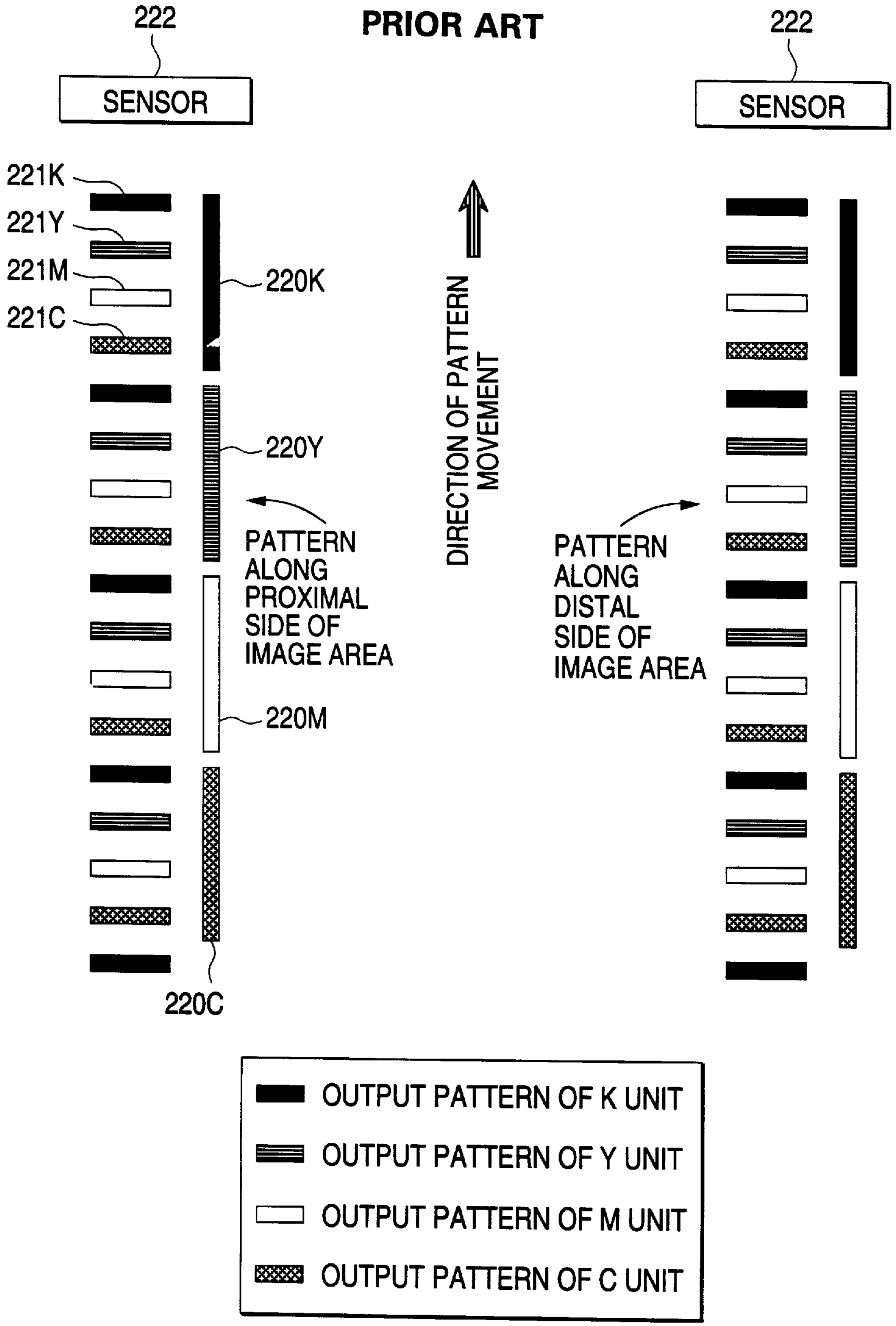
FIG. 40 is a diagrammatic representation showing the color difference detection pattern.
Figure 41A:
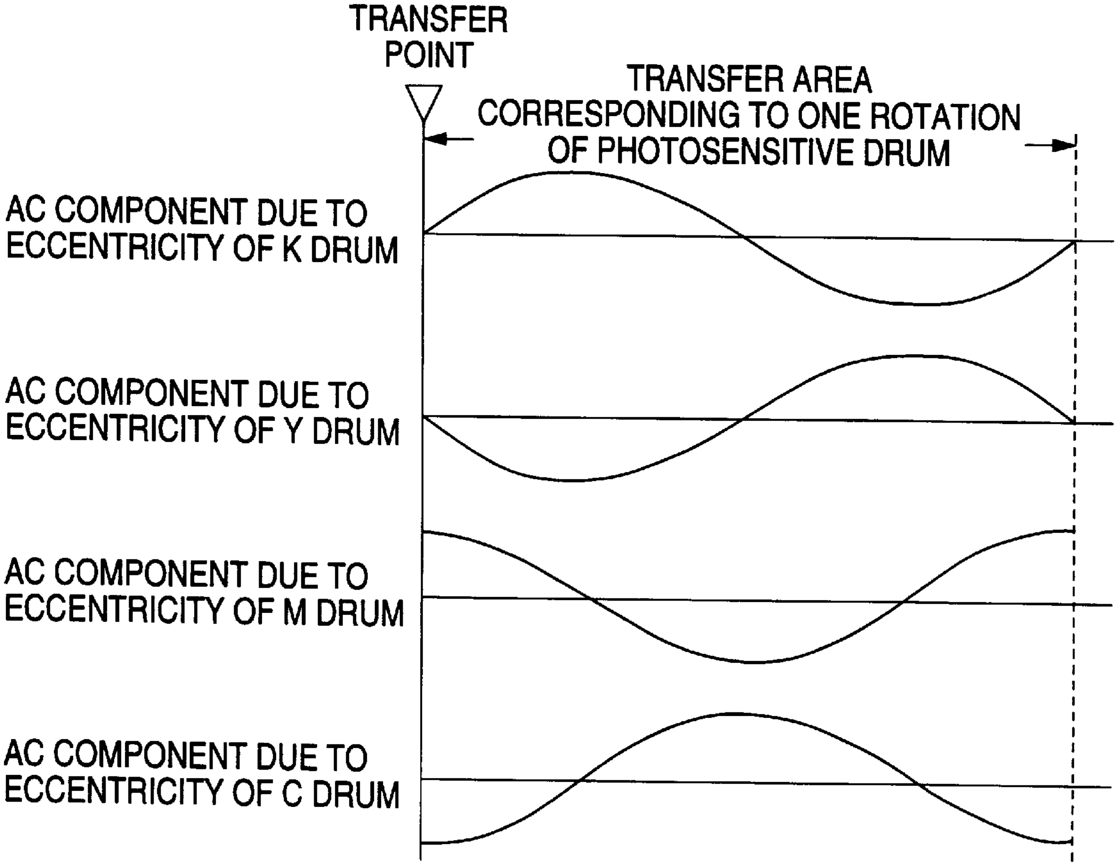
FIGS. 41A and 41B are plots respectively showing shifts in the rotational phases of the photosensitive drum.
Figure 41B:
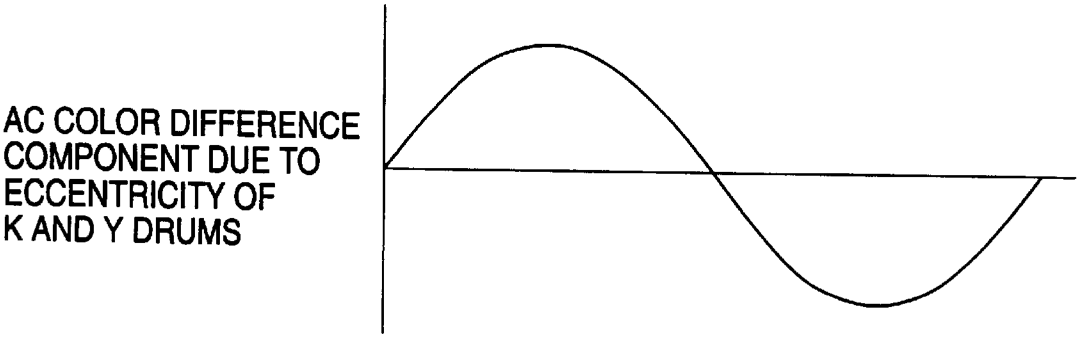

As a result, variations in the photosensitive drums 6K, 6Y, 6M, and 6C and their supporting components become smaller. Further, the characteristics that allow the amplitudes of the phases to substantially agree with each other can be obtained at the time of phase correction. If the amplitude and phase of the AC characteristics are the same, color differences due to the AC oscillatory characteristics become zero, as shown in FIG. 38, because the difference between the AC oscillatory characteristics of the plurality of image forming units at an arbitrary transfer position become effective.

[Effects of the Invention]

The present invention has the previously described configurations, as well as performing the operations as have been described. The image forming apparatus, according to claim 1 of the present invention, is configured so as to comprise rotational phase control means for individually controlling the phase of rotation of at least one of the image carriers and the endless carrier of the image forming means. By virtue of the above-described configuration, it is possible to reduce the influence of the eccentricity of the image carriers or the endless carrier of the image forming apparatus, the eccentricity resulting from the attachment of the image carriers or the endless carrier, or the eccentricity due to clearance errors of a rotary shaft, by individually controlling the phase of rotation of at least one of the image carriers and the endless carrier of the image forming apparatus.

The image forming apparatus, according to claim 2 of the present invention is configured so as to comprise phase detection means for detecting the phase of rotation of at least one of the image carriers and the endless carrier of the image forming means; and rotational phase control means for individually controlling the phase of rotation of at least one of the image carriers and the endless carrier of the image forming means on the basis of phase information detected by the phase detection means. By virtue of the above-described configuration, the phase of rotation of at least one of the image carriers and the endless carrier of the image forming means is detected by means of the phase detection means. It is possible to prevent an image from being affected by variations in the rotation of the image carriers, or the like, of the image forming means by means of the rotational phase control means. As a result, it is possible to improve the quality of a resultant picture.

The image forming apparatus, according to claim 3 of the present invention, is configured so as to comprise color difference detection pattern output means that outputs an image signal to produce a color difference detection pattern for detecting periodic rotational variations arising in the image forming apparatus, to the image forming means; pattern detection means for detecting the color difference detection pattern formed on the endless carrier; phase detection means for detecting the phase of rotation of at least one of the image carriers of the image forming means on the basis of a detection signal received from the pattern detection means; and rotational phase control means for individually controlling the phase of rotation of at least one of the image carriers of the image forming means and the endless carrier on the basis of the phase information detected by the phase detection means. By virtue of the above-described configuration, a color difference detection pattern for detecting periodic rotational variations arising in the image forming apparatus is formed on the endless carrier. The thus-formed color difference detection pattern is detected by the pattern detection means. The phase detection means detects the phase of rotation of at least one of the image carriers and the endless carrier of the image forming means, on the basis of the detection signal received from the pattern detection means. As a result, the periodic rotational variations arising in the image forming apparatus are detected with high accuracy. The rotational phase control means can prevent an image from being affected by variations in the rotation of the image carriers, or the like, of the image forming means, which in turn makes it possible to improve picture quality to a much greater extent.

According to claim 4 of the present invention, the image forming apparatus, as defined in any one of claims 1 through 3, is configured such that the rotational phase control means individually controls the phase of rotation of at least one of the image carriers and the endless carrier of the image forming means so that the images to be transferred at the same transfer point on the endless carrier become in phase with each other. By virtue of the above-described configuration, even if variations arise in the rotation of the image carriers and the endless carrier of the image forming means, it is possible to prevent an image from being affected by the variations in the rotation of the image carriers, or the like.

According to claim 5 of the present invention, the image forming apparatus as defined in any one of claims 1 through 4 is configured so as to comprise a plurality of image forming means having image carriers; and a control reference clock that is shared between the plurality of image forming means and controls the rotation of the image carrier of each image forming means. By virtue of the above-described configuration, the image carriers of the plurality of image forming means can be rotated so as to become in phase with each other, which makes it easy to cause the variations in the rotation of the image carriers to be in phase with each other.

According to claim 6 of the present invention, the image forming apparatus, as defined in any one of claims 1 through 4, is configured such that the rotational phase control means individually controls the phase of rotation of at least one of the image carriers and the endless carrier of the image forming means by idling it. By virtue of the above-described configuration, it is possible to easily control the phase of the image carrier, or the like, of the image forming means.

According to claim 7 of the present invention, the image forming apparatus, as defined in any one of claims 1 through 5, is configured such that the rotational phase control means individually controls the phase of rotation of at least one of the image carriers and the endless carrier of the image forming means by changing the rotating speed thereof. By virtue of the above-described configuration, it is possible to accurately control the phase of the image carrier, or the like, of the image forming means without stopping the image carriers and the endless carrier of the image forming means.

According to claim 8 of the present invention, the image forming apparatus, as defined in any one of claims 1 through 7, is configured such that the rotational phase control means comprises detaching means for detaching the image carriers from the endless carrier of the image forming means when the rotational phase control means controls the phase of rotation of at least one of the image carriers and the endless carrier of the image forming means by changing the rotating speed thereof. By virtue of the above-described configuration, it is possible to prevent the surface of image carriers from being damaged as a result of the contact between the image carriers and the endless carrier of the image forming means when the phases of the image carriers of the image forming means are controlled.

According to claim 9 of the present invention, the image forming apparatus, as defined in any one of claims 1 through 8, is configured such that the rotational phase control means carries out phase control operations at the timing during which no image is formed. By virtue of the above-described configuration, it is possible to ensure prevention of the occurrence of imperfects in an image during the course of preparation thereof.

According to claim 10 of the present invention, the image forming apparatus, as defined in any one of claims 1 through 9, is configured so as to comprise a plurality of image forming means having image carriers, wherein all the image carriers that possess the same mechanical characteristics from a manufacturing viewpoint are used as the image carriers of the plurality of image forming means. Even when the image carriers of the image forming apparatus are replaced, it is possible to match the image carriers, or the like, with each other with regard to the phase and amplitude of rotational variations, because the image carriers have the same mechanical characteristics. As a result, it is possible to ensure improvements in picture quality by means of the phase control.

According to claim 11 of the present invention, the image forming apparatus, as defined in claim 3, is configured such that the pattern detection means detects the phase of periodic rotational variations arising in one cycle of at least one of the image carriers and the endless carrier of the image forming means by detecting a color difference detection pattern that is N times (N: a natural number) the circumference of one rotation of the image carriers or the endless carrier of the image forming means; and that the phase detection means detects the phase of rotation of at least one of the image carriers and the endless carrier of the image forming means on the basis of a detection signal of the color difference detection pattern. With the above-described configuration, rotational variations in excess of one rotation of the image carrier or the endless carrier of the image forming means can be detected by means of the color difference detection pattern. As a result, a phase can be detected so as to correctly correspond to the variations in rotation of the image carrier or the endless carrier of the image forming means.

According to claim 12 of the present invention, the image forming apparatus, as defined in any one of claims 1 through 11, is configured such that the phase detection means detects a phase value from the information, from which the color difference detection pattern corresponding to N rotations of the image carriers or the endless carrier of the image forming means have been detected, every one rotation of the image carriers or the endless carrier of the image forming means, and then detects the mean value of the phase values corresponding to N rotations, as the phase of rotation of the image carriers or the endless carrier of the image forming means. With the above-described configuration, the phase of variations in the rotation of the image carrier or the endless carrier of the image forming means can be accurately detected by obtaining the mean value of the phase values corresponding to N rotations of the image carrier or the endless carrier of the image forming means.

According to claim 13 of the present invention, the image forming apparatus, as defined in claim 3, is configured such that the pattern detection means detects a pattern corresponding to one rotation of the endless carrier for each color difference detection pattern of each color formed on the endless carrier. As a result, the number of samples increases, and the image forming apparatus is prevented from being affected by AC components which are dependent on one rotation of the endless carrier. Therefore, variations in the rotation of the image carrier, or the like, can be accurately detected for each color difference detection pattern of each color.

According to claim 14 of the present invention, the image forming apparatus, as defined in any one of claims 1 through 13, is configured such that the phase detection means detects the phase of rotation of at least one of the image carriers and the endless carrier of the image forming means every one rotation thereof; calculates the mean value of rotational variation data on the rotational phases; and determines the phase of variations in the rotation of at least one of the image carriers and the endless carrier of the image forming means on the basis of the mean value of the rotational variation data. With the above-described configuration, the phase of variations in the rotation of the image carrier, or the like, can be accurately detected by obtaining the mean value of the rotational variation data, and determining the phase of rotation of the image carrier, or the like, of the image forming means on the basis of the rotational variation data.

According to claim 15 of the present invention, the image forming apparatus, as defined in any one of claims 1 through 14, is configured such that the phase detection means detects the phase of rotation of at least one of the image carriers and the endless carrier of the image forming means every one rotation thereof; calculates the mean value of data on variations in the rotational phases; calculates the address of the minimum rotational variation of each color, the address of the maximum rotational variation of each color, the address of rising edge of the rotational variations of each color, and the address of the falling edge of the rotational variations, on the basis of the mean value of the variation data on the rotational phases; averages all the rotational phases of at least one of the image carriers and the endless carrier of the image forming means detected on the basis of the addresses; and determines the phase of variations in the rotation of at least one of the image carriers and the endless carrier of the image forming means on the basis of the mean value of the variation data on the rotational phases. With the above-described configuration, the phase of variations in the rotation of the image carrier, or the like, can be accurately detected.

According to claim 16 of the present invention, the image forming apparatus, as defined in claim 3, is configured such that the color difference detection pattern is sampled after completion of rough or fine adjustment of DC color registration correction cycle immediately after the power of the image forming apparatus has been turned on. As a result, the color difference detection pattern for detecting rotational variations can be accurately formed, which in turn enables detection of the phase of variations in the rotation of the image carrier, or the like, with high accuracy.

What is claimed is:

1. An image forming apparatus, comprising:

at least one image forming means having an image carrier for forming images in different colors;

one of an endless carrier and a transfer material held on the endless carrier onto which an image is directly transferred in different colors;

rotational phase control means for individually controlling a phase of rotation of at least one of the image carrier and the endless carrier; and phase detection means for calculating a mean value of rotational variation data on the phase of rotation, an address of at least a minimum and a maximum rotational variation of each color and an address of at least a rising edge and a falling edge of the rotational variations of each color based on the mean value of the variation data on the rotational phases, for averaging all the rotational phases of at least one of the image carrier and the endless carrier of the image forming means based on the addresses and determining the phase of rotational variations of at least one of the image carrier and the endless carrier based on the mean value of the rotational variation data.

2. An image forming apparatus, comprising:

at least one image forming means having an image carrier for forming images in different colors;

one of an endless carrier member and a transfer material held on the endless carrier onto which an image is directly transferred in different colors;

phase detection means for detecting a phase of rotation of at least one of the image carrier and the endless carrier, for calculating a mean value of rotational variation data on the rotational phase, an address of at least a minimum and a maximum rotational variation of each color and an address of at least a rising edge and a falling edge of the rotational variations of each color based on the mean value of the variation data on the rotational phases, for averaging all the rotational phases of at least one of the image carrier and the endless carrier of the image forming means based on the addresses and for determining the phase of rotational variation of at least one of the image carrier and the endless carrier of the image forming means based on the mean value of the rotational variation data; and rotational phase control means for individually controlling the phase of rotation of at least one of the image carrier and the endless carrier based on the phase information detected by the phase detection means.

3. An image forming apparatus that is configured so as to: (i) form images in different colors by means of at least one of image forming means having image carriers; (ii) form an image by directly transferring the images onto transfer material placed on an endless carrier, the endless carrier being rotated; (iii) form a color difference detection pattern on the endless carrier; (iv) sample the color difference detection pattern; and (v) control the difference between a plurality of toner images which are directly formed in different colors on the transfer material, the image forming apparatus comprising:

color difference detection pattern output means for outputting an image signal, the image signal producing a color difference detection pattern for detecting periodic rotational variations arising in the image forming apparatus to the image forming means;

pattern detection means for detecting the color difference detection pattern formed on the endless carrier;

phase detection means for detecting the phase of rotation of at least one of the image carriers of the image forming means on the basis of a detection signal received from the pattern detection means, for calculating a mean value of rotational variation data on the rotational phases, an address of at least a minimum and a maximum rotational variation of each color and an address of at least a rising edge and a falling edge of the rotational variations of each color based on the mean value of the variation data on the rotational phases, for averaging all the rotational phases of at least one of the image carrier and the endless carrier of the image forming means based on the addresses and for determining the phase of rotational variations of at least one of the image carrier and the endless carrier of the image forming means based on the mean value of the rotational variation data; and rotational phase control means for individually controlling the phase of rotation of at least one of the image carrier of the image forming means and the endless carrier based on the phase information detected by the phase detection means.

4. The image forming apparatus according to any one of claims 1 through 3, wherein the rotational phase control means individually controls the phase of rotation of at least one of the image carrier and the endless carrier of the image forming means such that the images to be transferred at a same transfer point on the endless carrier become in phase with each other.

5. The image forming apparatus according to any one of claims 1 through 3 further comprising:

a plurality of image forming means having image carriers; and a control reference clock that is shared between the plurality of image forming means and controls the rotation of the image carrier of each image forming means.

6. The image forming apparatus according to any one of claims 1 through 3, wherein the rotational phase control means individually controls the phase of rotation of at least one of the image carrier and the endless carrier of the image forming means by idling it.

7. The image forming apparatus according to any one of claims 1 through 3, wherein the rotational phase control means individually controls the phase of rotation of at least one of the image carriers and the endless carrier of the image forming means by changing the rotating speed thereof.

8. The image forming apparatus according to any one of claims 1 through 3, wherein the rotational phase control means comprises detaching means for detaching the image carriers from the endless carrier of the image forming means when the rotational phase control means controls the phase of rotation of at least one of the image carrier and the endless carrier of the image forming means by changing the rotating speed thereof.

9. The image forming apparatus according to any one of claims 1 through 3, wherein that the rotational phase control means is arranged to carry out phase control operations at the timing during which no image is formed.

10. The image forming apparatus according to any one of claims 1 through 3, further comprising a plurality of image forming means having image carriers, wherein all the image carriers that possess the same mechanical characteristics from a manufacturing viewpoint are used as the image carriers of the plurality of image forming means.

11. The image forming apparatus according to claim 3, wherein the pattern detection means detects the phase of periodic rotational variations arising in at least one cycle of one of the image carrier and the endless carrier of the image forming means by detecting a color difference detection pattern that is N times (N: a natural number) the circumference of one rotation of the image carrier or the endless carrier of the image forming means, and the phase detection means detects the phase of rotation of at least one of the image carrier and the endless carrier of the image forming means on the basis of a detection signal of the color difference detection pattern.

12. The image forming apparatus according to claim 3, wherein the phase detection means detects a phase from the information, from which the color difference detection pattern corresponding to N rotations of the image carrier or the endless carrier of the image forming means have been detected, every one rotation of the image carrier or the endless carrier of the image forming means, and then detects the mean value of the phases corresponding to N rotations as the phase of rotation of the image carrier or the endless carrier of the image forming means.

13. The image forming apparatus according to claim 3, wherein the pattern detection means detects a pattern corresponding to about one rotation of the endless carrier for each color difference detection pattern of each color formed on the endless carrier.

14. The image forming apparatus according to claim 3, wherein the color difference detection pattern is sampled after completion of rough or fine adjustment of DC color registration correction cycle immediately after the power of the image forming apparatus has been turned on.

15. An image forming apparatus comprising:

at least one image forming means having an image carrier for forming images in different colors;

one of an endless carrier member and a transfer material held on the endless carrier onto which an image is directly transferred in different colors;

rotational phase control means for individually controlling a phase rotation of at least one of the image carrier and the endless carrier; and phase detection means for (i) detecting the phase of rotation of at least one of the image carrier and the endless carrier of the image forming means every one rotation thereof; (ii) calculating the mean value of data on variations in the rotational phases; (iii) calculating an address of at least a minimum and a maximum rotational variation of each color, an address of at least a rising and falling edge of the rotational variations of each color, based on the mean value of the variation data on the rotational phases, the phase detection means further averaging the rotational phases of at least one of the image carrier and the endless carrier of the image forming means detected based on the addresses and determining the phase of variations in the rotation of at least one of the image carrier and the endless carrier of the image forming means based on the mean value of the variation data on the rotational phases.

* * * * *